(12) United States Patent
Baba et al.

(10) Patent No.: US 12,214,704 B2
(45) Date of Patent: Feb. 4, 2025

(54) VEHICLE SEAT

(71) Applicant: TS TECH CO., LTD., Asaka (JP)

(72) Inventors: Hiroshi Baba, Tochigi (JP); Soichiro Kamei, Tochigi (JP); Masashi Nakano, Tochigi (JP); Takuya Arai, Tochigi (JP); Ryota Urushihara, Tochigi (JP); Masayuki Hoshi, Tochigi (JP); Hironori Watanabe, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 15 days.

(21) Appl. No.: 17/638,496

(22) PCT Filed: Aug. 27, 2020

(86) PCT No.: PCT/JP2020/032379
§ 371 (c)(1),
(2) Date: Feb. 25, 2022

(87) PCT Pub. No.: WO2021/039908
PCT Pub. Date: Mar. 4, 2021

(65) Prior Publication Data
US 2022/0402417 A1 Dec. 22, 2022

(30) Foreign Application Priority Data

Aug. 28, 2019 (JP) ................................. 2019-155851
Aug. 28, 2019 (JP) ................................. 2019-155852
(Continued)

(51) Int. Cl.
*B60N 2/68* (2006.01)
*B60N 2/897* (2018.01)
*B60R 21/207* (2006.01)

(52) U.S. Cl.
CPC ............... *B60N 2/68* (2013.01); *B60N 2/682* (2013.01); *B60N 2/897* (2018.02); *B60R 21/207* (2013.01)

(58) Field of Classification Search
CPC ..................................................... B60N 2/682
See application file for complete search history.

(56) References Cited

U.S. PATENT DOCUMENTS 6,241,318 B1 * 6/2001 Amano ................. B60N 2/682
297/452.2
6,375,267 B1 4/2002 Ishikawa
(Continued)

FOREIGN PATENT DOCUMENTS

| CN | 104583007 A | 4/2015 |
|---|---|---|
| JP | H 11-216037 A | 8/1999 |

(Continued)

OTHER PUBLICATIONS

International Search Report and Written Opinion with English Translation issued in PCT/JP2020/032379, dated Nov. 10, 2020 (11 pages).
(Continued)

*Primary Examiner* — Timothy J Brindley
(74) *Attorney, Agent, or Firm* — Dority & Manning, P.A.

(57) ABSTRACT

In a vehicle seat, a side frame of a seat back frame has a front wall that is formed so as to be bent inward continuously from a front edge of a plate-shaped portion and forms a curved region extending vertically from around the rotating shaft and reaching an upper frame, and a rear wall that is formed so as to be bent inward continuously from a rear edge of the plate-shaped portion and forms a curved region extending vertically from around the rotating shaft and reaching the upper frame, and an inner edge of the front wall has a projecting piece that spreads to the inside from a virtual outline corresponding to a shape of the upper frame (Continued)

and is superimposed on the front wall of the upper frame from the rear. This provides a vehicle seat that can contribute to improvement of the work efficiency when assembling a seat back frame.

20 Claims, 56 Drawing Sheets

(30) Foreign Application Priority Data

Oct. 4, 2019 (JP) .................................. 2019-183748
Dec. 27, 2019 (JP) .................................. 2019-238845

(56) References Cited

U.S. PATENT DOCUMENTS

| | | | |
|---|---|---|---|
| 2004/0227389 A1* | 11/2004 | Yoshida | B60N 2/42745 297/452.18 |
| 2008/0265639 A1* | 10/2008 | Siegrist | B60N 2/682 219/121.64 |
| 2010/0244538 A1* | 9/2010 | Gross | B60N 2/68 29/401.1 |
| 2012/0306250 A1* | 12/2012 | Line | B60N 2/682 297/452.1 |
| 2013/0069415 A1* | 3/2013 | Yasuda | B60N 2/68 297/452.1 |
| 2015/0091356 A1* | 4/2015 | Ozaki | B60N 2/803 297/391 |
| 2015/0239369 A1 | 8/2015 | Hoshi | |
| 2017/0008432 A1 | 1/2017 | Matsui et al. | |
| 2018/0037138 A1* | 2/2018 | Tanaka | B60N 2/123 |
| 2018/0086241 A1* | 3/2018 | Kimura | B60N 2/682 |
| 2018/0126883 A1* | 5/2018 | Sakaguchi | B60N 2/0232 |
| 2018/0215295 A1* | 8/2018 | Onuma | B60N 2/4235 |
| 2020/0406799 A1* | 12/2020 | Kong | B60N 2/682 |
| 2022/0176856 A1* | 6/2022 | Mauffrey | B60N 2/686 |
| 2022/0258655 A1* | 8/2022 | Pinto | B60N 2/688 |
| 2022/0324361 A1* | 10/2022 | Roche | B60N 2/682 |

FOREIGN PATENT DOCUMENTS

| | | |
|---|---|---|
| JP | 2006-051272 A | 2/2006 |
| JP | 2008-068634 A | 3/2008 |
| JP | 2008-520356 A | 6/2008 |
| JP | 2010254109 A | 11/2010 |
| JP | 2011-088553 A | 5/2011 |
| JP | 2013-067240 A | 4/2013 |
| JP | 2015-067133 A | 4/2015 |
| JP | 5691769 B2 | 4/2015 |
| JP | 2017019345 A | 1/2017 |
| JP | 2017214069 A | 12/2017 |
| JP | 2018-162033 A | 10/2018 |
| JP | 2018192183 A | 12/2018 |
| JP | 2019-166892 A | 10/2019 |

OTHER PUBLICATIONS

Office Action (with English translation) received in corresponding Japanese Application No. JP 2019-155851, dated May 29, 2023, 6 pages.
Office Action (with English translation) received in corresponding Japanese Application No. JP 2019-155851, dated May 29, 2023, 5 pages.
Japanese Notice of Reasons for Refusal (w/ English Machine Translation) for corresponding Application No. 2019-238845, mailed Nov. 21, 2023, 17 pages.
Japanese Notice of Reasons for Refusal (w/ English Machine Translation) for corresponding Application No. 2021-049301, mailed Nov. 21, 2023, 13 pages.
Japanese Notice of Reasons for Refusal (w/ English Machine Translation) for corresponding Application No. 2022-127310, mailed Nov. 21, 2023, 10 pages.
Chinese Office Action (w/ English translation) for corresponding Application No. 202080060924.4, dated Mar. 25, 2024, 10 pages.

* cited by examiner

FIG.30
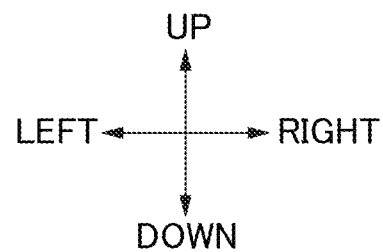
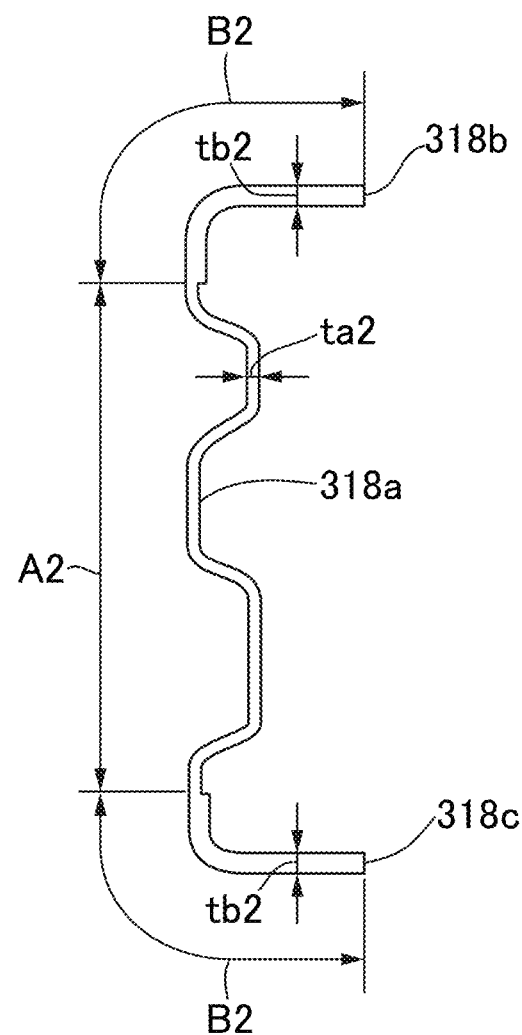

VEHICLE SEAT

CROSS REFERENCE TO RELATED APPLICATIONS

This application is the U.S. National Stage entry of International Application No. PCT/JP2020/032379 filed under the Patent Cooperation Treaty and having a filing date of Aug. 27, 2020, which claims priority to Japanese Patent Application No. 2019-155851 having a filing date of Aug. 28, 2019, Japanese Patent Application No. 2019-155852 having a filing date of Aug. 28, 2019, Japanese Patent Application No. 2019-183748 having a filing date of Oct. 4, 2019, and Japanese Patent Application No. 2019-238845 having a filing date of Dec. 27, 2019, all of which are incorporated herein by reference.

TECHNICAL FIELD

The present invention relates to a vehicle seat that includes a seat back frame having left and right side frames that spread along a vertical plane orthogonal to a rotational axis around a rotating shaft and have a plate-shaped portion extending upward along the vertical plane, and an upper frame that provides a link between the left and right side frames above the rotating shaft.

BACKGROUND ART

Patent Document 1 discloses a vehicle seat that includes a seat back reclinably linked to a seat cushion. In this seat, the seat back has left and right side frames that extend vertically upward from a rotational axis and support a seat back pad, and an upper frame that links the left and right side frames above the reclining rotational axis. A front wall and a rear wall of the side frame are covered by an end of the upper frame throughout the entire region in the vertical direction.

PRIOR ART DOCUMENTS

Patent Documents

Patent Document 1: Japanese Patent Application Laid-open No. 2018-162033
Patent Document 2: Japanese Patent No. 5691769
Patent Document 3: Japanese Patent Application Laid-open No. 2013-67240

SUMMARY OF THE INVENTION

Problems to be Solved by the Invention

First Problem

In the vehicle seat described in Patent Document 1 above, the left and right side frames have a structure in which they sandwich the upper frame from opposite sides. When assembling the upper frame, the left end of the upper frame is inserted into the left side frame, the right end of the upper frame is inserted into the right side frame, the assembly operation is therefore cumbersome, and there is a desire for improvement of the work efficiency.

A first object of the present invention is to provide a vehicle seat that can contribute to improvement of the work efficiency when assembling a seat back frame.

Second Problem

In a vehicle seat device that includes a seat cushion frame and a seat back frame each having a pair of side frames that are arranged at positions spaced from each other and extend linearly and a linking member that provides a link between the side frames, an arrangement in which, for example, part of the side frame of the seat back frame is made thick because of the strength required being different in some parts of the side frame is known from, for example, Patent Document 2.

In the vehicle seat of Patent Document 2, the side frame of the seat back frame is formed from a side frame main body and a subframe that is formed to be thicker than the side frame main body and is welded to a lower part of the side frame main body, thereby ensuring the strength of a hinge joined part via which the lower part of the side frame of the seat back frame is joined to the seat cushion frame. In order to suppress any increase in the weight of the side frame while ensuring the necessary strength, it is desirable that the thickness of the side frame is more finely changed, but in this arrangement the rigidity of a linked part between the side frame and the linking member, which provides a link between the side frames, should not be affected.

The present invention has been accomplished in light of such circumstances, and it is a second object thereof to provide a vehicle seat device that can ensure the strength for a side frame while not affecting the rigidity of a part linked to a linking member and, moreover, to achieve a reduction in weight.

Third Problem

In a vehicle seat device in which a seat cushion frame and a seat back frame that is linked to the seat cushion frame each include a pair of side frames that are arranged at positions spaced from each other and extend linearly while integrally having a side plate portion and a collar portion that protrudes sideways from the outer edge of the side plate portion, an arrangement in which, for example, the side frame of the seat back frame is formed so as to have an angular U-shaped cross section while integrally having a side plate portion and a collar portion that is connectedly provided on the outer edge of the side plate portion is known from Patent Document 2.

In the vehicle seat of Patent Document 2, the collar portion and the side plate portion of the side frame are formed so as to have the same plate thickness, and in order to increase the rigidity of such a side frame, it can be achieved by increasing the plate thickness, but by so doing the weight is also increased. Because of this, it is desired that the rigidity of the side frame is enhanced while minimizing any increase in the weight.

The present invention has been accomplished in light of such circumstances, and it is a third object thereof to provide a vehicle seat device that can enhance the rigidity of a side frame while minimizing any increase in the weight.

Fourth Problem

A vehicle seat (vehicular seat) that includes a seat back frame that has left and right side frames having a plate-shaped portion that spreads along a vertical plane orthogonal to the rotational axis around a rotating shaft and extends upward along the vertical plane and a rear wall that is formed so as to be bent inward continuously from the rear edge of the plate-shaped portion and forms a curved region extending vertically from around the rotating shaft, a lower frame that is disposed to the rear of the rotating shaft so as to be joined to the rear wall from the rear and has a back region that provides a link between the left and right side frames, and an upper frame providing a link between the left and right side frames above the lower frame is known from Patent Document 3.

The vehicle seat of Patent Document 3 includes a seat back that is reclinably linked to a seat cushion, and the seat back frame has left and right side frames that extend vertically upward from a rotating shaft and support a seat back pad, a lower panel (lower frame) that is disposed to the rear of the reclining rotational axis and provides a link between the left and right side frames, and an upper cross member (upper frame) that provides a link between the left and right side frames above the lower panel. The left and right side frames, the lower panel, and the upper cross member form a square frame structure.

However, each of the left and right side frames has a plate-shaped portion that spreads along a vertical plane orthogonal to the reclining rotational axis, and a rear wall that is formed so as to be bent inward continuously from the rear edge of the plate-shaped portion and forms a curved region extending vertically from around the rotating shaft and reaching the upper cross member, and when assembling the seat back frame, the lower panel is joined to the rear wall of the side frame from the rear. Since the lower panel is assembled to the side frame from one direction, the assembly operation therefore has good efficiency.

On the other hand, since an area between the two joined regions has a flat plate shape, the torsional rigidity of the frame structure is not very high. Therefore, in order to ensure the torsional rigidity therefor, a high joining strength is required for joining the lower panel and the side frame, and the workload for this joining increases accordingly.

A fourth object of the present invention is to provide a vehicular seat that can contribute to reduction of the work load when assembling a seat back frame.

Means for Solving the Problems

Solution Means for First Problem and Effects Thereof

In order to attain the above object, according to a first aspect of the present invention, there is provided a vehicle seat comprising a seat back frame having left and right side frames that have a plate-shaped portion spreading along a vertical plane orthogonal to a rotational axis around a rotating shaft and extending upward along the vertical plane, and an upper frame that provides a link between the left and right side frames above the rotating shaft, the upper frame being bendingly formed from a plate material and having a front wall that is partitioned by an upper ridge line and a lower ridge line extending in a horizontal direction, an upper wall that spreads rearward continuously from the upper ridge line, an upper standing wall that is formed so as to be bent upward from a rear end of the upper wall, a lower wall that spreads rearward continuously from the lower ridge line, and a lower standing wall that is formed so as to be bent downward from a rear end of the lower wall, characterized in that the side frame has a front wall that is formed so as to be bent inward continuously from a front edge of the plate-shaped portion and forms a curved region extending vertically from around the rotating shaft and reaching the upper frame, and a rear wall that is formed so as to be bent inward continuously from a rear edge of the plate-shaped portion and forms a curved region extending vertically from around the rotating shaft and reaching the upper frame, and an inner edge of the front wall has a projecting piece that spreads to the inside from a virtual outline corresponding to a shape of the upper frame and is superimposed on the front wall from the rear. In accordance with the first aspect, since in the side frame the rigidity of the plate-shaped portion is enhanced by the action of the curved region formed from the front wall and the rear wall, it is possible to ensure sufficient rigidity for the side frame while lightening the weight. Moreover, the upper frame can be assembled from the front onto the left and right side frames, which are spaced apart at the time of assembly, and in this process the front wall of the side frame does not interfere with the upper standing wall and the lower standing wall, which are positioned further rearward than the front wall in the upper frame. It is thus possible to enhance the work efficiency when attaching the upper frame.

Further, according to a second aspect of the present invention, in addition to the first aspect, the front wall of the upper frame and the projecting piece of the side frame have a weld mark due to welding. In accordance with the second aspect, since the upper frame and the side frame are superimposed and welded, it is possible to enhance the rigidity of the seat back frame.

Furthermore, according to a third aspect of the present invention, in addition to the first or second aspect, the vehicle seat comprises an upper superimposition piece that is continuous from the rear wall and is superimposed on the upper standing wall of the upper frame from the rear. In accordance with the third aspect, the support rigidity is enhanced due to the upper frame being superimposed not only on the front wall of the side frame but also on the rear wall (more specifically, the upper superimposition piece), and the upper superimposition piece can contribute to improvement of the rigidity of the seat back frame.

Moreover, according to a fourth aspect of the present invention, in addition to the third aspect, the upper standing wall of the upper frame and the upper superimposition piece of the side frame have a weld mark due to welding. In accordance with the fourth aspect, since the upper frame is welded to the side frame not only via the front wall but also via the rear wall, it is possible to enhance the rigidity of the seat back frame.

Further, according to a fifth aspect of the present invention, in addition to any one of the first to fourth aspects, the vehicle seat comprises a lower superimposition piece that is continuous from the rear wall and is superimposed on the lower standing wall of the upper frame from the rear. In accordance with the fifth aspect, the support rigidity is enhanced due to the upper frame being superimposed not only on the front wall of the side frame but also on the rear wall (more specifically, the lower superimposition piece), and the lower superimposition piece can contribute to improvement of the rigidity of the seat back frame.

Furthermore, according to a sixth aspect of the present invention, in addition to the fifth aspect, the lower standing wall of the upper frame and the lower superimposition piece of the side frame have a weld mark due to welding. In accordance with the sixth aspect, since the upper frame is welded to the side wall not only via the front wall but also via the rear wall, it is possible to enhance the rigidity of the seat back frame.

Moreover, according to a seventh aspect of the present invention, in addition to the sixth aspect, the lower superimposition piece has a lower flange that is formed so as to be bent forward from a lower end of the lower superimposition piece. In accordance with the seventh aspect, the rigidity of the side frame, and consequently the upper frame, can be enhanced, and it becomes possible to suppress deformation of the seat frame. It is thereby possible for the back of an occupant sitting on the vehicle seat to be supported well.

Further, according to an eighth aspect of the present invention, in addition to the seventh aspect, the upper frame has a flange formed so as to be bent forward while being continuous from a lower end of the lower standing wall at a position corresponding to the lower flange in a horizontal direction. In accordance with the eighth aspect, the rigidity of the upper frame, and consequently the side frame, can be enhanced, and it becomes possible to suppress deformation of the seat frame. It is thereby possible for the back of an occupant sitting on the vehicle seat to be supported well.

Furthermore, according to a ninth aspect of the present invention, in addition to the eighth aspect, the vehicle seat comprises a side frame flange that is formed so as to be bent from an inner end of the rear wall and is continuous from the lower flange. In accordance with the ninth aspect, since the lower flange of the lower superimposition piece is continuous from the side frame flange of the rear wall, it is possible to enhance the rigidity of the lower superimposition piece.

Moreover, according to a tenth aspect of the present invention, in addition to any one of the first to ninth aspects, the vehicle seat has a first support hole that is formed in the upper wall and receives a headrest pillar guide supporting a headrest pillar so that the headrest pillar can be displaced in an axial direction, and a second support hole that is formed in the lower wall and receives the headrest pillar guide, and a support hole flange is formed at a peripheral edge of each of the first support hole and the second support hole so as to be bent downward. In accordance with the tenth aspect, regardless of whether the first support hole and the second support hole are formed, it is possible to ensure the rigidity of the upper standing wall and the lower standing wall. Moreover, since both the support hole flanges are formed by downward bending, when assembling the headrest pillar guide, it becomes possible for the headrest pillar guide to be inserted well into the first support hole and the second support hole.

Solution Means for Second Problem and Effects Thereof

In order to achieve the second object, according to a first aspect of the present invention, there is provided a vehicle seat device comprising a seat cushion frame (215) and a seat back frame (216) each having a pair of side frames (218, 225A, 225B, 225C, 225D) that are arranged at positions spaced from each other and extend linearly and a linking member (219, 220, 227, 228) that provides a link between the side frames (218, 225A to 225D), characterized in that the side frame (218, 225A to 225D) of at least one of the seat cushion frame (215) and the seat back frame (216) is formed into a shape such that the plate thickness changes at a plate thickness boundary line (L3, L4; L1, L2) disposed at a position that avoids a part linked to the linking member (219, 220, 227, 228) at a plurality of locations in a longitudinal direction of the side frame (218, 225A to 225D). In accordance with the first aspect, since the plate thickness boundary line at which the plate thickness changes is set at a plurality of locations in the longitudinal direction of the side frame of at least one of the seat cushion frame and the seat back frame, and the linking member is linked to the side frame at a position that avoids the plate thickness boundary line, it is possible to suppress any increase in weight while ensuring the strength required for the side frame of at least one of the seat cushion frame and the seat back frame due to the plate thickness of the side frame changing on the plurality of plate thickness boundary lines and, moreover, it is possible to avoid affecting the rigidity of a part via which the linking member and the side frame are linked.

Furthermore, according to a second aspect of the present invention, in addition to the first aspect, a reinforcing part (238, 239, 268, 272, 273, 274) is provided at a position that avoids the plate thickness boundary line (L1, L2) of the side frame (225A to 225D), the reinforcing part (238, 239, 268, 272, 273, 274) extending in a direction intersecting the longitudinal direction of the side frame (225A to 225D) and bulging either inward or outward. In accordance with the second aspect, since the reinforcing part extending in a direction orthogonal to the longitudinal direction of the side frame is provided on the side frame at a position that avoids the plate thickness boundary line, it is possible to further increase the strength of the side frame while not affecting the rigidity of a part via which the linking member and the side frame are linked.

Moreover, according to a third aspect of the present invention, in addition to the first or second aspect, an auxiliary member (263) exhibiting a reinforcing function is provided on the side frame (225A) so as to straddle the plate thickness boundary line (L2) while avoiding contact with the side frame (225A) on the plate thickness boundary line (L2). In accordance with the third aspect, since the auxiliary member, which does not come to contact with the side frame on the plate thickness boundary line, is provided on the side frame so as to straddle the plate thickness boundary line, it is possible to enhance the rigidity of the side frame on the plate thickness boundary line.

Furthermore, according to a fourth aspect of the present invention, in addition to the first aspect, a reinforcing part (237, 267) is provided on the side frame (225A to 225C) so as to intersect the plate thickness boundary line (L1, L2), the reinforcing part (237, 267) extending along the longitudinal direction of the side frame (225A to 225C) and bulging either inward or outward. In accordance with the fourth aspect, since the reinforcing part intersecting the plate thickness boundary line is provided on the side frame, it is possible to enhance the rigidity of the side frame on the plate thickness boundary line.

Moreover, according to a fifth aspect of the present invention, in addition to any one of the first to fourth aspects, a through hole (240 to 246) for mounting a mounted component (234, 251, 256) is formed in the side frame (225A to 225D), and the plate thickness boundary line (L1, L2) is set so as to avoid the through hole (240 to 246). In accordance with the fifth aspect, since the plate thickness boundary line is set so as to avoid the through hole for mounting a mounted component, it is possible to avoid affecting the rigidity with which a mounted component is mounted on the side frame due to the plate thickness boundary line.

Furthermore, according to a sixth aspect of the present invention, in addition to any one of the first to fifth aspects, an airbag (251) is mounted on a site on the side frame (225A to 225D) that has a uniform plate thickness. In accordance with the sixth aspect, since the airbag is mounted on a site on the side frame that has a uniform plate thickness, it is possible to enhance the rigidity of the side frame in the site having a uniform plate thickness.

Furthermore, according to a seventh aspect of the present invention, in addition to the sixth aspect, a webbing (256)

that suppresses deployment of the airbag (251) is fixed to a site on the side frame (225A to 225D) having a uniform plate thickness. In accordance with the seventh aspect, since the webbing of the airbag is fixed to a site on the side frame having a uniform plate thickness, it is possible to suppress the influence on the plate thickness boundary line when the airbag is deployed.

Moreover, according to an eighth aspect of the present invention, in addition to any one of the first to seventh aspects, an auxiliary member (263) is fixed to the side frame (225A) of the seat back frame (216) while avoiding the plate thickness boundary line (L2), the auxiliary member (263) being capable of receiving a load from an occupant when the occupant is seated. In accordance with the eighth aspect, since the auxiliary member, which has a possibility of receiving a load from an occupant in a seated state, is fixed to a position, avoiding the plate thickness boundary line, of the side frame of the seat back frame, it is possible to suppress the influence of a load from the auxiliary member on part of the plate thickness boundary line of the side frame.

Furthermore, according to a ninth aspect of the present invention, in addition to the first to eighth aspects, a pressure-receiving member (234) is mounted at a position of the side frame (225A to 225D) that avoids the plate thickness boundary line (L1, L2), the pressure-receiving member (234) undergoing elastic deformation by receiving a load of a seated person. In accordance with the ninth aspect, since the pressure-receiving member, which undergoes elastic deformation by receiving a load of a seated person, is mounted at a position of the side frame that avoids the plate thickness boundary line, it is possible to suppress the influence of a load from the pressure-receiving member on part of the plate thickness boundary line of the side frame.

Solution Means for Third Problem and Effects Thereof

In order to achieve the third object, according to a first aspect of the present invention, there is provided a vehicle seat device in which a seat cushion frame (315) and a seat back frame (316) that is linked to the seat cushion frame (315) each comprise a pair of side frames (318, 325A, 325B, 325C, 325D) that are arranged at positions spaced from each other and extend linearly while integrally having a side plate portion (318a, 325a) and a collar portion (318b, 318c; 325b, 325c, 325d) that protrudes sideways from an outer edge of the side plate portion (318a, 325a), characterized in that the side frame (318, 325A to 325D) of at least one of the seat cushion frame (315) and the seat back frame (316) is formed so as to have a reference plate thickness (ta2, ta1) for a reference plate thickness region (A2, A1) that includes at least the side plate portion (318a, 325a) and an increased plate thickness (tb2, tb1) that is thicker than the reference plate thickness (ta2, ta1) for a plate thickness increase region (B2, B1) that includes at least the collar portion (318b, 318c: 325b, 325c, 325d), the plate thickness being changed between the reference plate thickness region (A2, A1) and the plate thickness increase region (B2, B1). In accordance with the first aspect, due to a part, which includes at least the collar portion, of the side frame of at least one of the seat cushion frame and the seat back frame being thick, it becomes possible to enhance the rigidity of the side frame while minimizing any increase in the weight of the side frame.

Furthermore, according to a second aspect of the present invention, in addition to the first aspect, the plate thickness increase region (B2, B1) is set so as to include a section of the outer edge of the side plate portion (318a, 325a) that is integrally connected as a bent shape to the collar portion (318b, 318c: 325b to 325d). In accordance with the second aspect, due to the plate thickness increase region being set so as to include a section that is part of the outer edge of the side plate portion and is integrally connected as a bent shape to the collar portion, it is possible to enhance the rigidity of the side frame.

Moreover, according to a third aspect of the present invention, in addition to the first or second aspect, part of the plate thickness increase region (B1) is determined by surrounding a mounted component (330) mounted on the side plate portion (325a) from three directions. In accordance with the third aspect, due to a range surrounding, from three directions, the mounting part of the mounted component, via which it is mounted on the side plate portion, being formed so as to be thick, it is possible to enhance the rigidity of the mounting part.

Furthermore, according to a fourth aspect of the present invention, in addition to any one of the first to third aspects, a reclining unit mounting part (332) is provided on the side plate portion (325a) of the side frame (325A to 325D) of the seat back frame (316), the reclining unit mounting part (332) being for mounting a reclining unit (330) that enables the angle of the seat back frame (316) with respect to the seat cushion frame (315) to be adjusted, and the reclining unit mounting part (332) is formed so as to be thicker than the increased plate thickness (tb1) of the plate thickness increase region (B1). In accordance with the fourth aspect, due to the reclining unit mounting part provided in order to mount the reclining unit on the side plate portion of the side frame of the seat back frame being thicker than the increased thickness of the plate thickness increase region, it is possible to improve the rigidity with which the reclining unit is mounted.

Moreover, according to a fifth aspect of the present invention, in addition to any one of the first to fourth aspects, a reinforcing part (337, 367) that bulges either inward or outward is provided on part of a section of the side plate portion (325a) that is included in the plate thickness increase region (B1). In accordance with the fifth aspect, since the reinforcing part, which bulges either inward or outward, is provided on part of the side plate portion in the section, which is included in the plate thickness increase region, it is possible to further enhance the rigidity of the side plate portion.

Furthermore, according to a sixth aspect of the present invention, in addition to any one of the first to fifth aspects, a reinforcing part (338, 339) that provides a link between sections of the plate thickness increase region (B1) that are separate from each other is provided on the side plate portion (325a). In accordance with the sixth aspect, since sections of the plate thickness increase region that are separate from each other are linked by the reinforcing part, the rigidity of the side frame is further improved.

Moreover, according to a seventh aspect of the present invention, in addition to any one of the first to sixth aspects, a through hole (340 to 346) is formed in a section of the side plate portion (325a) that is included in the reference plate thickness region (A1). In accordance with the seventh aspect, since the through hole is formed in the side plate portion in the reference plate thickness region, it is possible to enhance the precision with which the through hole is machined.

Solution Means for Fourth Problem and Effects Thereof

In order to achieve the fourth object, according to a first aspect of the present invention, there is provided a vehicle seat (411) comprising a seat back frame (425) having left and right side frames (435) that have a plate-shaped portion (435a) spreading along a vertical plane orthogonal to a rotational axis (SX) around a rotating shaft and extending upward along the vertical plane, a front wall (435b) formed so as to bend inward continuously from a front edge of the plate-shaped portion (435a) and forming a curved region (438) extending vertically from around the rotating shaft, and a rear wall (435c) formed so as to bend inward continuously from a rear edge of the plate-shaped portion (435a) and forming a curved region (439) extending vertically from around the rotating shaft, a lower frame (436) that is joined to the rear wall (435c) from the rear so as to be disposed to the rear of the rotational axis (SX) and has a back region (451) providing a link between the left and right side frames (435), and an upper frame (437) that provides a link between the left and right side frames (435) above the lower frame (436), characterized in that the lower frame (436) has a reinforcing region (452) that spreads further forward than the rotational axis (SX) while being continuous from a lower edge of the back region (451) and is joined to the front wall (435b) from the rear. In accordance with the first aspect, since the lower frame is joined to individual side frames via, in addition to the back region, the reinforcing region, which spreads further forward than the rotational axis from the lower edge of the back region, it is possible to enhance the torsional rigidity of the seat back frame. Compared with a case in which the lower frame is joined to the side frame only via the back region, the strength with which the lower frame and the side frame are joined can be reduced. In this way, the work load for joining can be lightened. Moreover, when assembling the seat back frame, the lower frame can be assembled onto the side frame from the rear. The side frame can be assembled onto the lower frame from one direction. The ease of assembly is not impaired.

Furthermore, according to a second aspect of the present invention, in addition to the first aspect, the side frame (435) has a space (459) formed between the front wall (435b) and the rear wall (435c) along a peripheral edge of the plate-shaped portion (435a) around the rotating shaft. In accordance with the second aspect, since the front wall, which is formed so as to be bent along the peripheral edge of the plate-shaped portion around the rotating shaft, and the rear wall, which is formed so as to be bent along the peripheral edge of the plate-shaped portion around the rotating shaft, are separated by a space, when subjecting the side frame to drawing, compared with a case in which the front wall and the rear wall are continuous around the rotating shaft, the precision of the shape of the front wall and the rear wall is enhanced. The ease of assembly of the side frame onto the lower frame is therefore stable.

Moreover, according to a third aspect of the present invention, in addition to the first or second aspect, the vehicle seat further comprises a reclining mechanism (434) that is individually mounted on the side frame (435) and provides a link between a seat cushion frame (424) and the seat back frame (425) so as to be rotatable around the rotational axis (SX), and a linking member (445) that provides a link between the reclining mechanisms (434) on the left and right, the back region (451) of the lower frame (436) has an opening (456) formed therein, the opening (456) allowing a jig (504) to pass through when assembling the seat back frame (425), and an angular body (458) is formed on the linking member (445), the angular body (458) being disposed in front of the opening (456) and retained by the jig (504). In accordance with the third aspect, when assembling the seat back frame a jig can be inserted into the opening from the rear. The jig can retain the angular body of the linking member. In this way the linking member can be positioned with respect to left and right rotating bodies. The linking member can be joined to individual rotating bodies with good work efficiency.

Furthermore, according to a fourth aspect of the present invention, in addition to any one of the first to third aspects, a first receiving face (457) is formed on the back region (451) of the lower frame (436), the first receiving face (457) spreading within a first plane (Pf) and being supported from the rear, and a second receiving face (464) is formed on the rear wall (435c) of the side frame (435), the second receiving face (464) spreading within a second plane (Ps) that is set with a positional relationship determined with respect to the first plane (Pf), and the second receiving face (464) positioning the side frame (435) with respect to the lower frame (436) when supported from the rear. In accordance with the fourth aspect, when assembling the seat back frame the lower frame can be physically supported by the first receiving face. If the side frame is physically supported by the second receiving face, the side frame can be positioned with respect to the lower frame based on the positional relationship of the first plane and the second plane. The side frame can easily be positioned with respect to the lower frame.

Moreover, according to a fifth aspect of the present invention, in addition to any one of the first to third aspects, the upper frame (437) is formed by bending a plate material and has a front wall (469) that is partitioned by an upper ridge line (467) and lower ridge line (468) extending in a horizontal direction, an upper wall (471) that spreads rearward continuously from the upper ridge line (467), an upper standing wall (472) that is formed so as to be bent upward from a rear end of the upper wall (471) and is joined to the rear wall (435c) from the front, a lower wall (473) that spreads rearward continuously from the lower ridge line (468), and a lower standing wall (474) that is formed so as to be bent downward from a rear end of the lower wall (473) and is joined to the rear wall (435c) from the front, an inner edge of the front wall (435b) having a projecting piece (483) that spreads inward from a virtual outline (483a) corresponding to a shape of the upper frame (437) and being superimposed on the front wall (469) from the rear. In accordance with the fifth aspect, the upper frame can be assembled from the front onto the left and right side frames spaced apart at the time of assembly. In this process, the front wall of the side frame will not interfere with the upper standing wall and the lower standing wall positioned further rearward than the front wall in the upper frame. In this way, when assembling the upper frame the work efficiency can be improved.

Furthermore, according to a sixth aspect of the present invention, in addition to the fifth aspect, the front wall (469) has a linking piece (469a) that is formed so as to be bent forward at two, that is, left and right, positions in the horizontal direction, forms a depression along a vertical valley fold line (477), and extends toward the projecting piece (483), and a reinforcing shape (493) is formed in the depression, the reinforcing shape (493) extending while intersecting the valley fold line (477) and reinforcing the rigidity in a bending direction. In accordance with the sixth aspect, in the front wall the rigidity against bending along the valley fold line can be enhanced. Therefore, when assembling the upper frame deformation of the upper frame can be suppressed. The work efficiency of assembly can be enhanced.

Moreover, according to a seventh aspect of the present invention, in addition to the fifth or sixth aspect, coaxial through holes (487, 488) for retaining a headrest pillar (421) are formed in the upper wall (471) and the lower wall (473), and a reinforcing shape (494) is formed on the front wall (469), the reinforcing shape (494) extending while intersecting the headrest pillar (421) when viewed from the front and reinforcing the rigidity in an in-plane direction. In accordance with the seventh aspect, the rigidity of the front wall can be enhanced where it corresponds to the through holes of the upper wall and the lower wall. It is therefore possible to suppress deformation of the upper frame when assembling the upper frame. The work efficiency of assembly can be enhanced.

Furthermore, according to an eighth aspect of the present invention, in addition to the fifth or sixth aspect, coaxial through holes (487, 488) for retaining a headrest pillar (421) are formed in the upper wall (471) and the lower wall (473), a flange (475) is formed on the upper standing wall (472), the flange (475) being formed so as to be bent forward continuously from an upper end of the upper standing wall (472), and a receiving piece (492) is formed on the flange (475) to the rear of the through hole (487, 488), the receiving piece (492) being formed so as to be bent upward or downward continuously from a front edge of the flange (475). In accordance with the eighth aspect, the rigidity of the front wall can be enhanced where it corresponds to the through holes of the upper wall and the lower wall. Therefore, when assembling the upper frame, deformation of the upper frame can be suppressed. The work efficiency of assembly can be enhanced.

Moreover, according to a ninth aspect of the present invention, in addition to the eighth aspect, a support tube (507) is fixed to the upper wall (471) and the lower wall (473), the support tube (507) being inserted into the through hole (488, 489) and supporting a headrest pillar guide (486) guiding the headrest pillar (421), and the receiving piece (492) supports the support tube (507) from the rear. In accordance with the ninth aspect, the rigidity of the front wall can be enhanced by cooperation between the support tube and the receiving piece. Therefore, when assembling the upper frame, deformation of the upper frame can be suppressed. The work efficiency of assembly can be enhanced.

Furthermore, according to a tenth aspect of the present invention, in addition to any one of the fifth to ninth aspects, a first receiving face (457) is formed on the back region (451) of the lower frame (436), the first receiving face (457) spreading within a first plane (Pf) and being supported from the rear, and a second receiving face (464) is formed on the rear wall (435c) of the side frame (435), the second receiving face (464) spreading within a second plane (Ps) that is set with a positional relationship determined with respect to the first plane (Pf), the second receiving face (464) positioning the side frame (435) with respect to the lower frame (436) when supported from the rear, and a third receiving face (496) is formed on the upper frame (437), the third receiving face (496) spreading within a third plane (Pt) that is set with a positional relationship determined with respect to the second plane (Ps) and positioning the upper frame (437) with respect to the side frame (435) when supported from the rear. In accordance with the tenth aspect, when assembling the seat back frame the lower frame can be physically supported by the first receiving face. When the side frame is physically supported by the second receiving face, the side frame can be positioned with respect to the lower frame based on the positional relationship of the first plane and the second plane. The side frame can easily be positioned with respect to the lower frame. When the upper frame is physically supported by the third receiving face, the upper frame can be positioned with respect to the side frame based on the positional relationship of the second plane and the third plane. The upper frame can easily be positioned with respect to the side frame.

BRIEF DESCRIPTION OF DRAWINGS

Explanation of Drawings showing Embodiments of Solution Means for First Problem

Explanation of Drawings Showing Embodiments of Solution Means for Second Problem

Explanation of Drawings Showing Embodiments of
Solution Means for Third Problem

Figure 25:
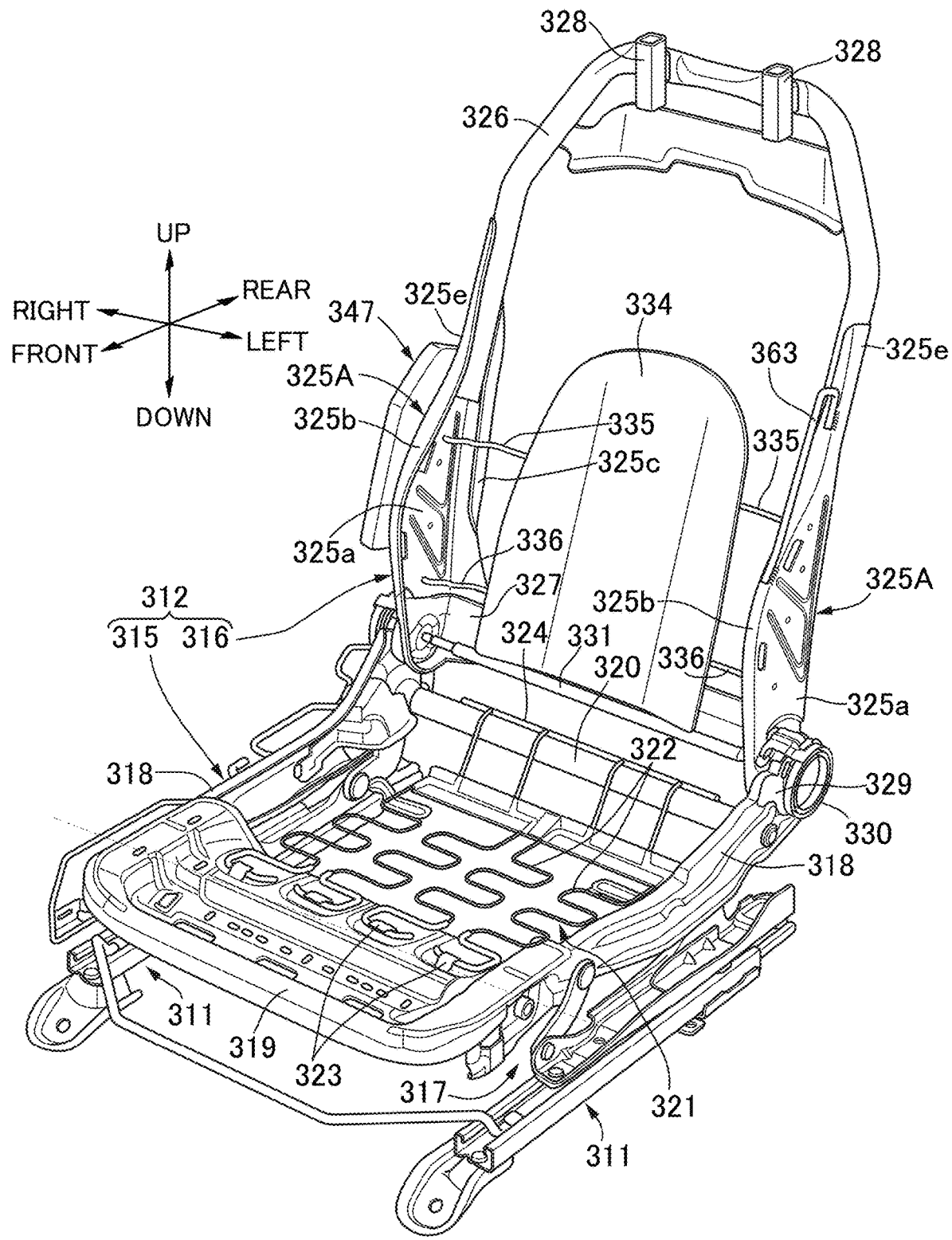
Figure 26:
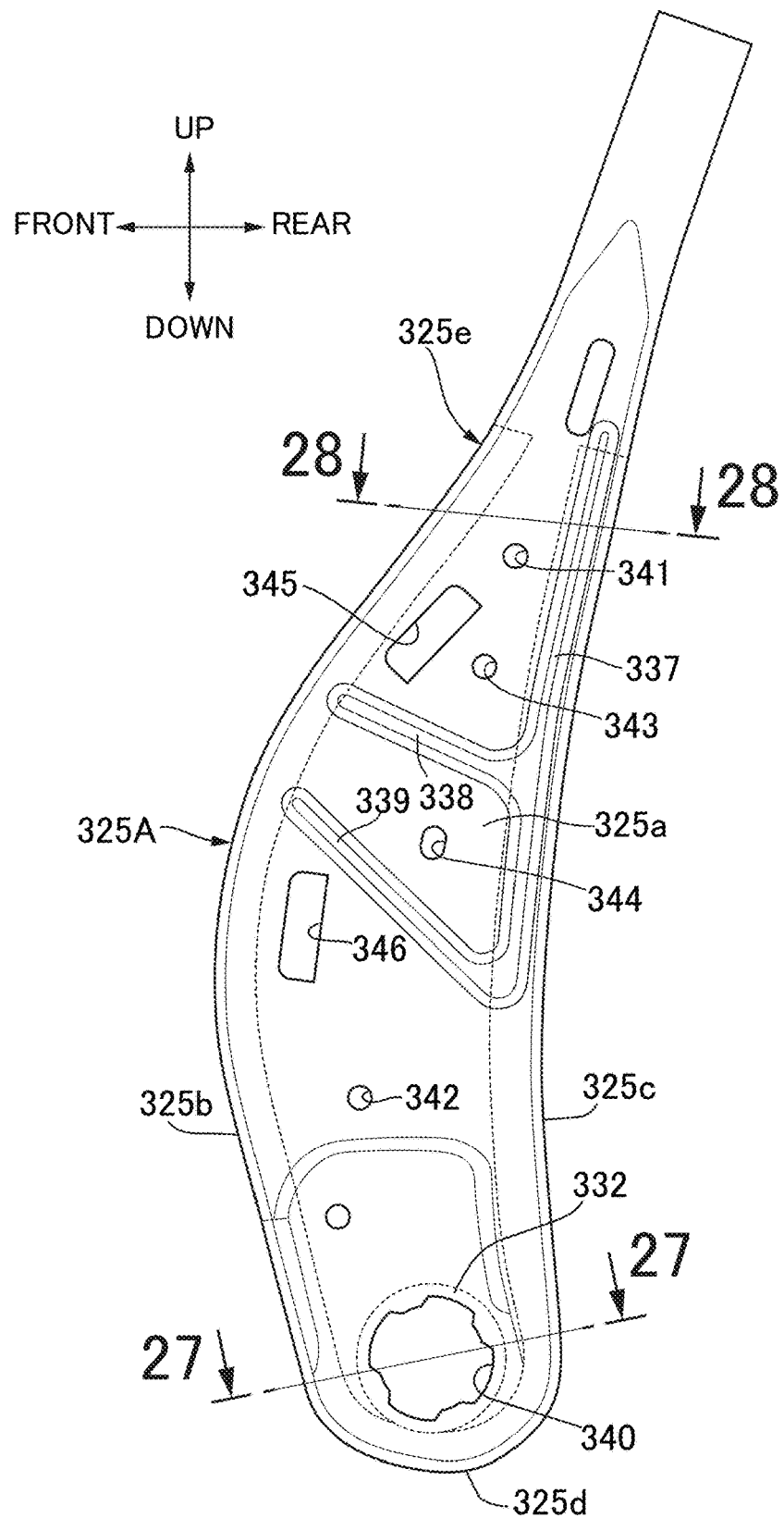
Figure 27:
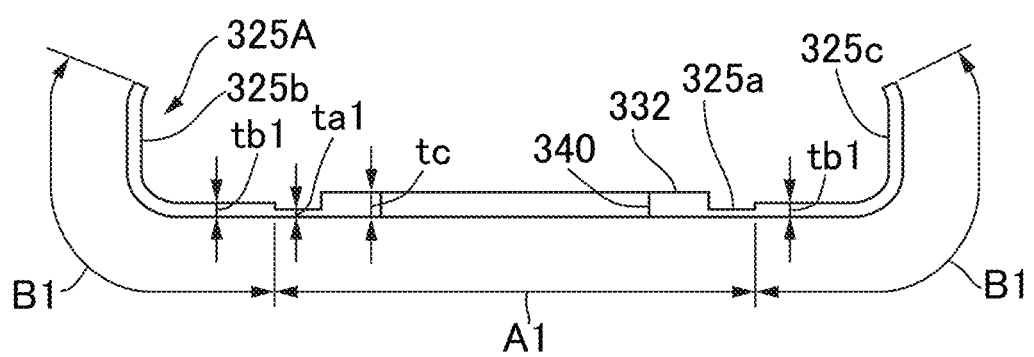
Figure 28:
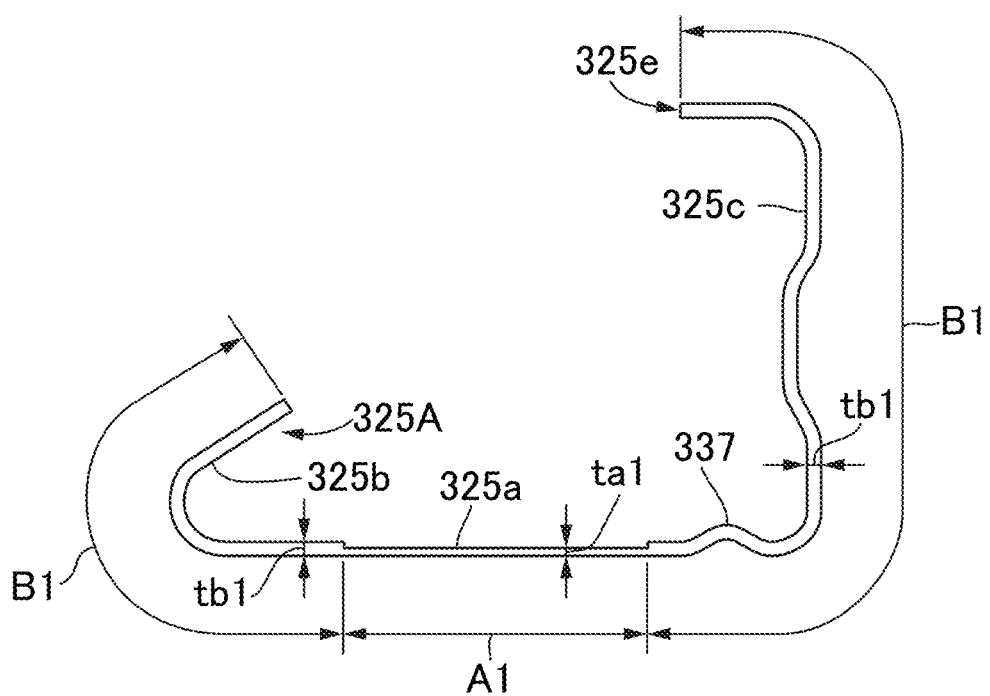
Figure 29:
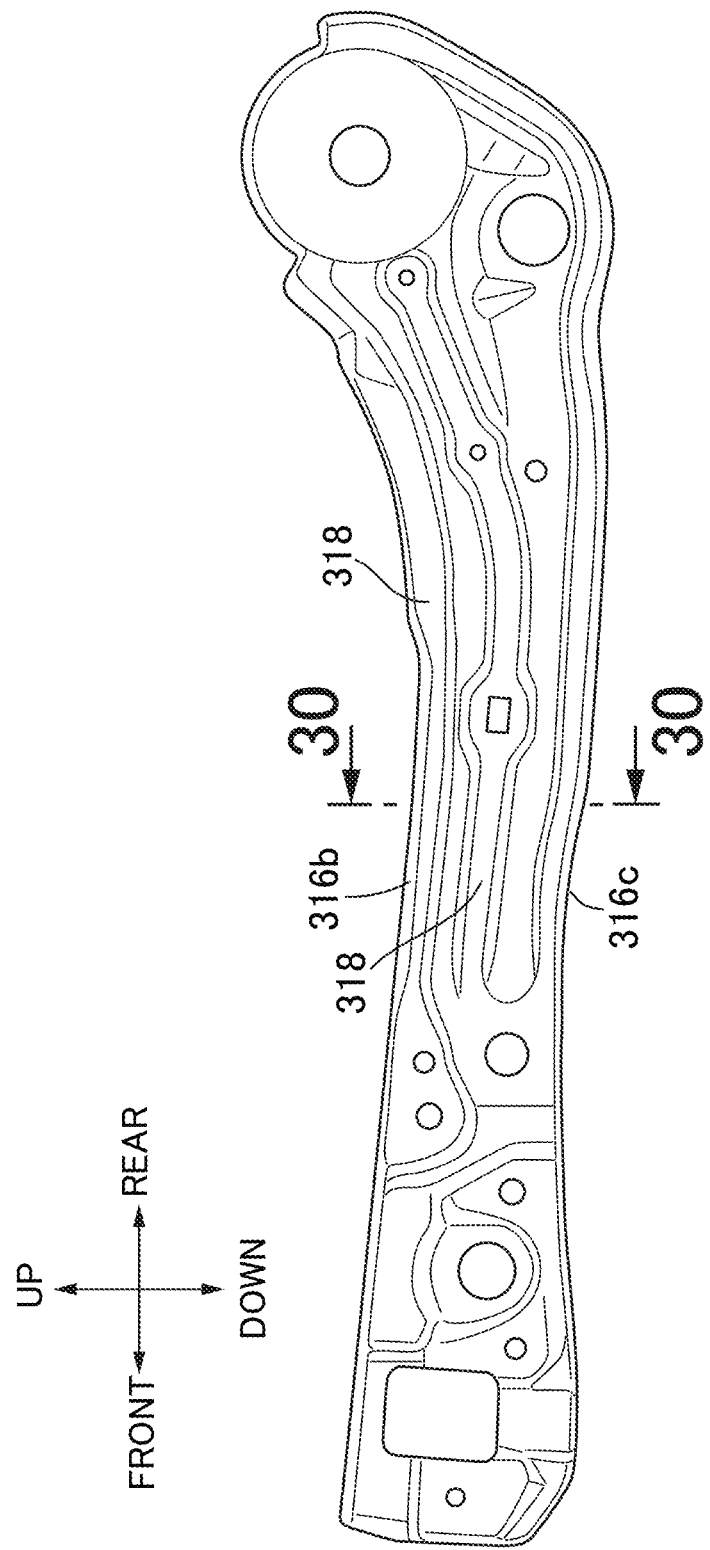
Figure 31:
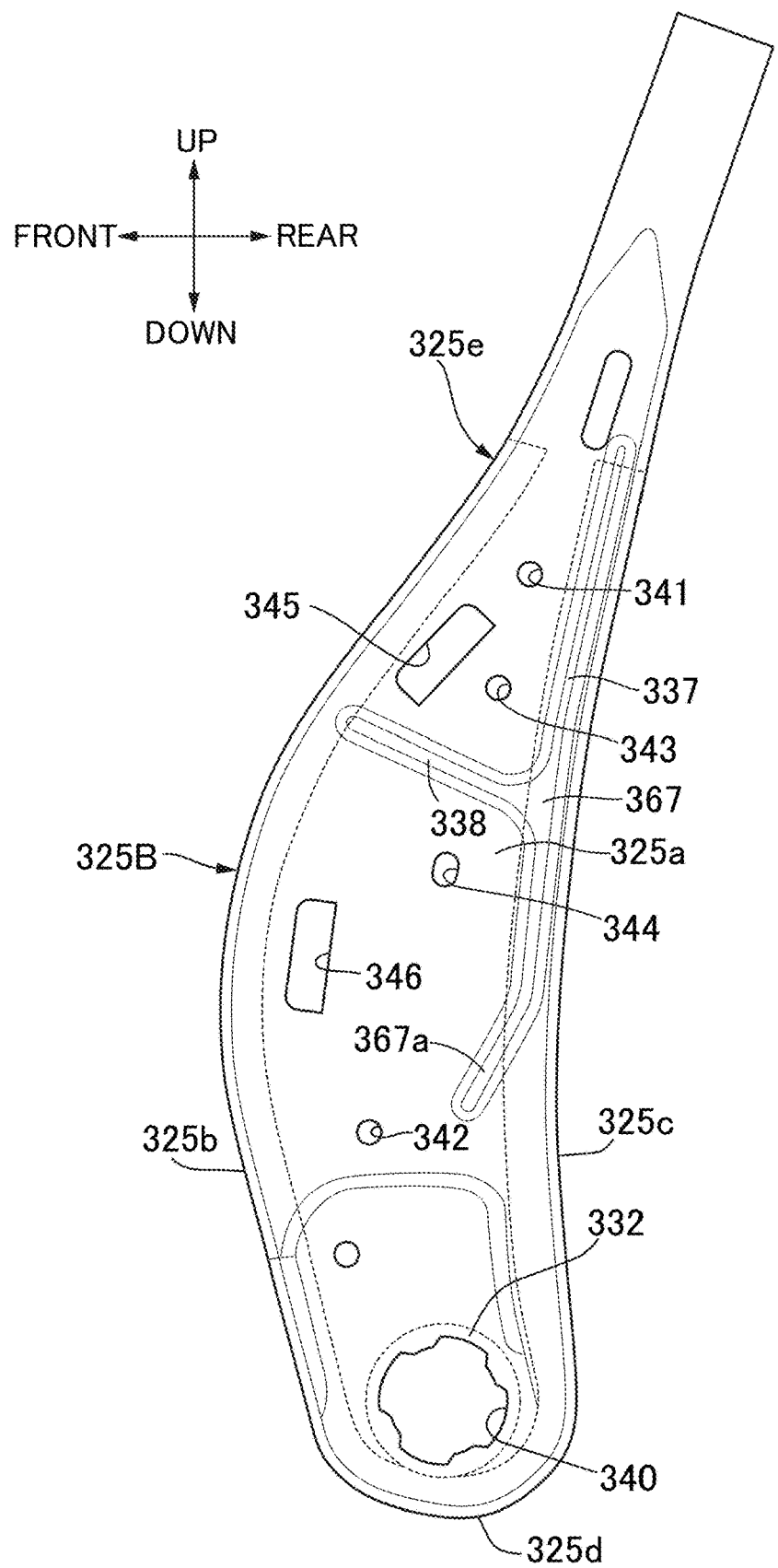
Figure 32:
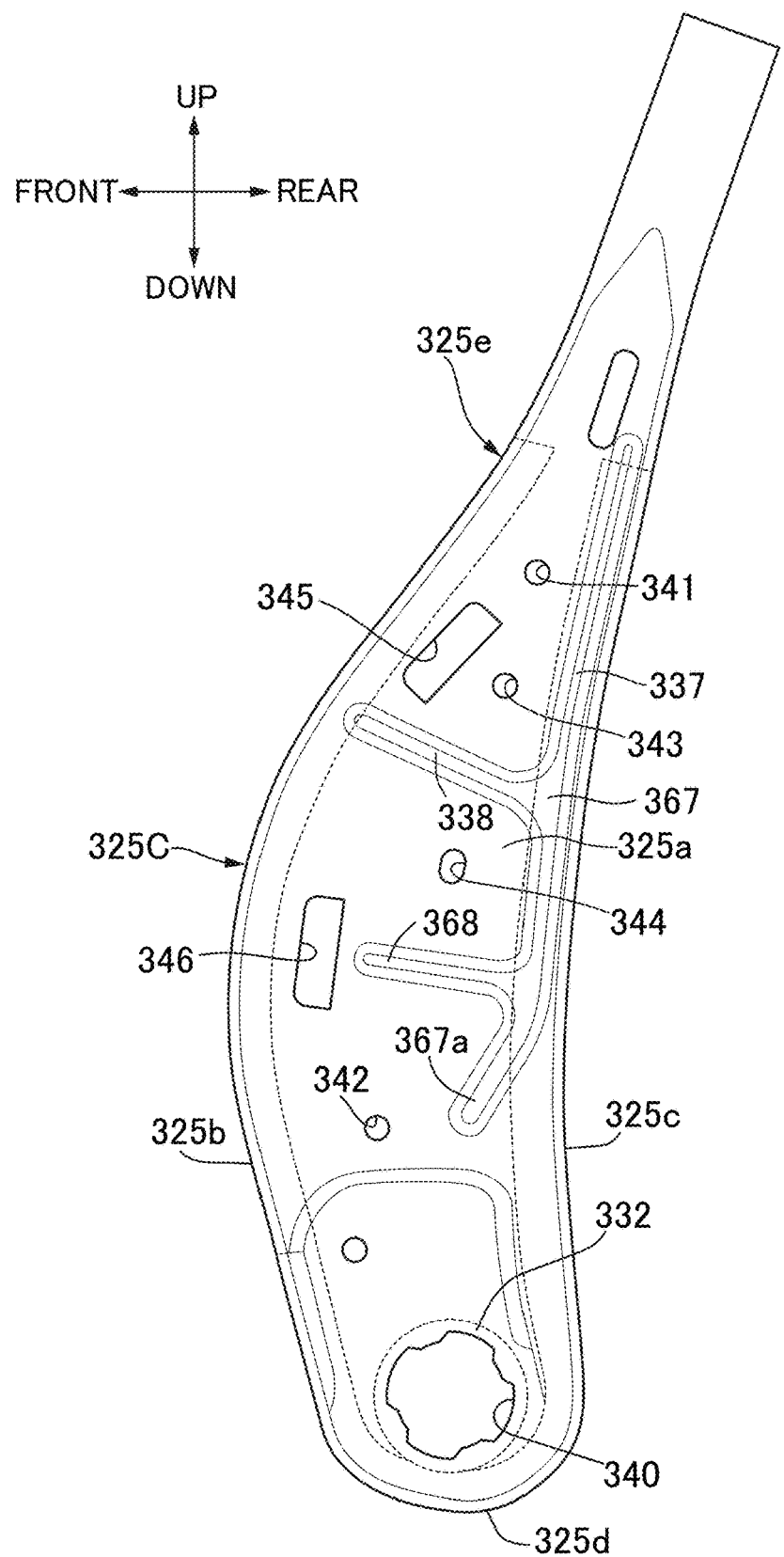
Figure 33:
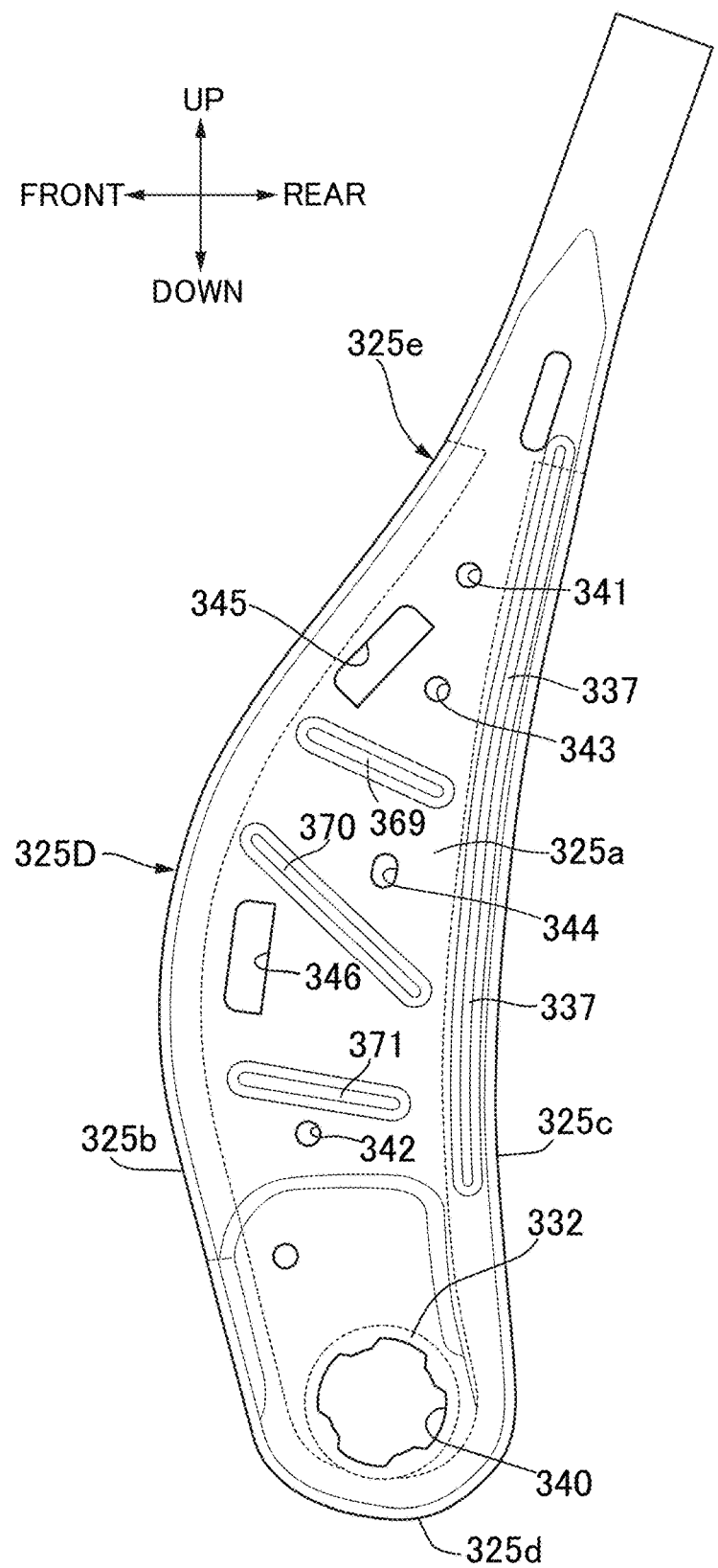
Figure 34:
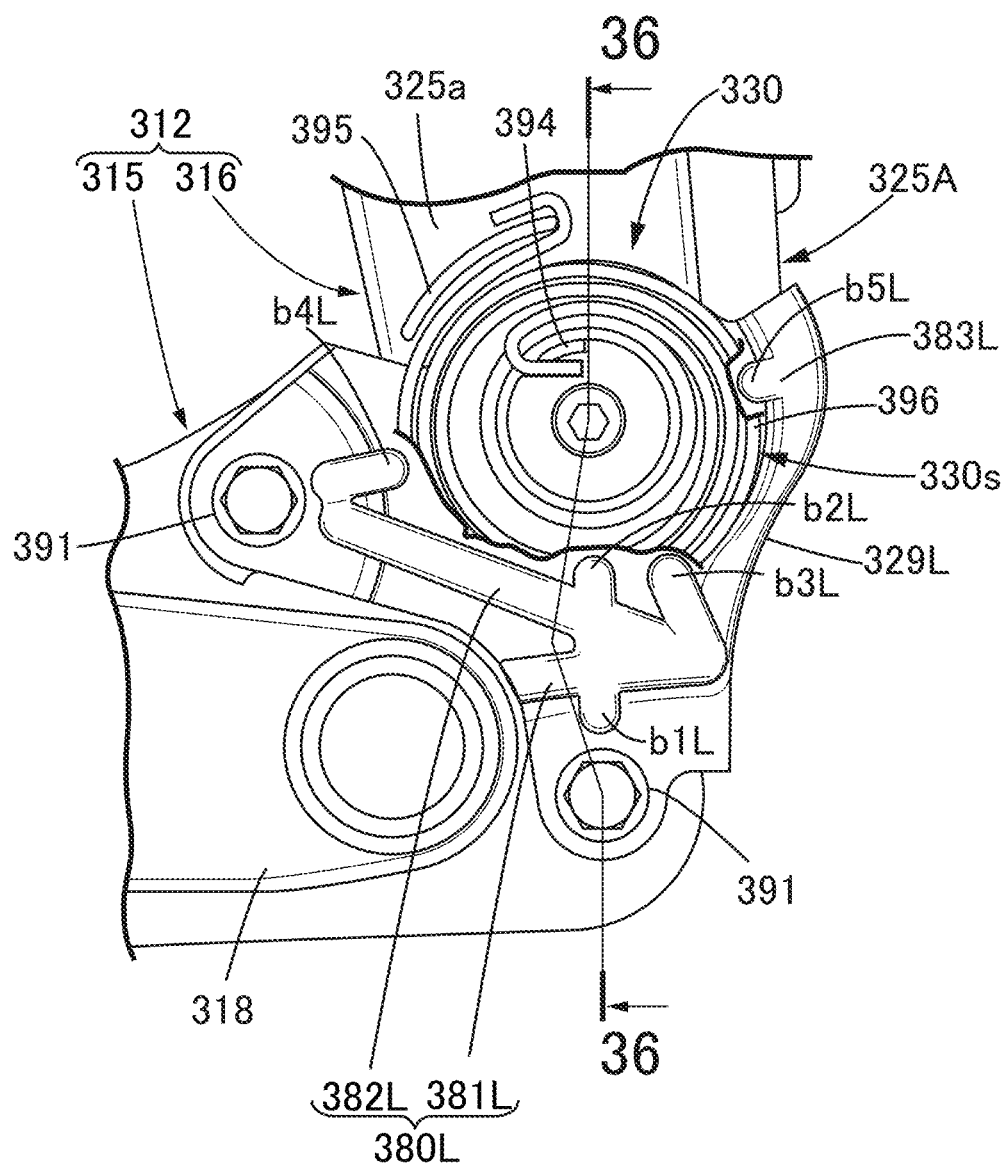
Figure 35:
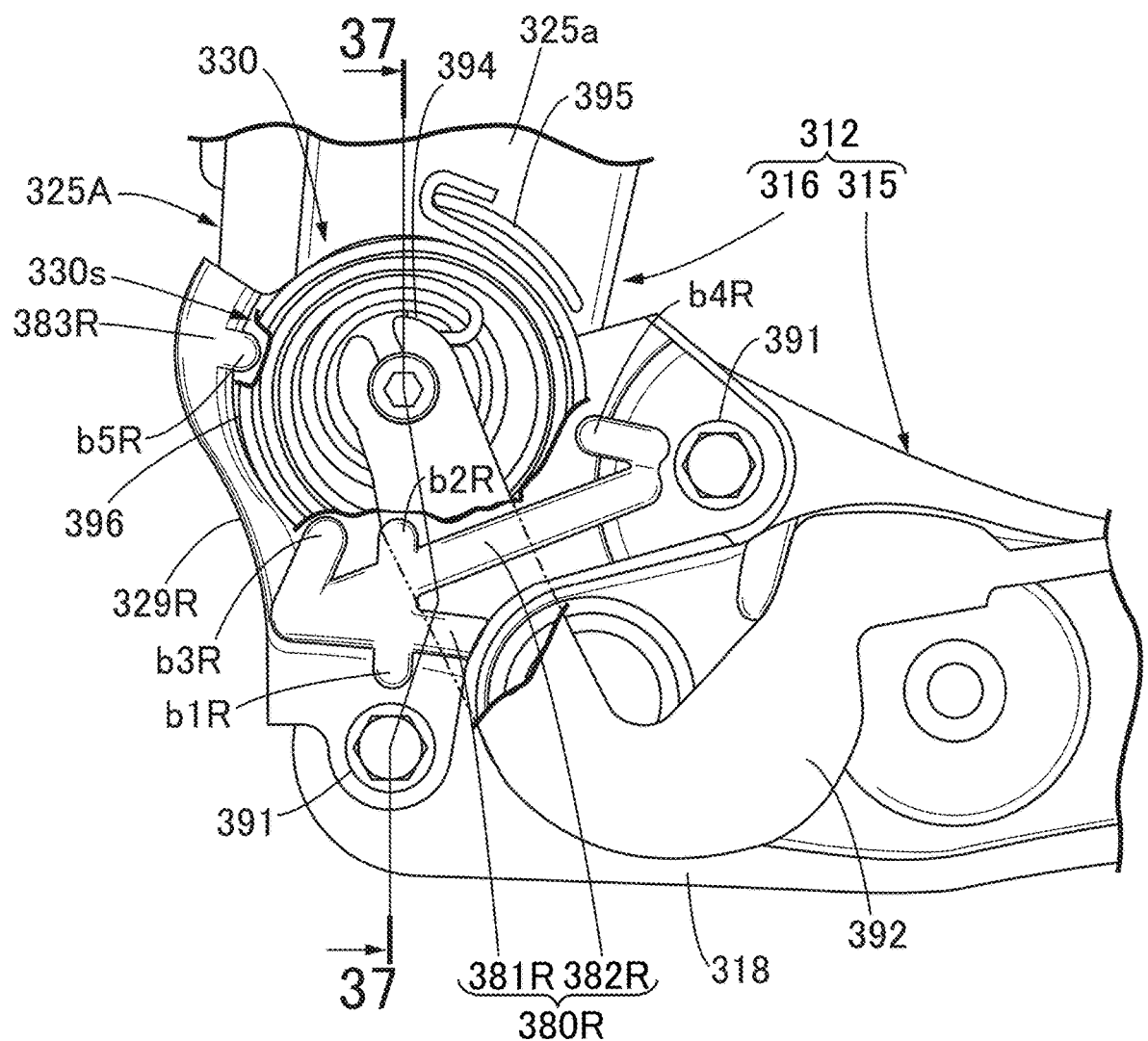
Figure 36:
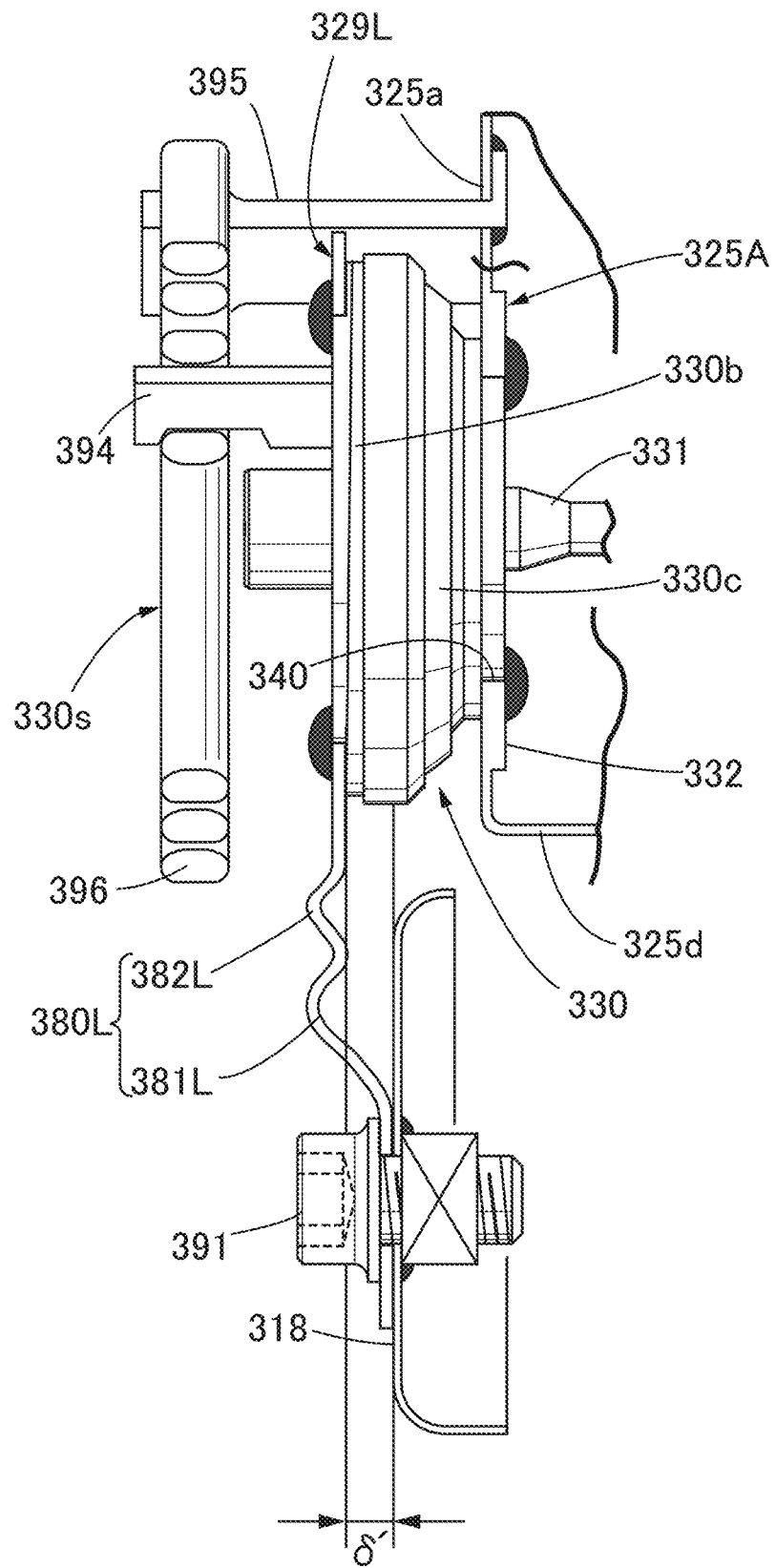
Figure 37:
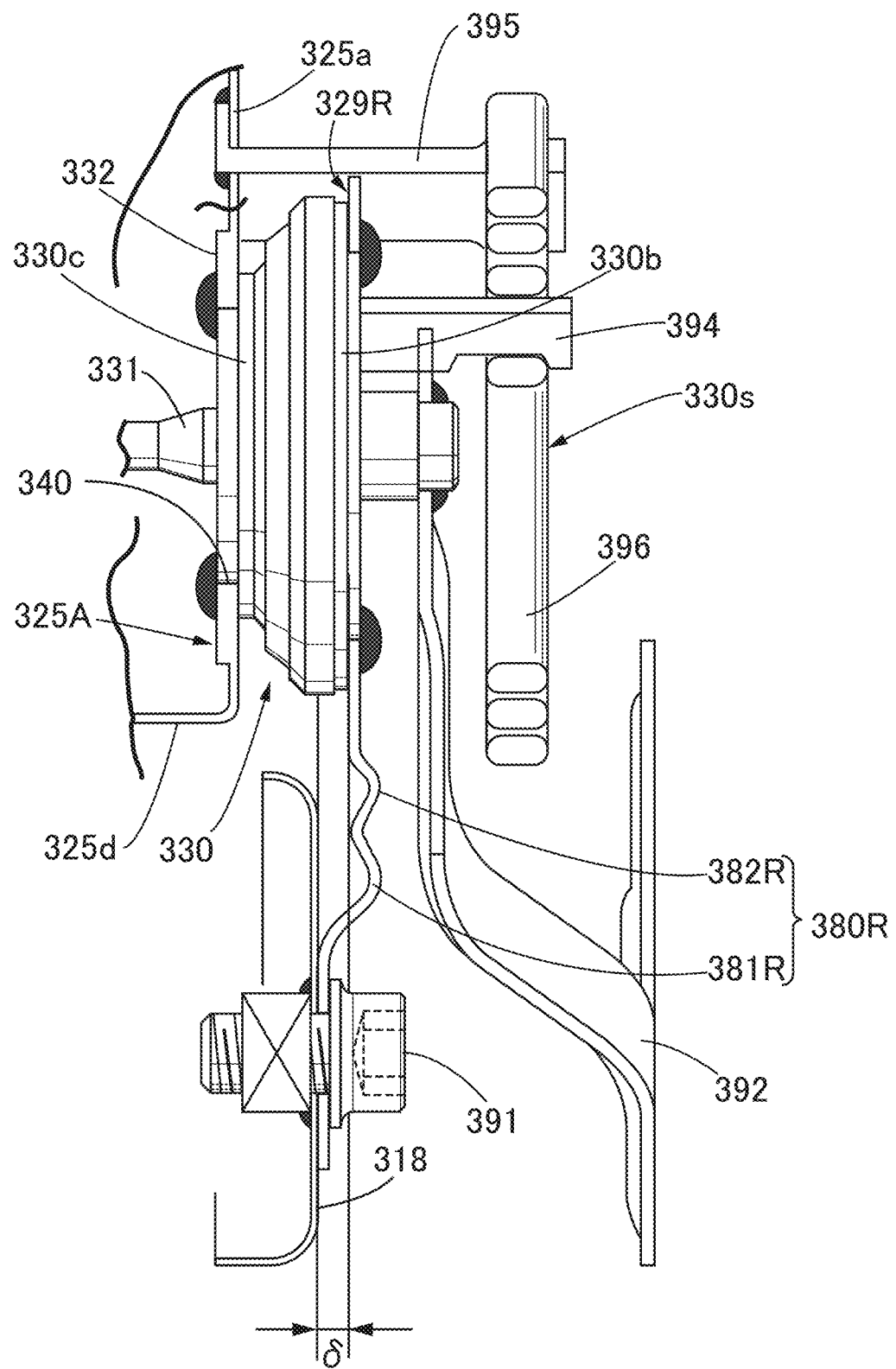

FIG. 25 is a perspective view of a seat frame of the first embodiment.
FIG. 26 is a side view of a seat back-side side frame.
FIG. 27 is a sectional view along line 27-27 in FIG. 26.
FIG. 28 is a sectional view along line 28-28 in FIG. 26.
FIG. 29 is a side view of a seat cushion-side side frame.
FIG. 30 is a sectional view along line 30-30 in FIG. 29.
FIG. 31 is a side view of a seat back-side side frame of the second embodiment.
FIG. 32 is a side view of a seat back-side side frame of the third embodiment.
FIG. 33 is a side view of a seat back-side side frame of the fourth embodiment.
FIG. 34 is a left side view showing a left-side reclining unit and the area therearound of the fifth embodiment.
FIG. 35 is a right side view showing a right reclining unit and the area therearound of the fifth embodiment.
FIG. 36 is an enlarged sectional view along line 36-36 in FIG. 34.
FIG. 37 is an enlarged sectional view along line 37-37 in FIG. 35.

Explanation of Drawings Showing Embodiment of
Solution Means for Fourth Problem

Figure 38:
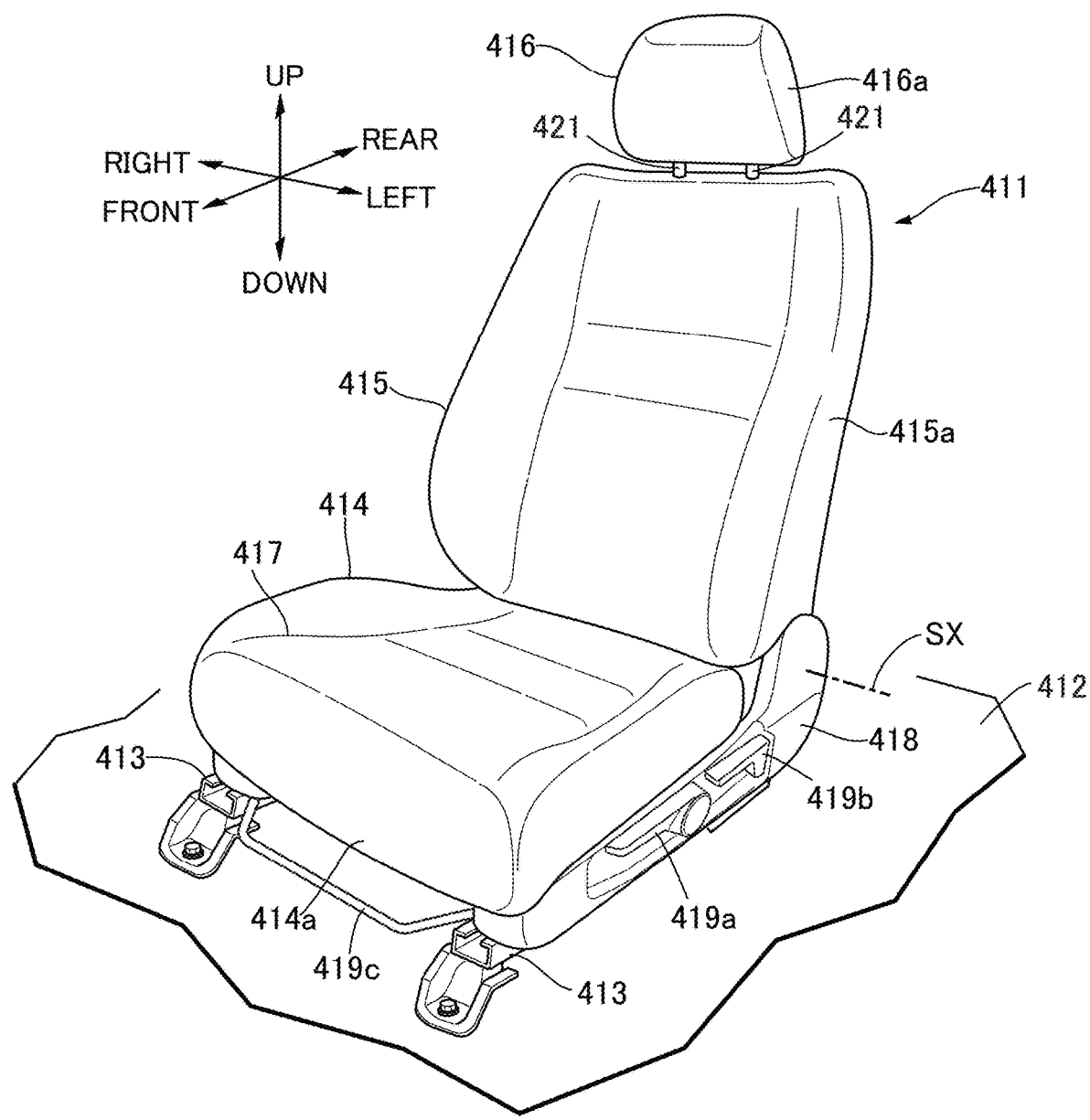
Figure 39:
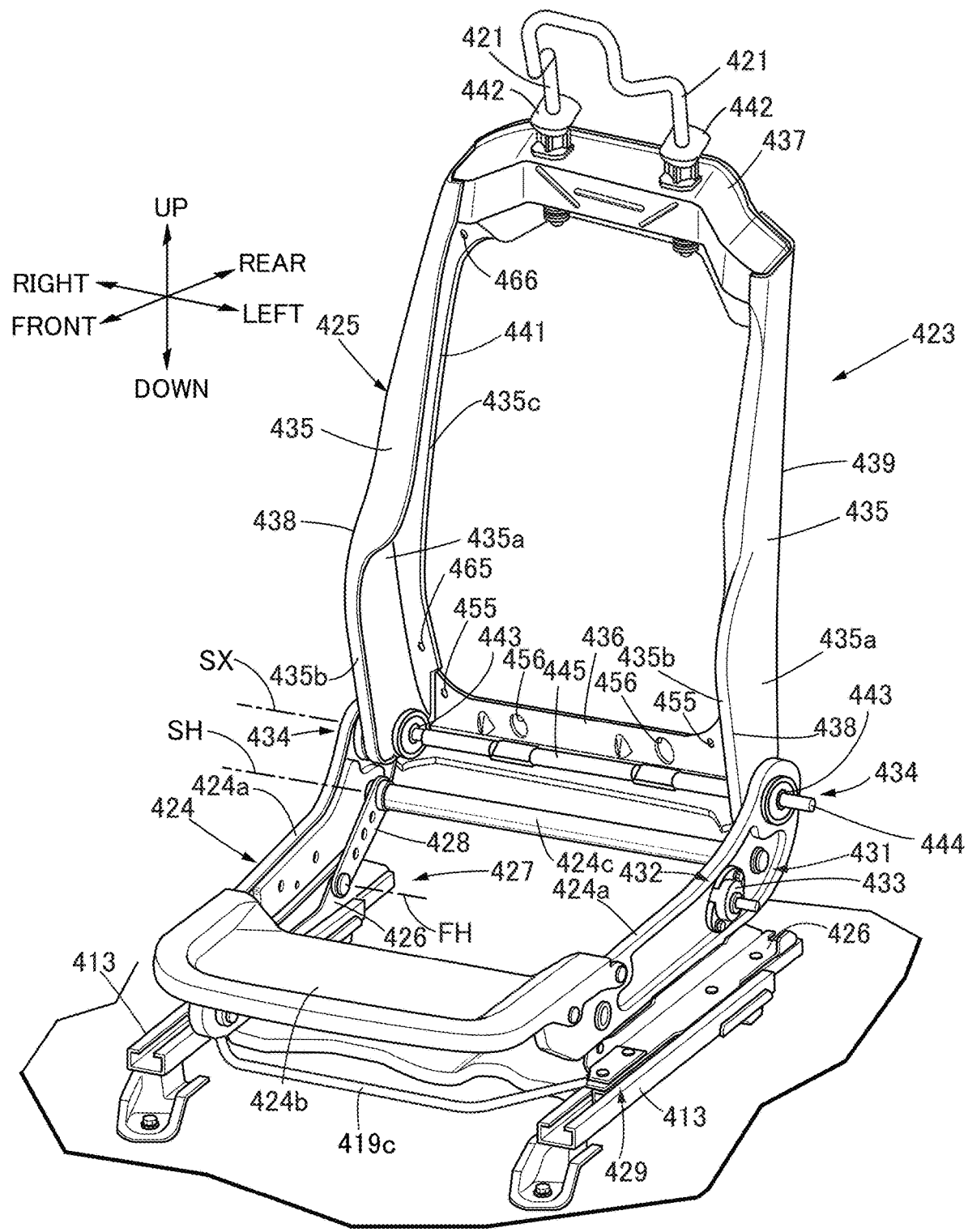
Figure 40:
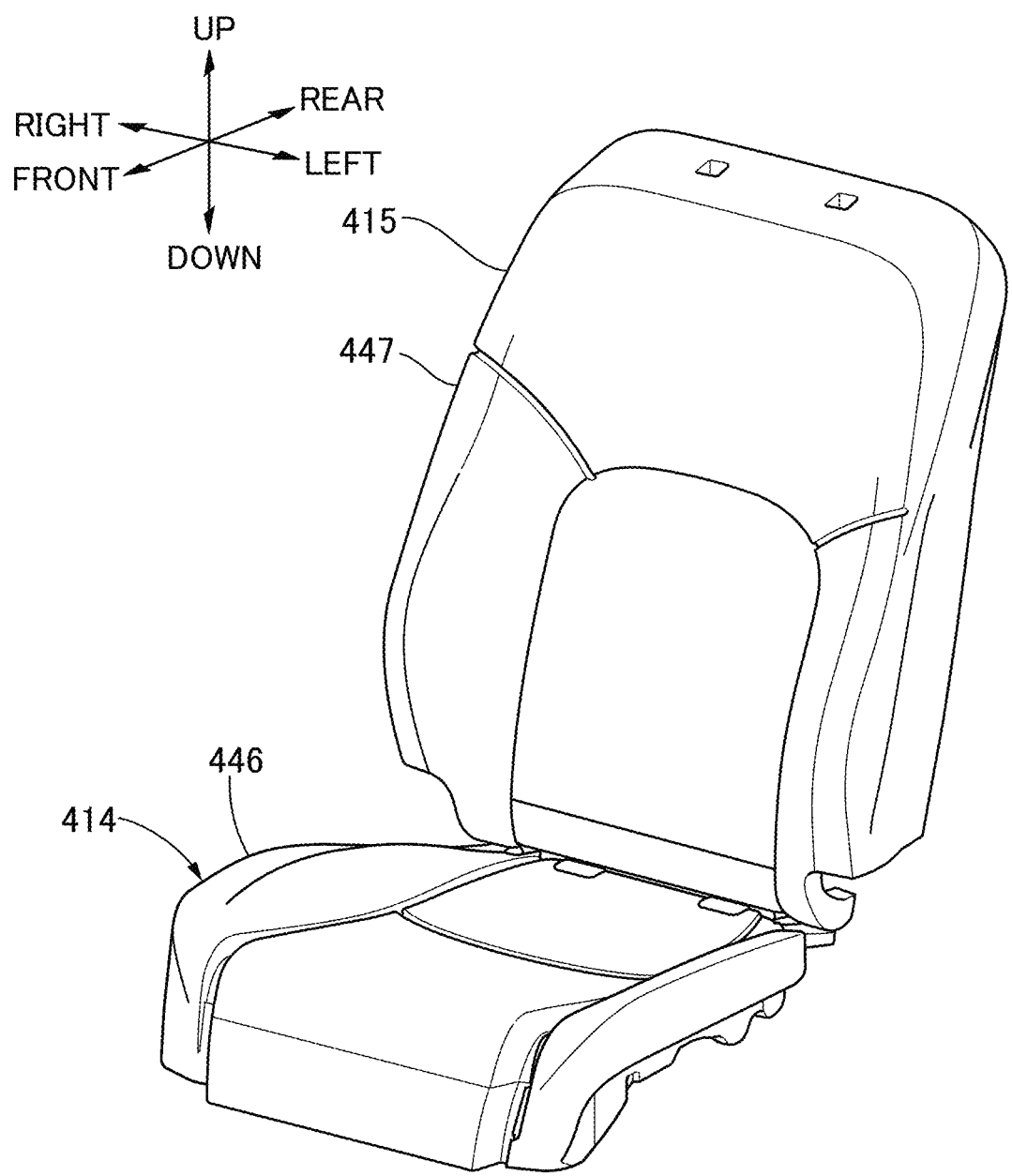
Figure 41:
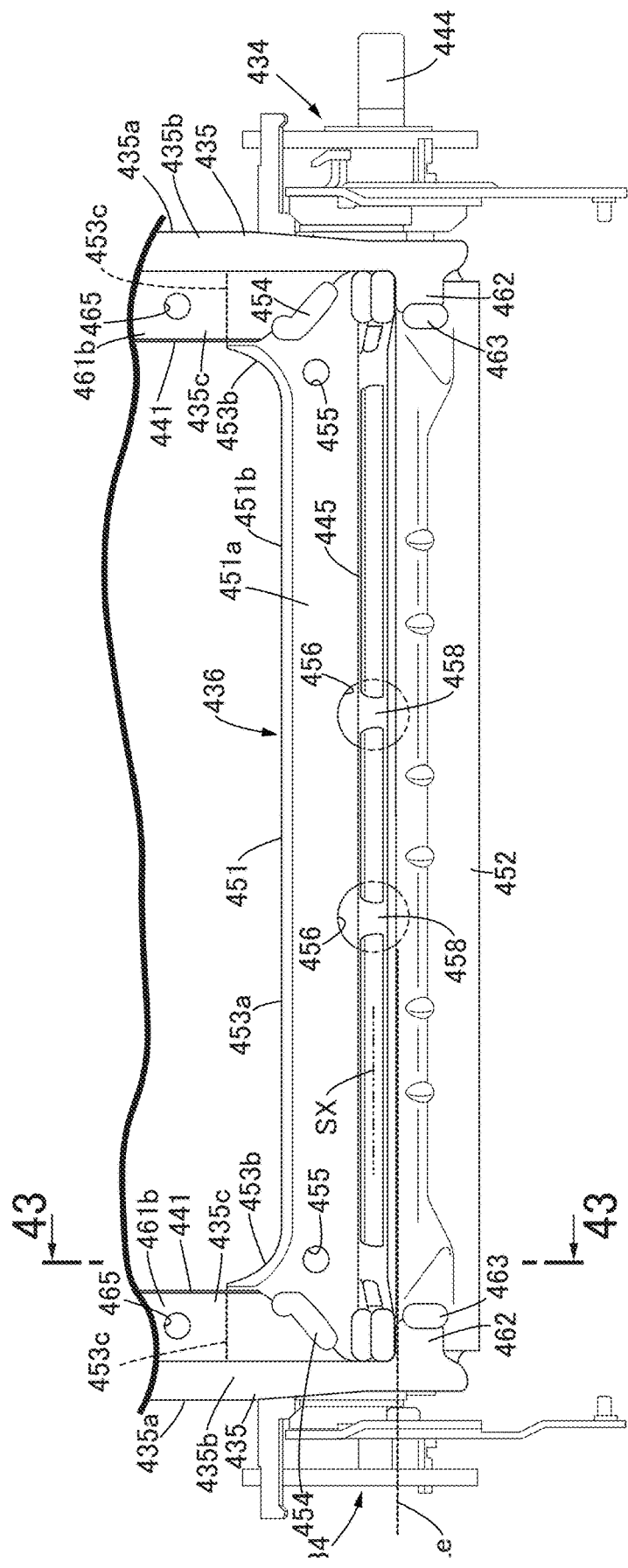
Figure 42:
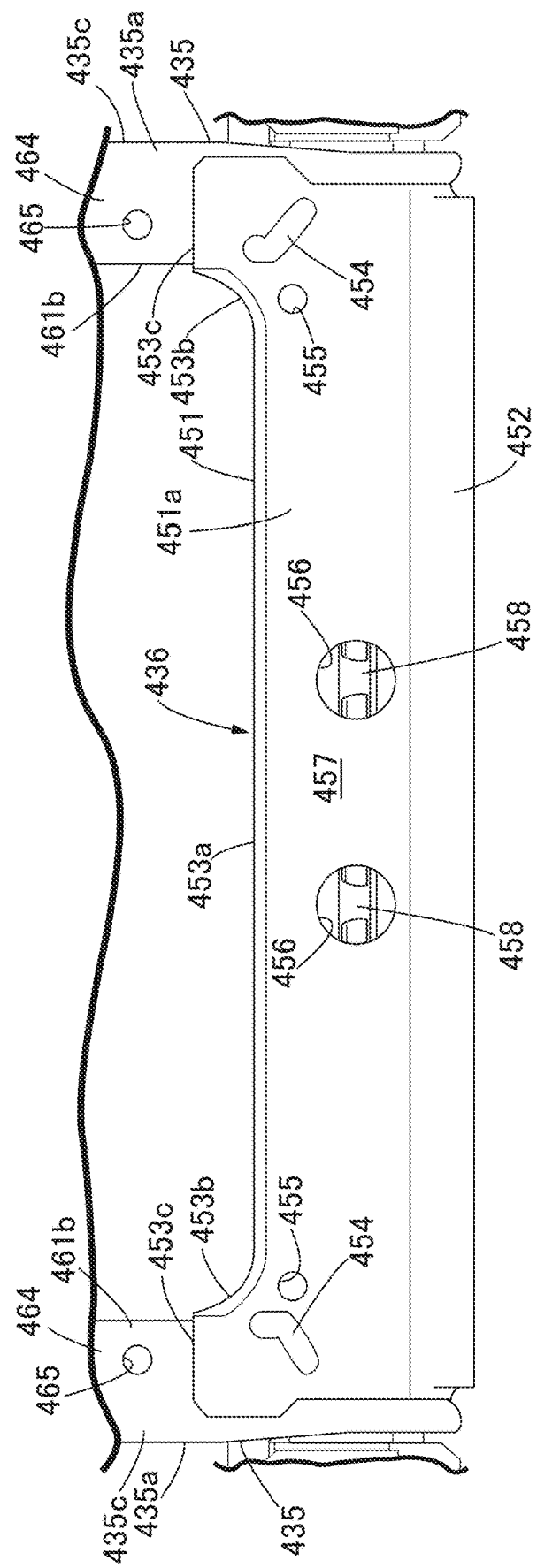
Figure 43:
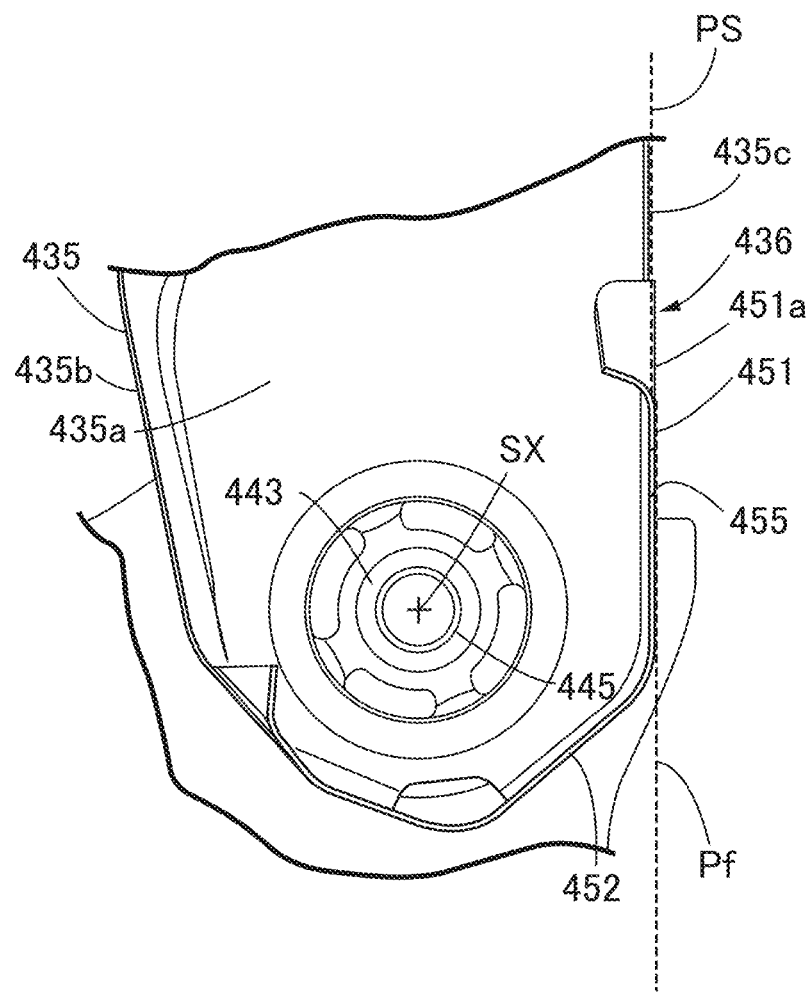
Figure 44:
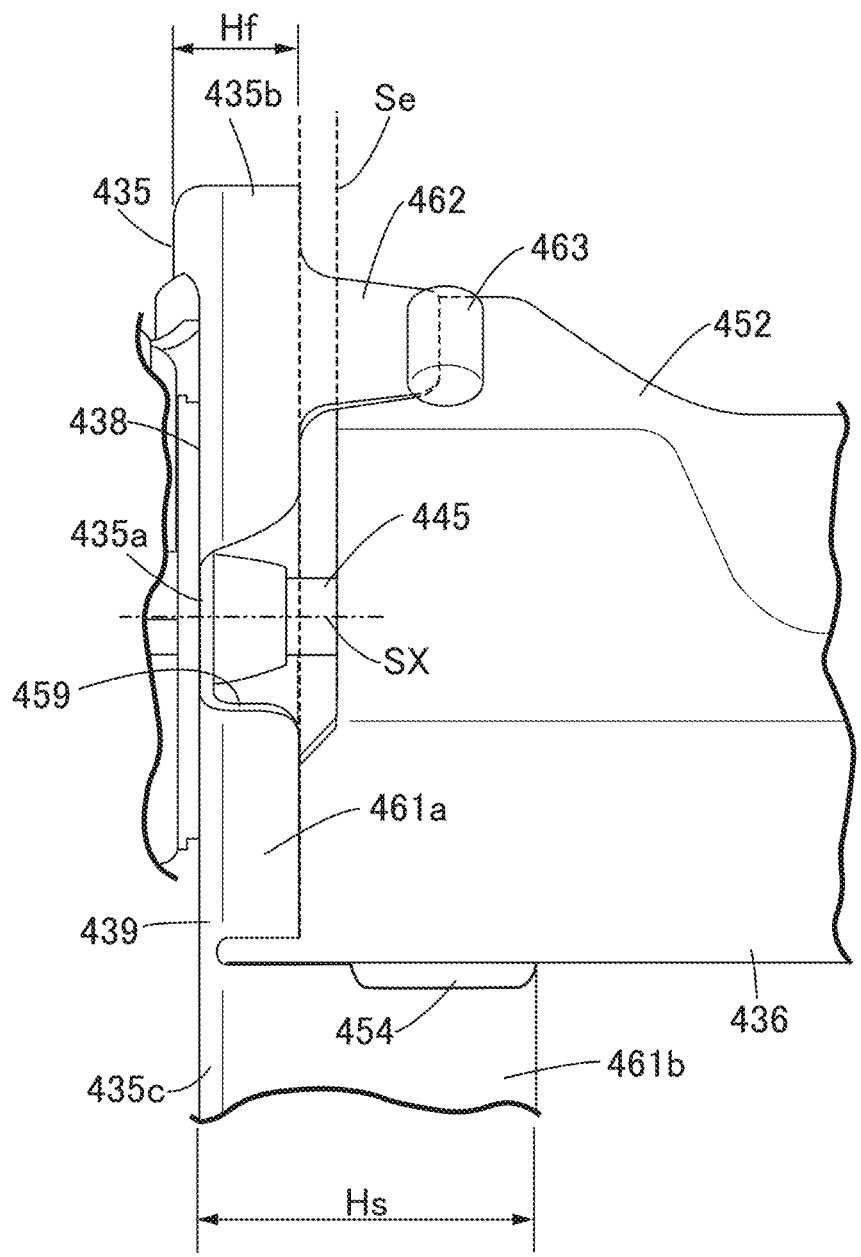
Figure 45:
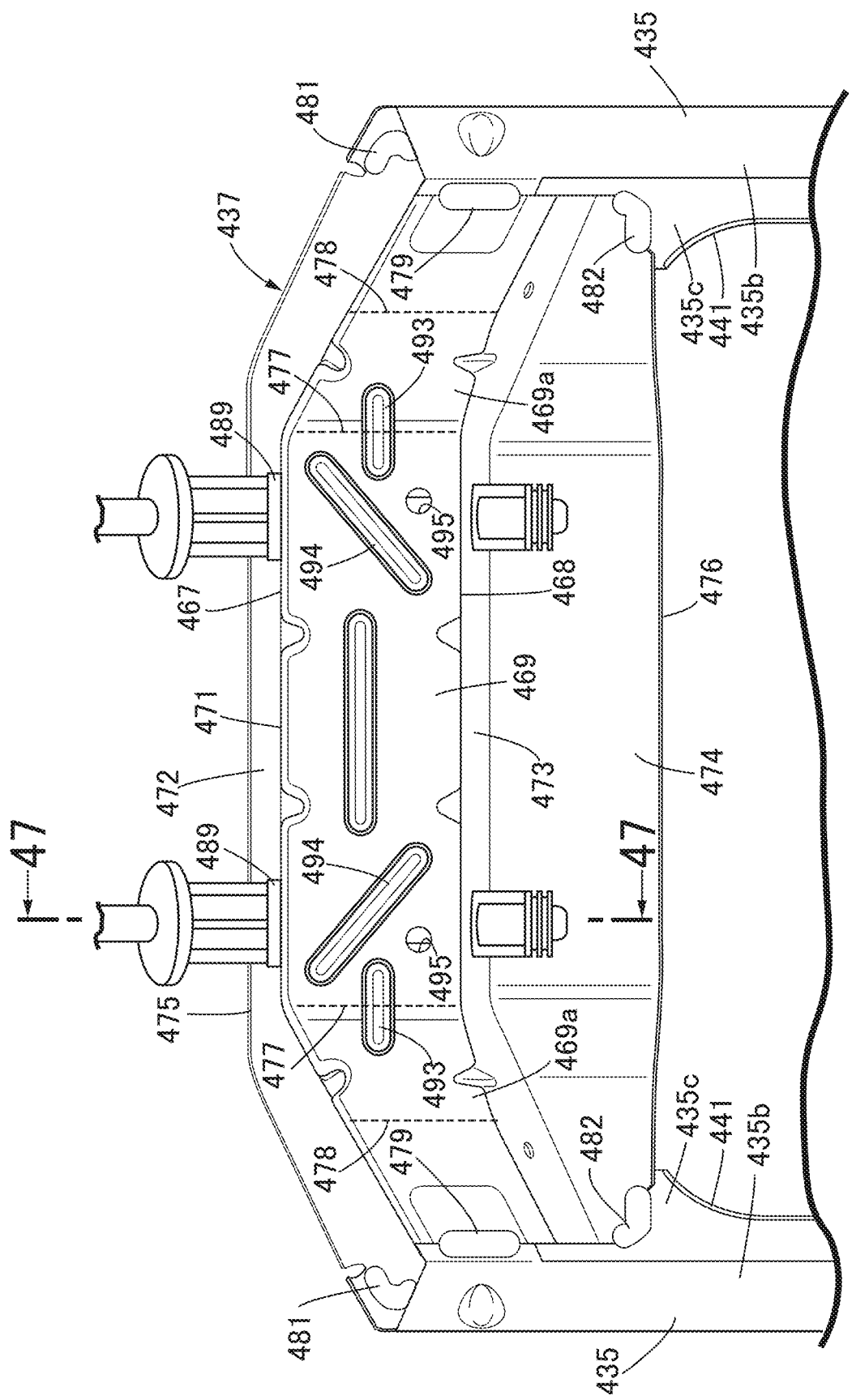
Figure 46:
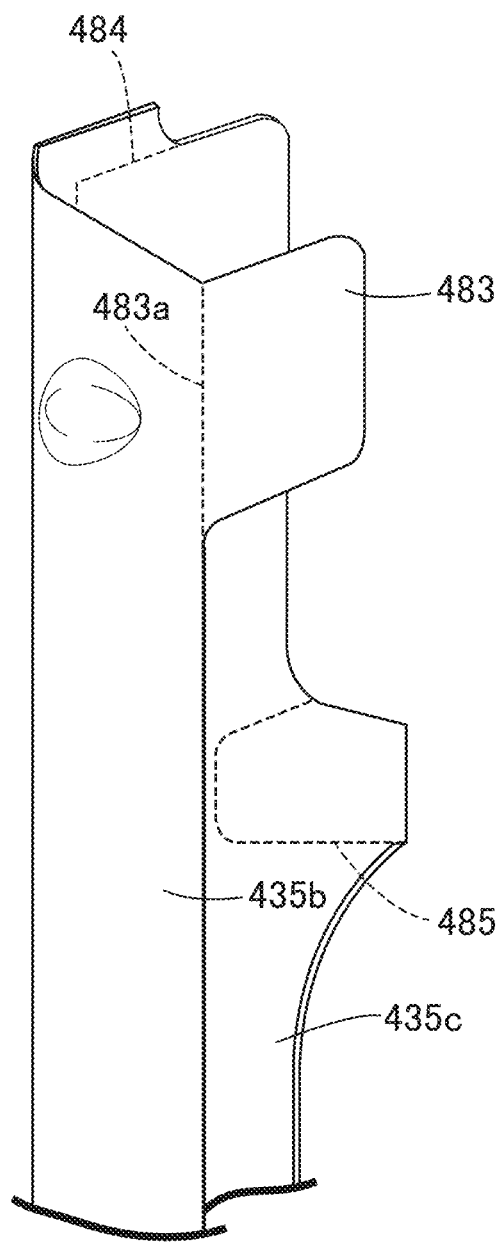
Figure 47:
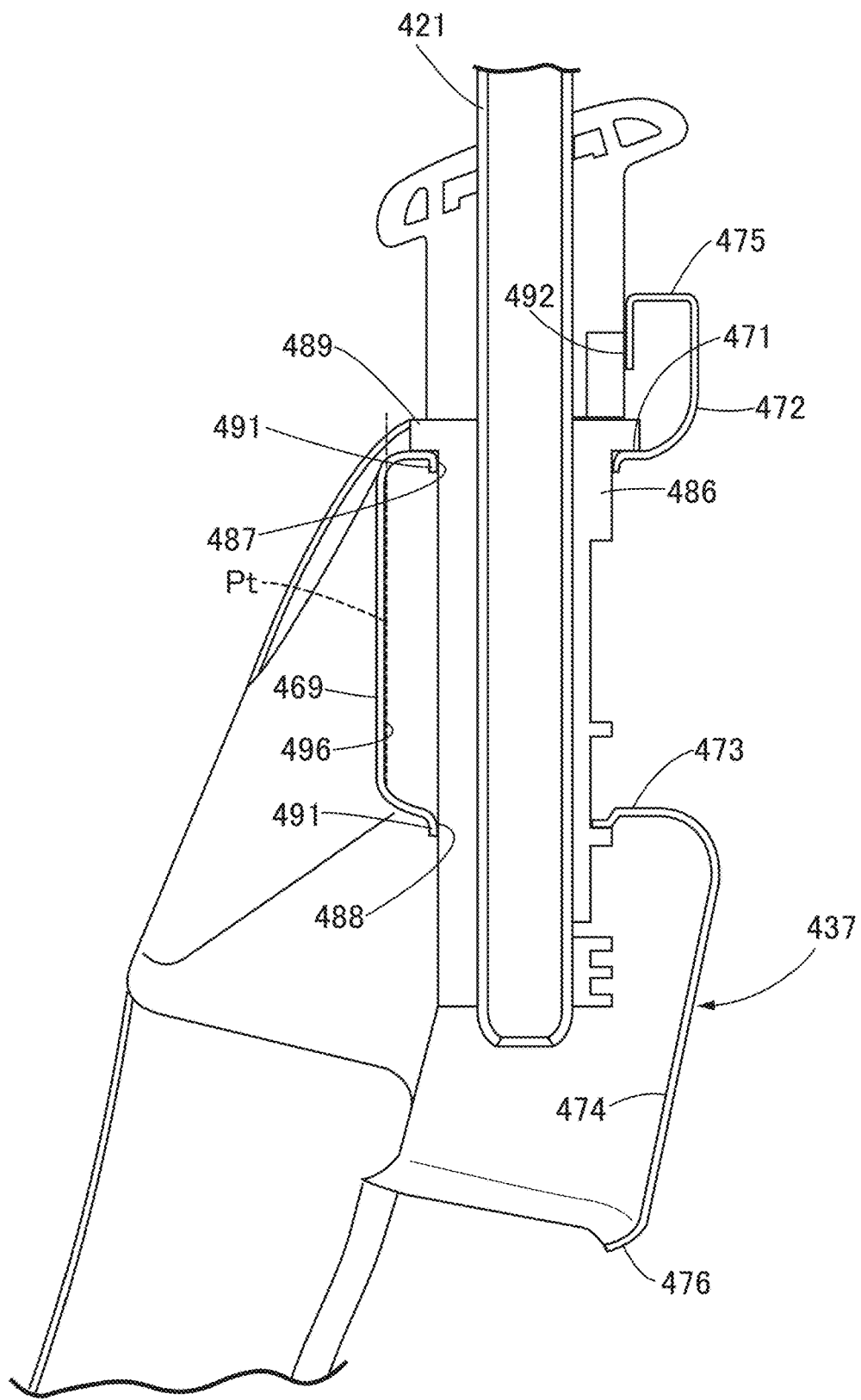
Figure 48:
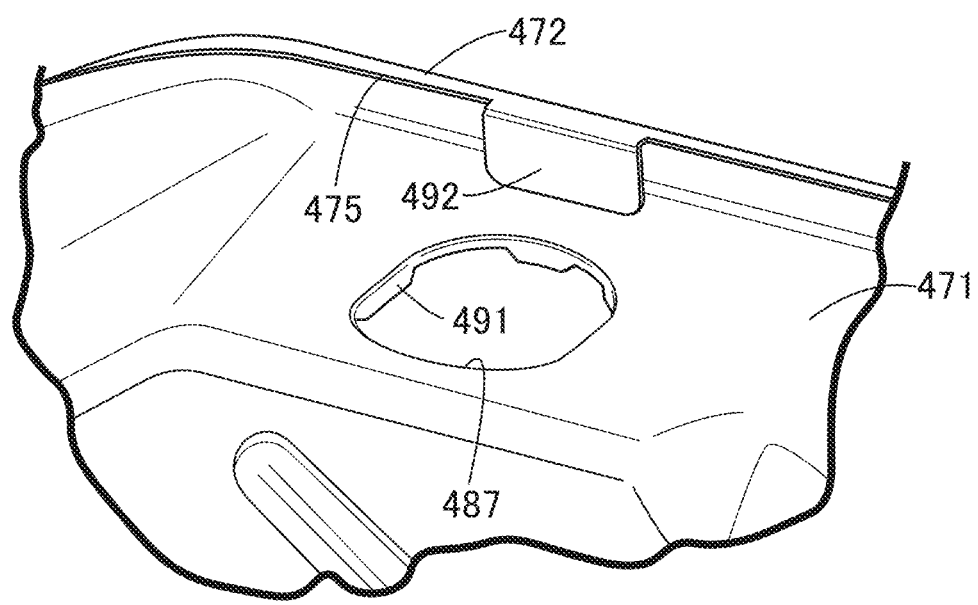
Figure 49:
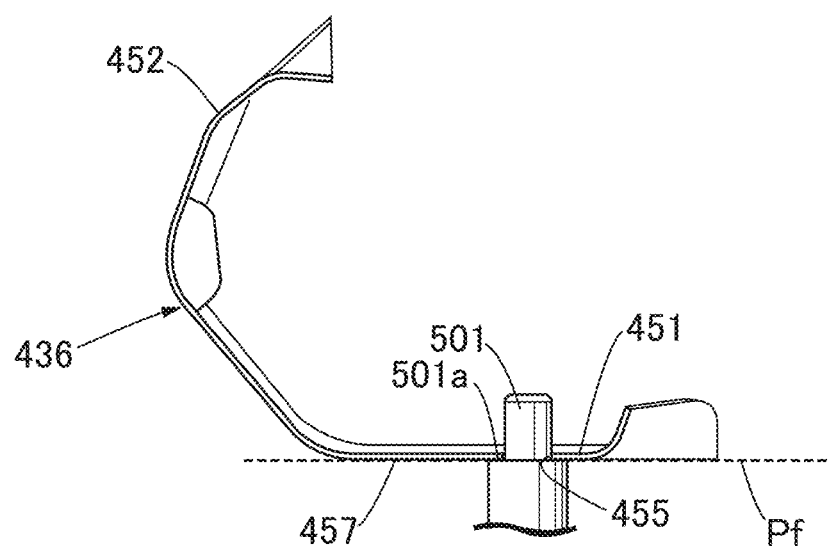
Figure 50:
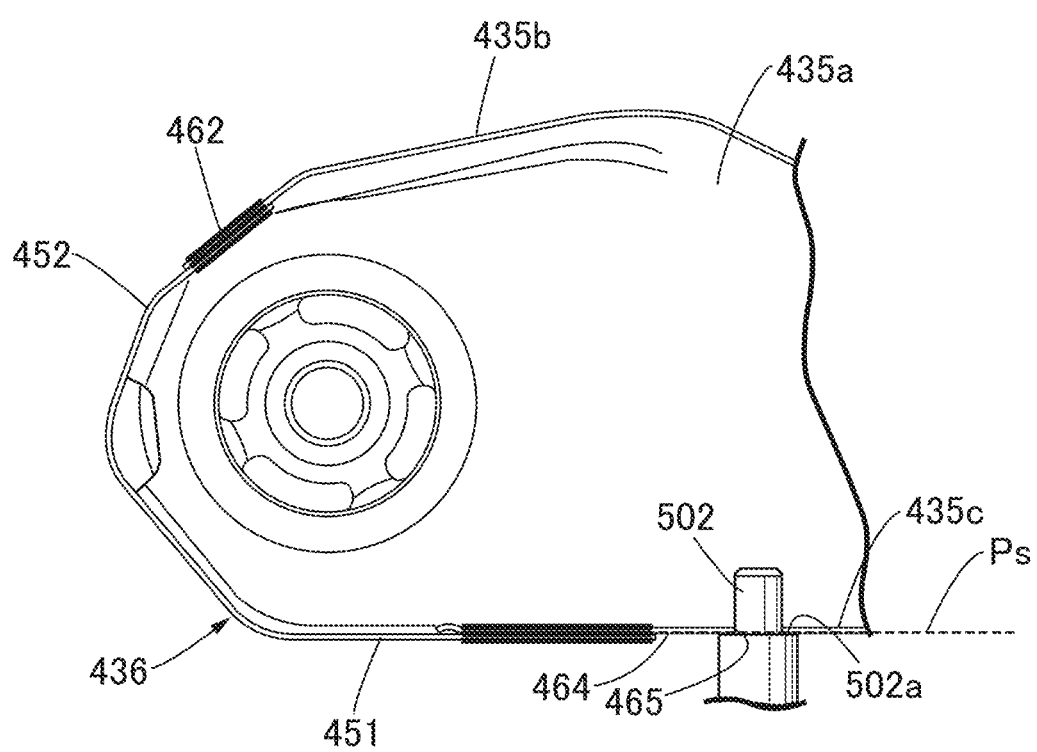
Figure 51:
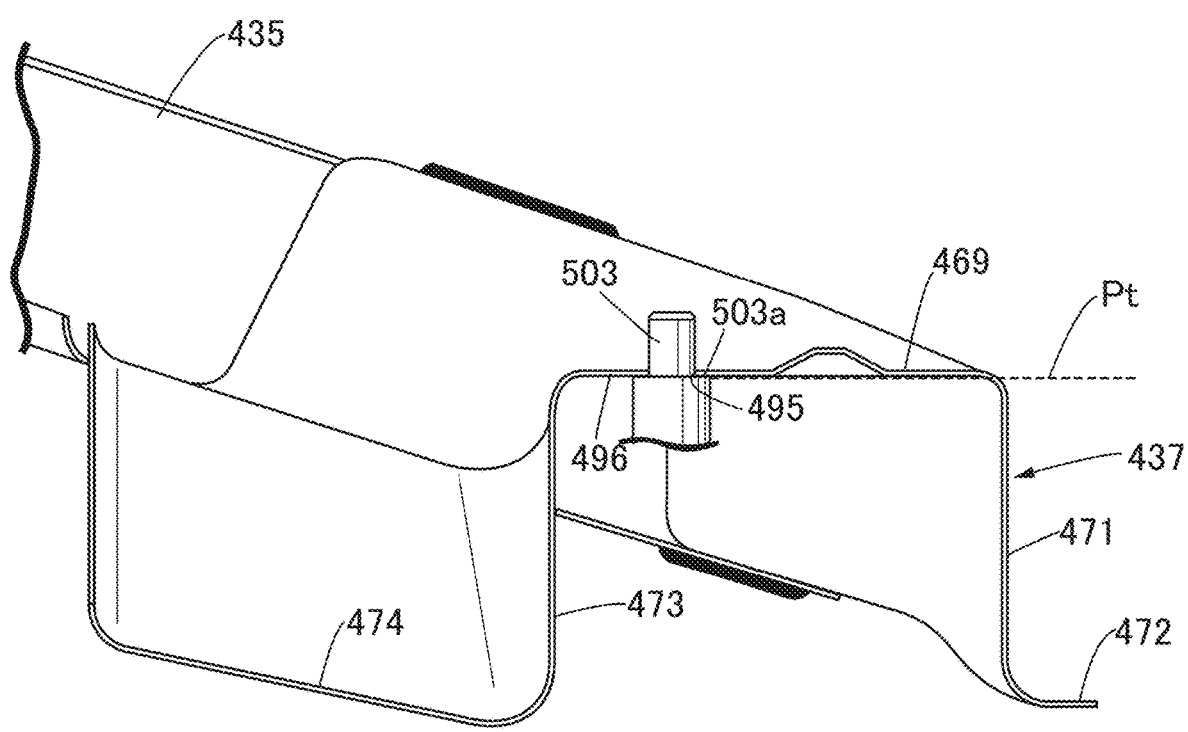
Figure 52:
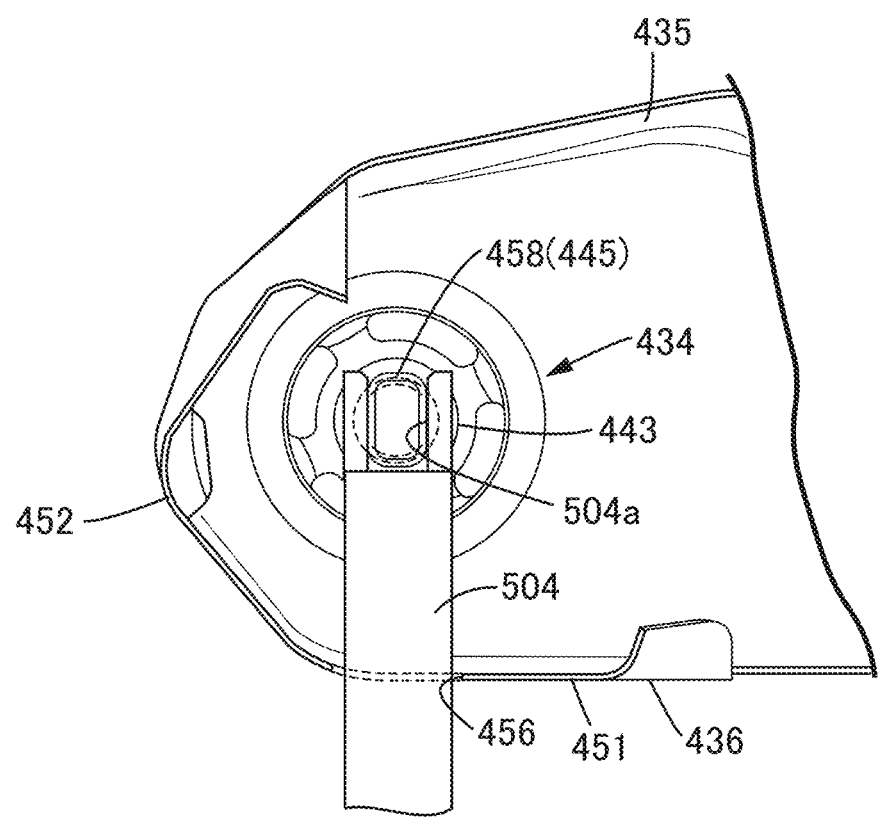
Figure 53:
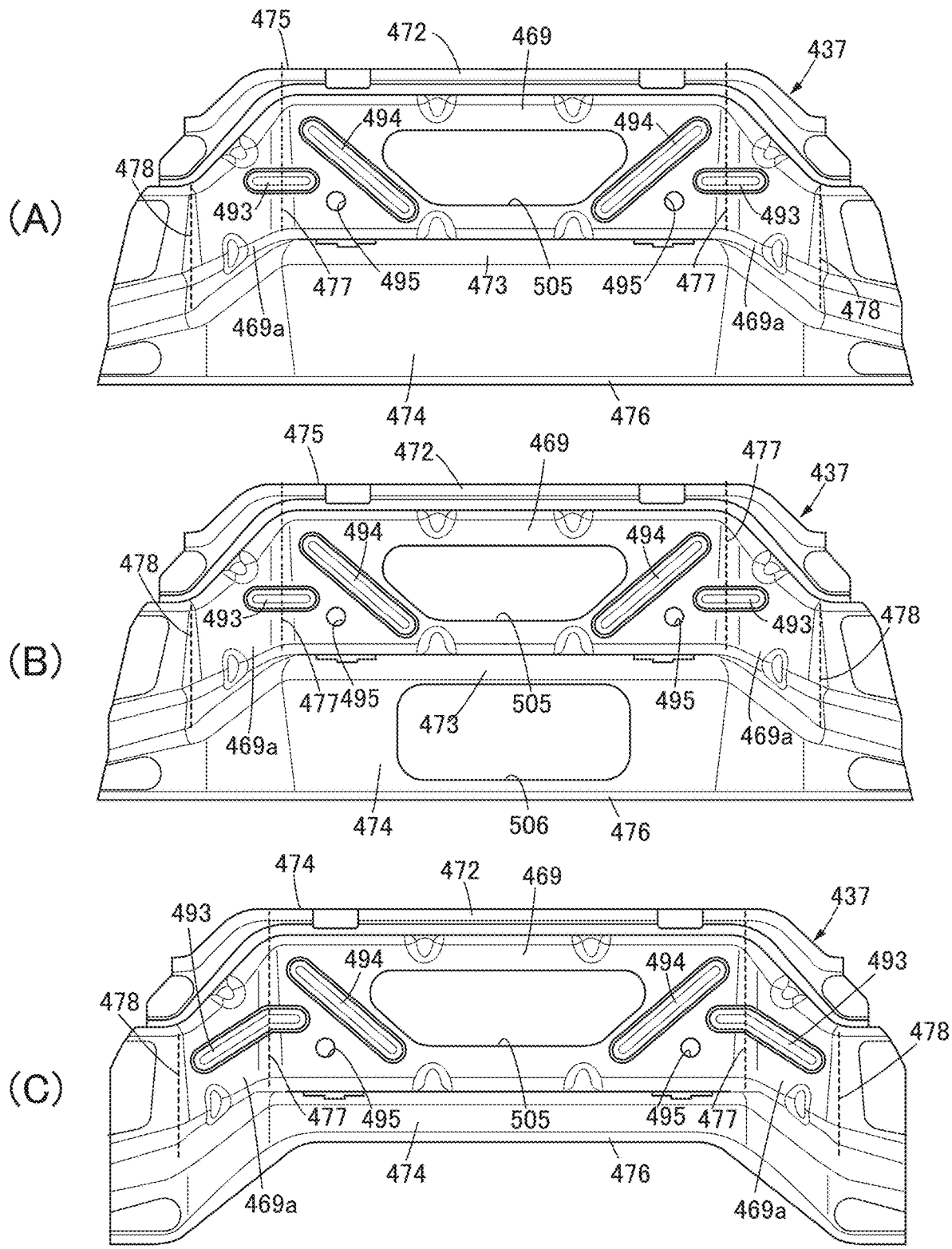
Figure 54:
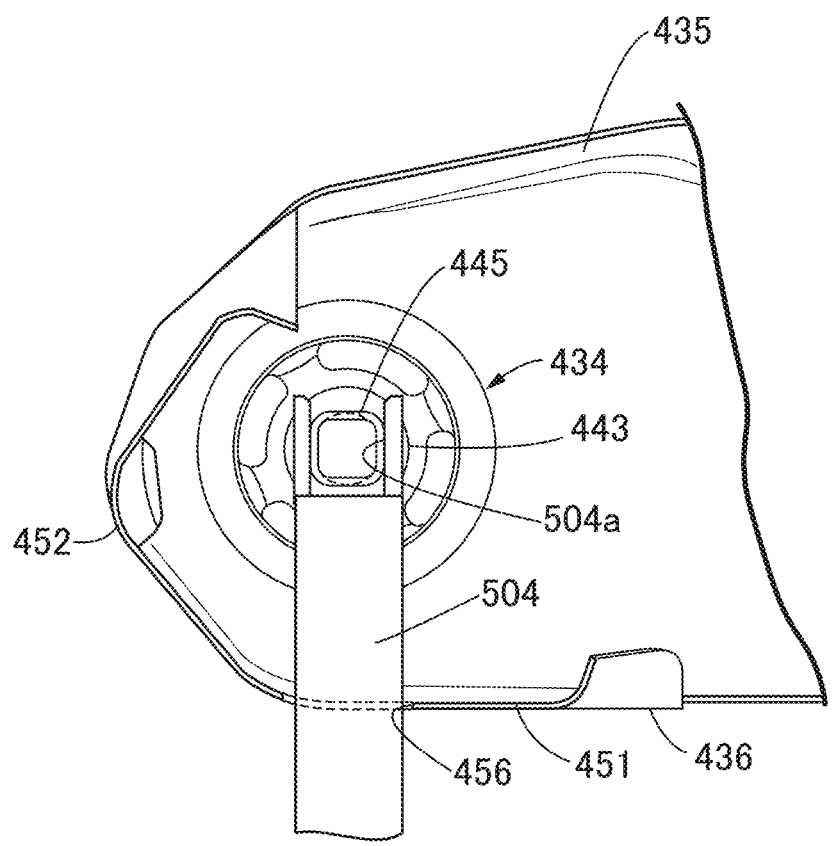
Figure 55:
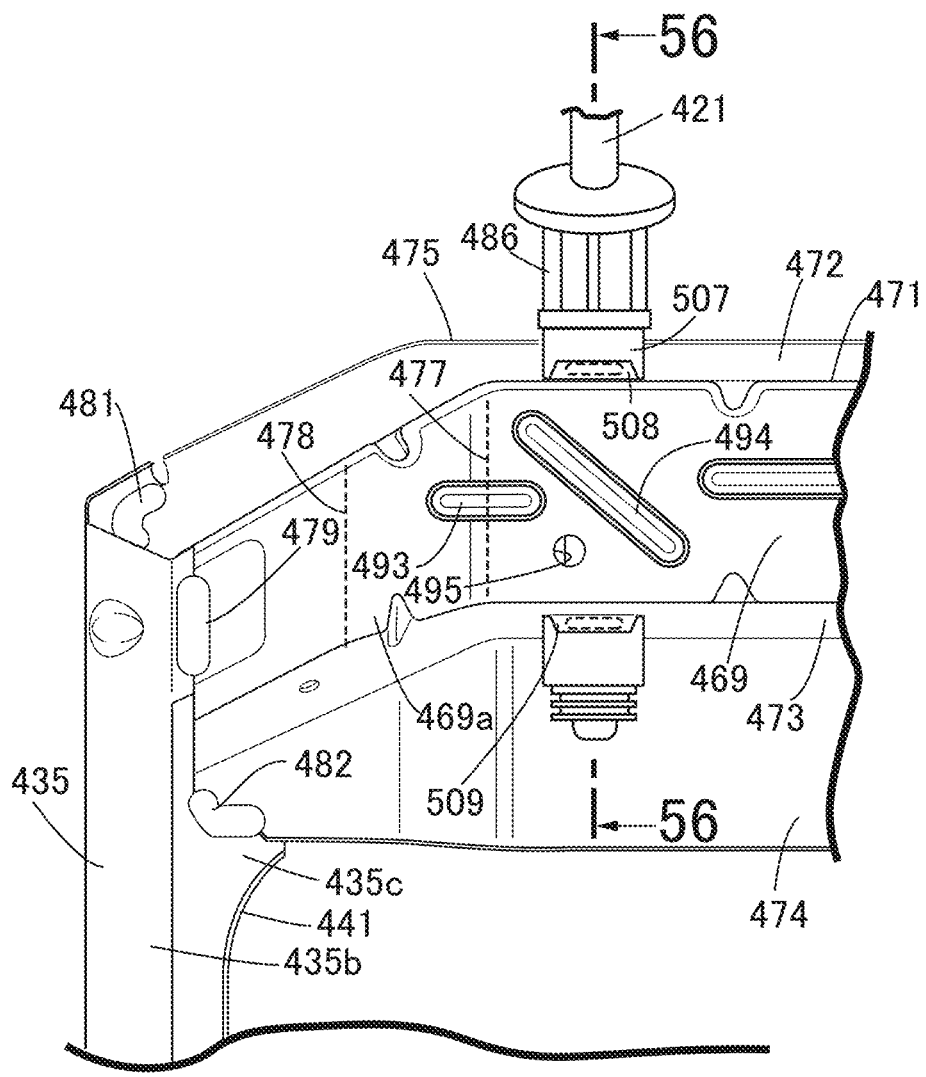
Figure 56:
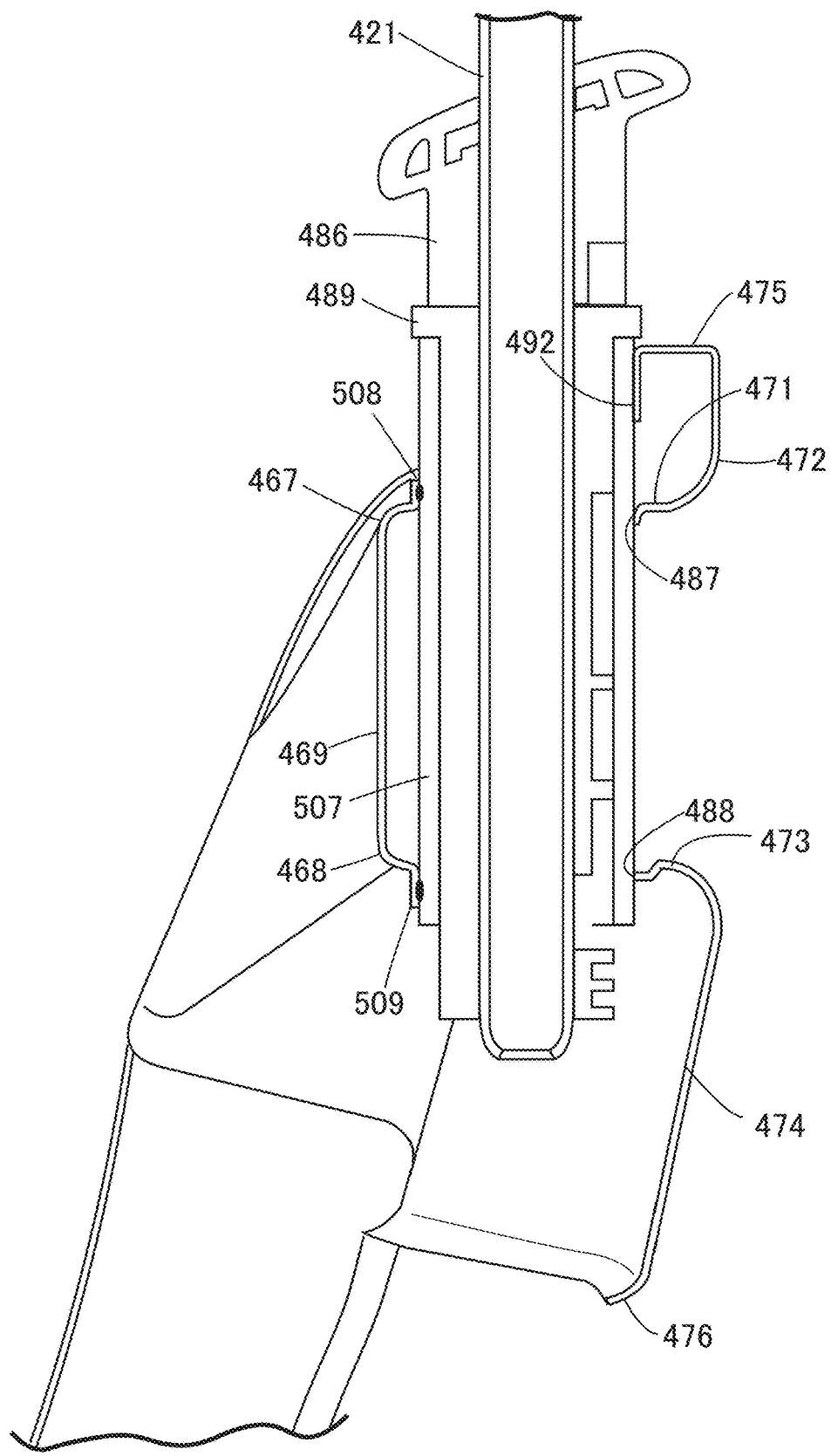

FIG. 38 is a perspective view schematically showing the overall arrangement of a vehicle seat related to the first embodiment.
FIG. 39 is a perspective view schematically showing the structure of a seat frame.
FIG. 40 is a perspective view schematically showing the arrangement of a seat cushion pad and a seat back pad.
FIG. 41 is a front view of a lower frame.
FIG. 42 is a rear view of the lower frame.
FIG. 43 is an enlarged sectional view along line 43-43 in FIG. 41.
FIG. 44 is an enlarged partial bottom view of a seat back frame.
FIG. 45 is a front view of an upper frame.
FIG. 46 is an enlarged partial front view of a side frame.
FIG. 47 is a sectional view along line 47-47 in FIG. 45.
FIG. 48 is an enlarged perspective view of an upper wall of the upper frame.
FIG. 49 is a sectional view of the lower frame along a cross section intersecting the central axis of an insertion hole.
FIG. 50 is a sectional view of the side frame, superimposed on the lower frame, along a cross section intersecting the central axis of the insertion hole.
FIG. 51 is a sectional view of the upper frame, superimposed on the side frame, along a cross section intersecting the central axis of the insertion hole.
FIG. 52 is a sectional view of the lower frame and a linking shaft along a cross section intersecting the central axis of an opening.
FIG. 53 is a front view of an upper frame related to a modified example.
FIG. 54 is a sectional view of a lower frame and a linking shaft related to another specific example along a cross section intersecting a central axis of an opening.
FIG. 55 is a front view schematically showing a support tube inserted into an upper wall and a lower wall of an upper frame.
FIG. 56 is a sectional view along line 56-56 in FIG. 55.

EXPLANATION OF REFERENCE NUMERALS
AND SYMBOLS

Explanation of Reference Numerals and Symbols
of Drawings Showing Embodiments of Solution
Means for First Problem 11 Vehicle seat
21 Headrest pillar
25 Seat back frame
25a Seat back frame of second embodiment
25b Seat back frame of third embodiment
36 Rotating shaft (support shaft)
38 Side frame
38a, 38b, 38c Plate-shaped portion, front wall, rear wall
38d Lower projecting piece
39 Upper frame
41 Curved region (of front wall)
42 Curved region (of rear wall)
43 Side frame flange
52, 53 Upper ridge line, lower ridge line
54, 55, 57 Front wall, upper wall, lower wall of upper frame
56, 58 Upper standing wall, lower standing wall of upper frame
56a Curved shape portion
62 Flange (second flange)
65 Weld mark (of front wall)
68 Virtual outline
69 Projecting piece
75 Headrest guide
76, 77 First support hole, second support hole
79 Support hole flange
81 Upper frame of the second embodiment
82, 83 Upper ridge line, lower ridge line
84, 85, 87 Front wall, upper wall, lower wall of upper frame of the second embodiment
86, 88 Upper standing wall, lower standing wall of upper frame of the second embodiment
92 Flange (second flange)
95 Weld mark (of front wall)
111 Upper frame of the third embodiment
SX Rotational axis (swing axis) of side frame Explanation of Reference Numerals and Symbols
of Drawings Showing Embodiments of Solution
Means for Second Problem 215 Seat cushion frame
216 Seat back frame
218, 225, 225A, 225B, 225C, 225D Side frame
219 Pan frame, which is linking member
220 Rear pipe, which is linking member
227 Lower frame, which is linking member
228 Headrest mounting bracket, which is linking member
234 Back-side pressure-receiving member, which is mounted component
237 to 239, 267 to 274 Reinforcing part
240 to 246 Through hole
251 Airbag, which is mounted component
256 Webbing, which is mounted component
263 Auxiliary member
L1 to L4 Plate thickness boundary line Explanation of Reference Numerals and Symbols
of Drawings Showing Embodiments of Solution
Means for Third Problem 315 Seat cushion frame
316 Seat back frame
318, 325A, 325B, 325C, 325D Side frame
318a, 325a Side plate portion
318b, 318c, 325b, 325c, 325d Collar portion
330 Reclining unit, which is mounted component
332 Reclining unit mounting part
337, 338, 339, 367 Reinforcing part
340 to 346 Through hole
A1, A2 Reference plate thickness region
B1, B2 Plate thickness increase region
ta1, ta2 Reference plate thickness
tb1, tb2 Increased plate thickness Explanation of Reference Numerals and Symbols
of Drawings Showing Embodiments of Solution
Means for Fourth Problem 411 Vehicle seat (vehicle seat)
421 Headrest pillar
424 Seat cushion frame
425 Seat back frame
434 Reclining mechanism (reclining unit)
435 Side frame
435a, 435b, 435c Plate-shaped portion, front wall, rear wall of side frame
436 Lower frame
437 Upper frame
438, 439 Curved region
445 Linking member (linking shaft)
451, 452 Back region, reinforcing region
456 Opening
457, 467, 496 First receiving face, second receiving face, third receiving face
458 Angular body
459 Space
467, 468 Upper ridge line, lower ridge line
469, 471, 473 Front wall, upper wall, lower wall
469a Linking piece
472, 474 Upper standing wall, lower standing wall
475 Flange (first flange)
477 Valley fold line
483 Projecting piece
483a Virtual outline
486 Headrest pillar guide
487, 488 Through hole (first through hole, second through hole)
492 Receiving piece
493, 494 Reinforcing shape (bead)
504 Jig
507 Support tube
Pf, Ps, Pt First plane, second plane, third plane
SX Rotational axis (swing axis)

MODES FOR CARRYING OUT THE INVENTION

Embodiments of Solution Means for First Problem

Embodiments of the present invention are explained below by reference to the attached drawings. In the explanation below, 'fore-and-aft', 'left-and-right', and 'up-and-down' refer to directions viewed by an occupant seated on a vehicle seat in a usual seated attitude (a basic attitude at the time of driving).

Figure 1:
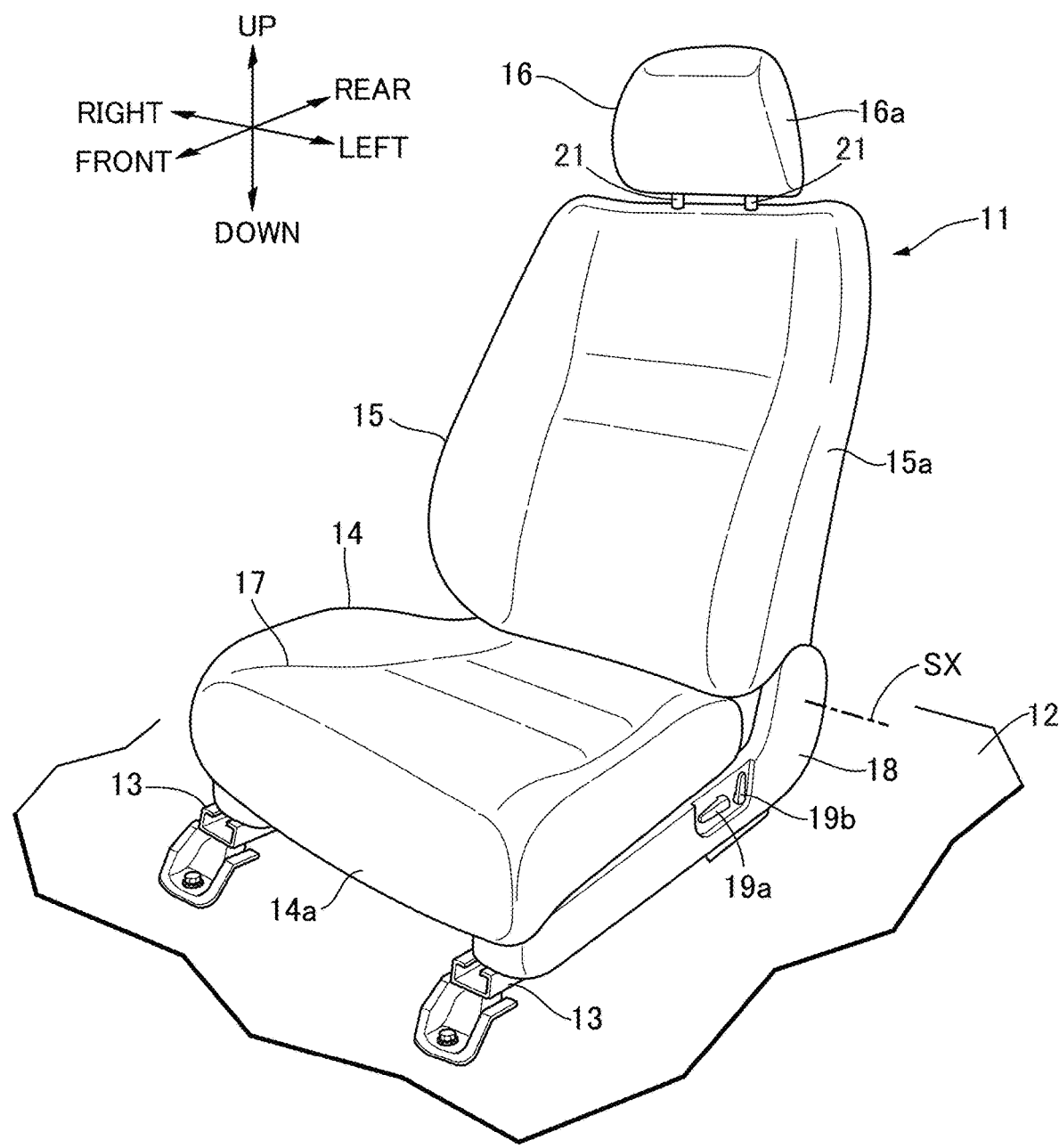
FIG. 1 is a perspective view schematically showing the overall arrangement of a vehicle seat related to the first embodiment.

FIG. 1 schematically shows the overall arrangement of a vehicle seat related to a first embodiment of the present invention. A vehicle seat 11 includes, for example, a slide rail 13 that is joined to a floor panel 12 functioning as one constituent element of the vehicle monocoque structure, a seat cushion 14 that is supported on the slide rail 13 so that it can slide in the fore-and-aft direction and receives the buttocks and thighs of an occupant, a seat back 15 that is linked to the seat cushion 14 so that it can swing in the fore-and-aft direction around a swing axis SX and receives the back of the occupant, and a headrest 16 that is supported at the upper end of the seat back 15 and receives the head of the occupant. The seat cushion 14, the seat back 15, and the headrest 16 have skin materials 14a, 15a, 16a that individually wrap interior pads. The skin materials 15a, 16a are in intimate contact with an outer face of the pad along a pad depression due to the action of hanging threads 17. Details of the pad are described later. The vehicle seat 11 is formed as a left seat. When the vehicle seat 11 is used as a right seat, the left and the right of the vehicle seat 11 may be exchanged.

The seat cushion 14 includes a side cover 18. Mounted on the side cover 18 are a first switch 19a and a second switch 19b. The first switch 19a is formed as a knob that is long in the fore-and-aft direction. When the first switch 19a is operated forward, the seat cushion 14 and the seat back 15 move forward. When the first switch 19a is operated rearward, the seat cushion 14 and the seat back 15 move rearward. When the first switch 19a is operated upward, the seat cushion 14 and the seat back 15 move upward. When the first switch 19a is operated downward, the seat cushion 14 and the seat back 15 move downward. The second switch 19b is formed as a knob that is long in the up-and-down direction. When the second switch 19b is operated forward, the seat back 15 swings forward around the swing axis SX. When the second switch 19b is operated rearward, the seat back 15 swings rearward around the swing axis SX.

The headrest 16 is fixed to a headrest pillar 21 extending upward from the upper end of the seat back 15. The headrest pillar 21 is supported on the seat back 15 so that it can be axially displaced in the up-and-down direction. The height of the headrest 16 can be adjusted by displacing the headrest pillar 21.

Figure 2:
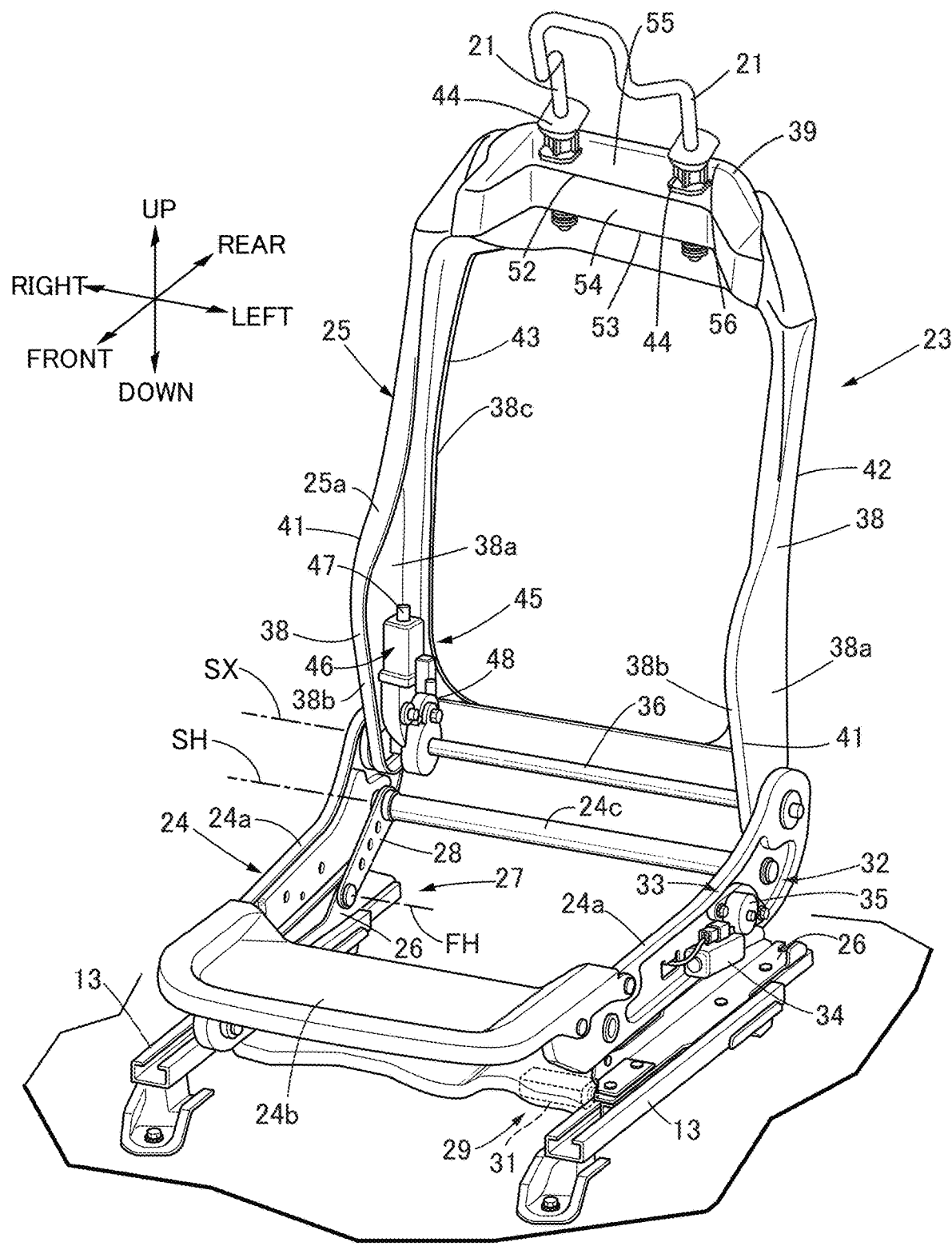
FIG. 2 is a perspective view schematically showing the structure of a seat frame.

As shown in FIG. 2, the vehicle seat 11 includes a seat frame 23 supporting a pad. The seat frame 23 includes a seat cushion frame 24 that supports the pad of the seat cushion 14, a seat back frame 25 that is linked to the seat cushion frame 24 so that it can swing around the swing axis SX and supports the pad of the seat back 15, and a base frame 26 that is guided in the longitudinal direction by the slide rail 13 so that it can move in the fore-and-aft direction and supports the seat cushion frame 24 above the slide rail 13. The seat cushion frame 24 is linked to the base frame 26 via a link mechanism 27. The link mechanism 27 includes a link member 28 that has one end joined to the base frame 26 so that it can rotate around a horizontal axis FH extending in the left-and-right direction and the other end joined to the seat cushion frame 24 so that it can rotate around a horizontal axis SH extending in the left-and-right direction parallel to the horizontal axis FH. The link member 28 guides up-and-down movement of the seat cushion frame 24 with respect to the base frame 26 around the horizontal axis FH.

The seat cushion frame 24 includes a cushion side frame 24a that extends along the respective slide rail 13, a pan frame 24b that provides a connection between the cushion side frames 24a at the front end of the seat cushion 14, and a linking pipe 24c that provides a link between the cushion side frames 24a at the rear end of the seat cushion 14. Disposed between the pan frame 24b and the linking pipe 24c are a plurality of zig-zag springs (not illustrated). The zig-zag springs extend in the fore-and-aft direction in a zig-zag shape. The zig-zag shape is formed by combining in turn a wire rod that extends in the fore-and-aft direction and a wire rod that extends in the left-and-right direction.

Mounted on the base frame 26 is an electric fore-and-aft moving device 29. The electric fore-and-aft moving device 29 includes an electric motor 31 supported on the base frame 26. The electric motor 31 generates motive power in response to the supply of electric power. The electric power is supplied based on operation of the first switch 19a. The motive power of the electric motor 31 triggers fore-and-aft movement of the base frame 26 along the slide rail 13.

An electric up-and-down moving device 32 is mounted on the cushion side frame 24a of the seat cushion frame 24. The electric up-and-down moving device 32 includes an actuator 33 that is supported on the cushion side frame 24a and is linked to the link mechanism 27. The actuator 33 includes an electric motor 34 that is disposed on the outside of the cushion side frame 24a and generates motive power in response to the supply of electric power, and a transmission mechanism 35 that triggers rotation of the link member 28 with respect to the cushion side frame 24a around the horizontal axis SH in response to the motive power of the electric motor 34. The transmission mechanism 35 is formed from a group of gears that mesh with each other in turn, including for example a drive gear fixed to a drive shaft of the electric motor 34, and a driven gear fixed to the link member 28 around the horizontal axis SH. The electric power is supplied based on operation of the first switch 19a. The motive power of the electric motor 34 triggers up-and-down movement of the cushion side frame 24a around the horizontal axis FH.

A support shaft 36 is incorporated into the seat cushion frame 24 above and to the rear of the linking pipe 24c so as to be coaxial with the swing axis SX. The support shaft 36 is formed from, for example, a hollow metal pipe. A metal pipe has high stiffness in the axial direction. The support shaft 36 is sandwiched between the left and right cushion side frames 24a. The seat back frame 25 is supported on the support shaft 36.

The seat back frame 25 includes left and right side frames 38 that are linked to the inner side of the respective cushion side frames 24a by means of the support shaft 36, and an upper frame 39 that provides a link between upper ends of the side frames 38 above the support shaft 36. The side frame 38 has a plate-shaped portion 38a that spreads along a vertical plane orthogonal to the swing axis SX around the support shaft 36 and extends upward along the vertical plane, a front wall 38b that is formed so as to be bent inward continuously from the front edge of the plate-shaped portion 38a and forms a curved region 41 extending vertically from around the support shaft 36, and a rear wall 38c that is formed so as to be bent inward continuously from the rear edge of the plate-shaped portion 38a and forms a curved region 42 extending vertically from around the support shaft 36. The front wall 38b and the rear wall 38c are continuous around the support shaft 36. The rear wall 38c has a side frame flange 43 formed so as to be bent forward continuously from the inner end of the rear wall 38c. Each side frame 38 is formed from for example one sheet of metal plate. Fixed to the upper frame 39 is a headrest pillar guide 44 that supports the headrest pillar 21 so that it can slide in the up-and-down direction. Details of the upper frame 39 are described later.

An electric reclining device 45 is mounted on the side frame 38 of the seat back frame 25. The electric reclining device 45 includes an actuator 46 that is mounted on the side frame 38 of the seat back frame 25 around the swing axis SX. The actuator 46 is formed from an electric motor 47 that generates motive power in response to the supply of electric power, and a transmission mechanism 48 that converts the motive power of the electric motor 47 into a driving force around the swing axis SX. The electric motor 47 generates motive power in response to the supply of electric power. The electric power is supplied based on operation of the second switch 19b. The motive power of the electric motor 47 triggers swinging in the fore-and-aft direction of the seat back frame 25 around the swing axis SX with respect to the seat cushion frame 24.

Figure 3:
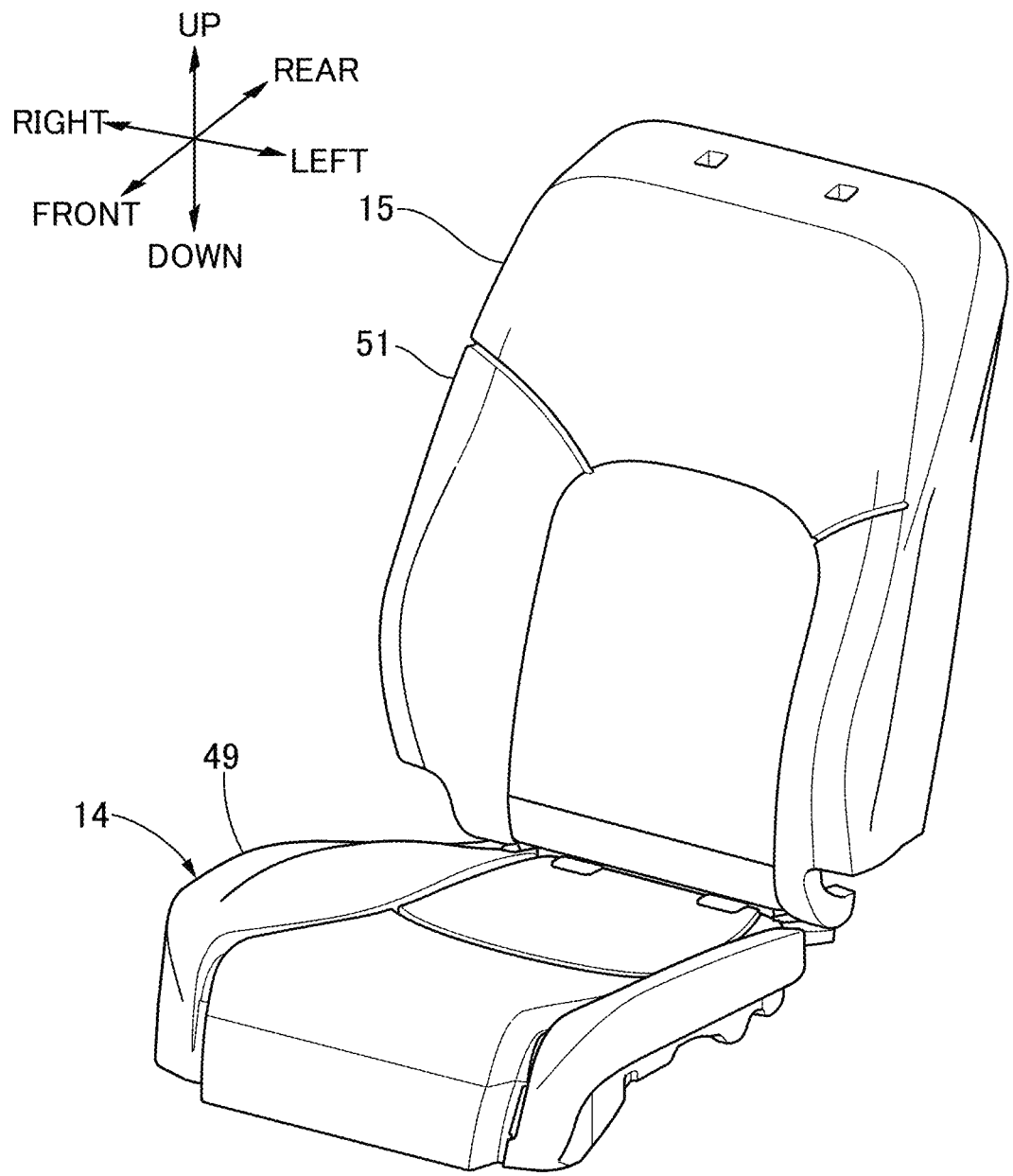
FIG. 3 is a perspective view schematically showing the arrangement of a seat cushion pad and a seat back pad.

As shown in FIG. 3, the seat cushion 14 further includes a seat cushion pad 49 that is supported by the seat cushion frame 24 and wrapped with the skin material 14a. The seat back 15 further includes a seat back pad 51 that is supported by the seat back frame 25 and wrapped with the skin material 15a. The seat cushion pad 49 and the seat back pad 51 are formed from a material having resilience such as for example a foamed urethane.

Figure 4:
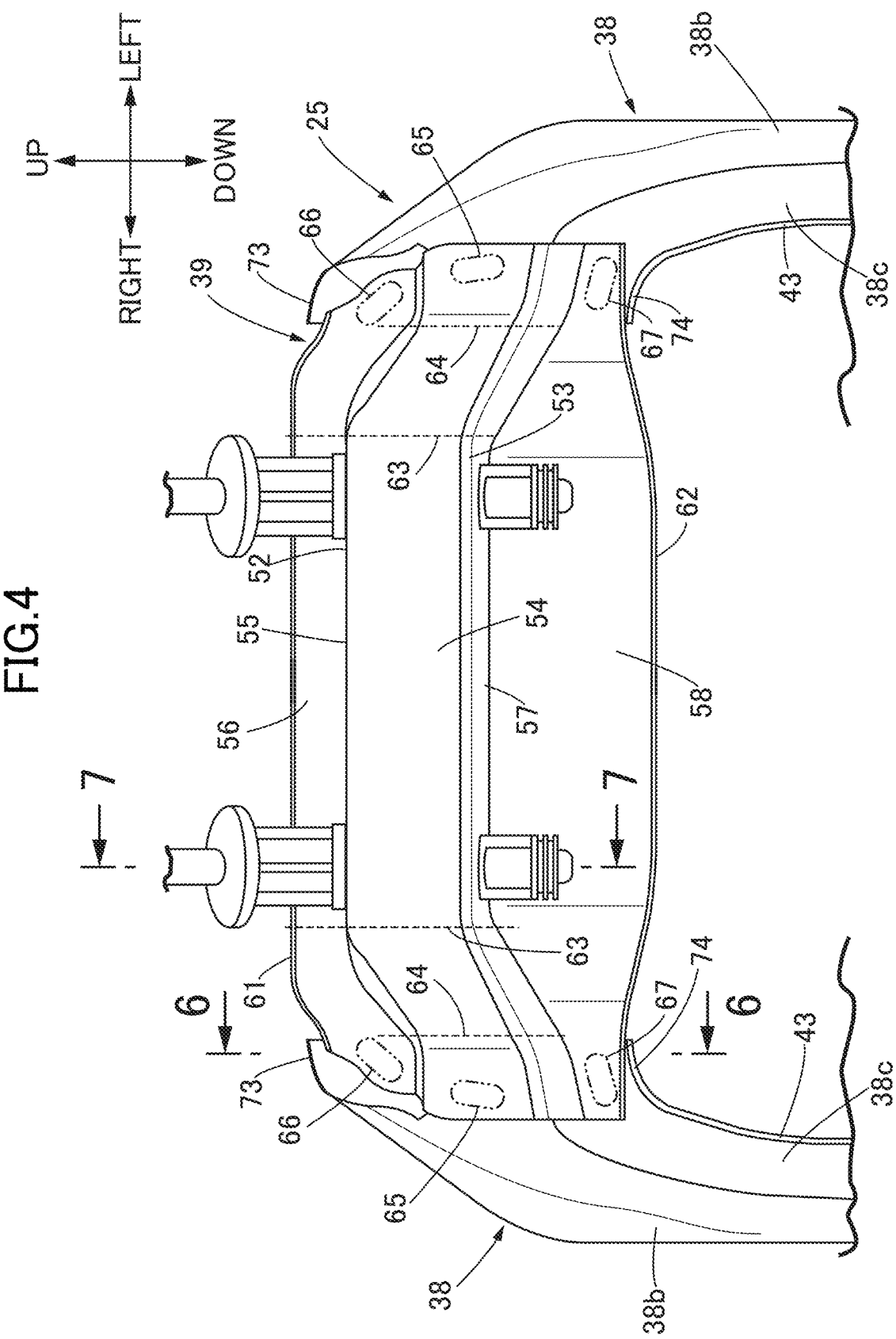
FIG. 4 is an enlarged front view of an upper frame.

As shown in FIG. 4, the upper frame 39 is formed by bending a plate material and has a front wall 54 that is partitioned by an upper ridge line 52 and a lower ridge line 53 extending in the horizontal direction, an upper wall 55 that spreads rearward continuously from the upper ridge line 52, an upper standing wall 56 that is formed so as to be bent upward from the rear end of the upper wall 55, a lower wall 57 that spreads rearward continuously from the lower ridge line 53, and a lower standing wall 58 that is formed so as to be bent downward from the rear end of the lower wall 57. The upper standing wall 56 has a first flange 61 that is formed so as to be bent forward continuously from the upper end of the upper standing wall 56. The first flange 61 is continuous throughout the entire region in the horizontal direction along the upper edge of the upper standing wall 56. The lower standing wall 58 has a second flange 62 that is formed so as to be bent forward continuously from the lower end of the lower standing wall 58. The second flange 62 is continuous throughout the entire region in the horizontal direction along the lower edge of the lower standing wall 58.

The front wall 54 is formed so as to be bent forward at two, that is, left and right, positions in the horizontal direction and forms a depression along a vertical valley fold line 63. The front wall 54 is formed so as to be bent rearward further outside than the depression in the horizontal direction and forms a ridge line along a vertical peak fold line 64. Accompanying deformation of the front wall 54 the upper standing wall 56 and the lower standing wall 58 deform in a similar manner. The upper frame 39 is formed from for example one sheet of metal plate.

A weld mark 65 due to welding is established on the front wall 54 further outside than the peak fold line 64 in the horizontal direction. Weld marks 66, 67 due to welding are established on the upper standing wall 56 and the lower standing wall 58 so as to correspond to positions above and below the weld mark 65. The upper frame 39 is fixed to the left and right side frames 38 via the weld marks 65, 66, 67. Welding may be carried out by spot welding, arc welding or laser welding.

Figure 5:
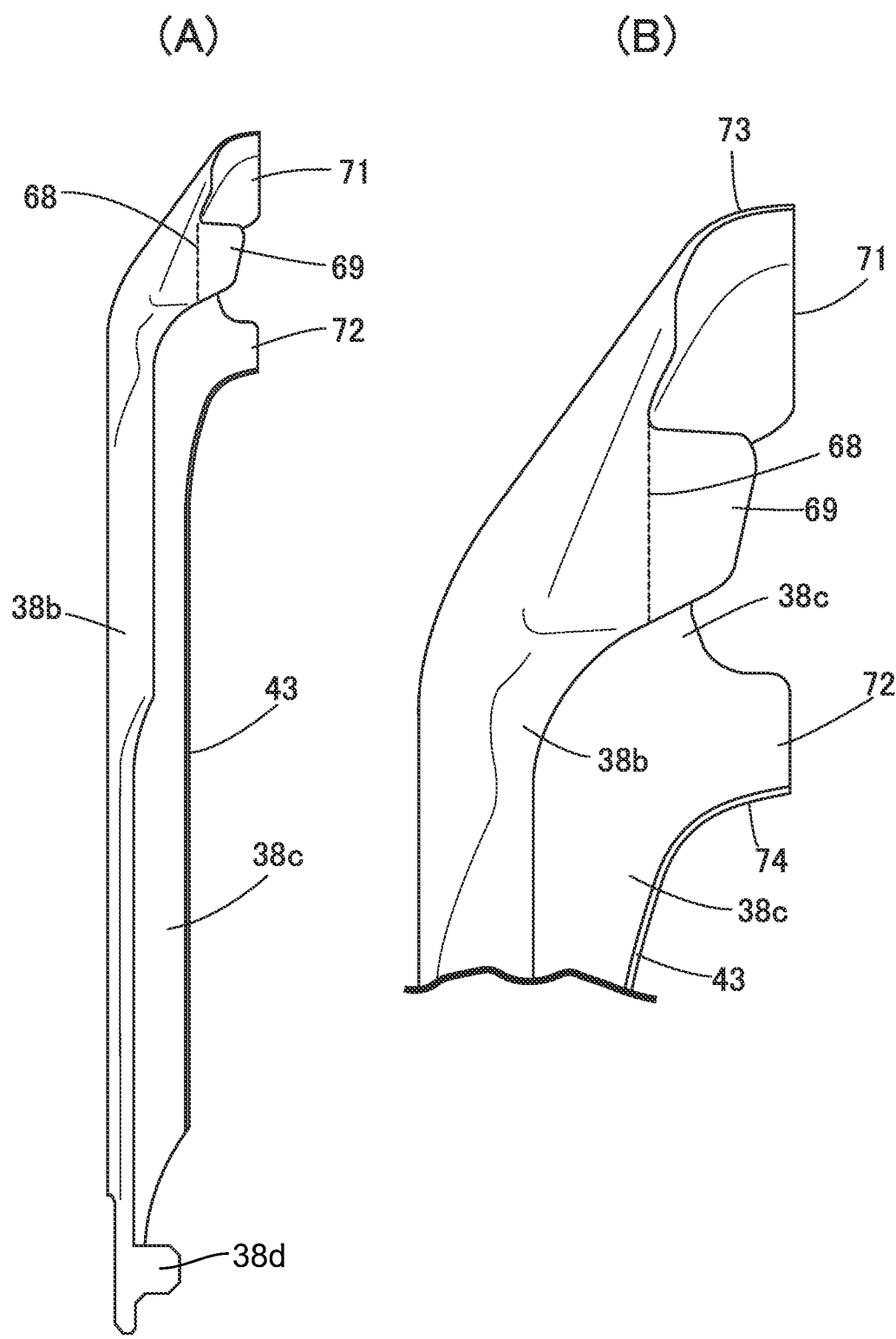
FIG. 5 is an enlarged plan view of a side frame.

In the side frame 38, the curved region 41 formed by the front wall 38b extends to the upper end of the side frame 38 and reaches the upper frame 39. The curved region 42 formed by the rear wall 38c extends to the upper end of the side frame 38 and reaches the upper frame 39. As shown in FIG. 5, the inner edge of the front wall 38b has a projecting piece 69 that spreads inward from a virtual outline 68 corresponding to the edge of the upper frame 39 and is superimposed on the front wall 54 of the upper frame 39 from the rear. The front wall 54 of the upper frame 39 forms the weld mark 65 between itself and the projecting piece 69.

The inner edge of the rear wall 38c has an upper superimposition piece 71 that is continuous from the rear wall 38c and is superimposed on the upper standing wall 56 of the upper frame 39 from the rear, and a lower superimposition piece 72, beneath the upper superimposition piece 71 and spaced apart from the upper superimposition piece 71, that is continuous from the rear wall 38c and is superimposed on the lower standing wall 58 of the upper frame 39. The upper standing wall 56 of the upper frame 39 forms the weld mark 66 between itself and the upper superimposition piece 71. Similarly, the lower standing wall 58 of the upper frame 39 forms the weld mark 67 between itself and the lower superimposition piece 72.

The upper superimposition piece 71 of the rear wall 38c has an upper flange 73 that is formed so as to be bent forward from the upper edge of the upper superimposition piece 71. The upper flange 73 is made to face the first flange 61 of the upper frame 39 over a predetermined length from left and right ends of the first flange 61. The lower superimposition piece 72 of the rear wall 38c has a lower flange 74 that is formed so as to be bent forward from the lower edge of the lower superimposition piece 72. The lower flange 74 is made to face the second flange 62 of the upper frame 39 over a predetermined length from left and right ends of the second flange 62. In this way, in the upper frame 39, the upper flange 73 is formed at a position corresponding to the first flange 61 in the horizontal direction, and the lower flange 74 is formed at a position corresponding to the second flange 62 in the horizontal direction.

Figure 6:
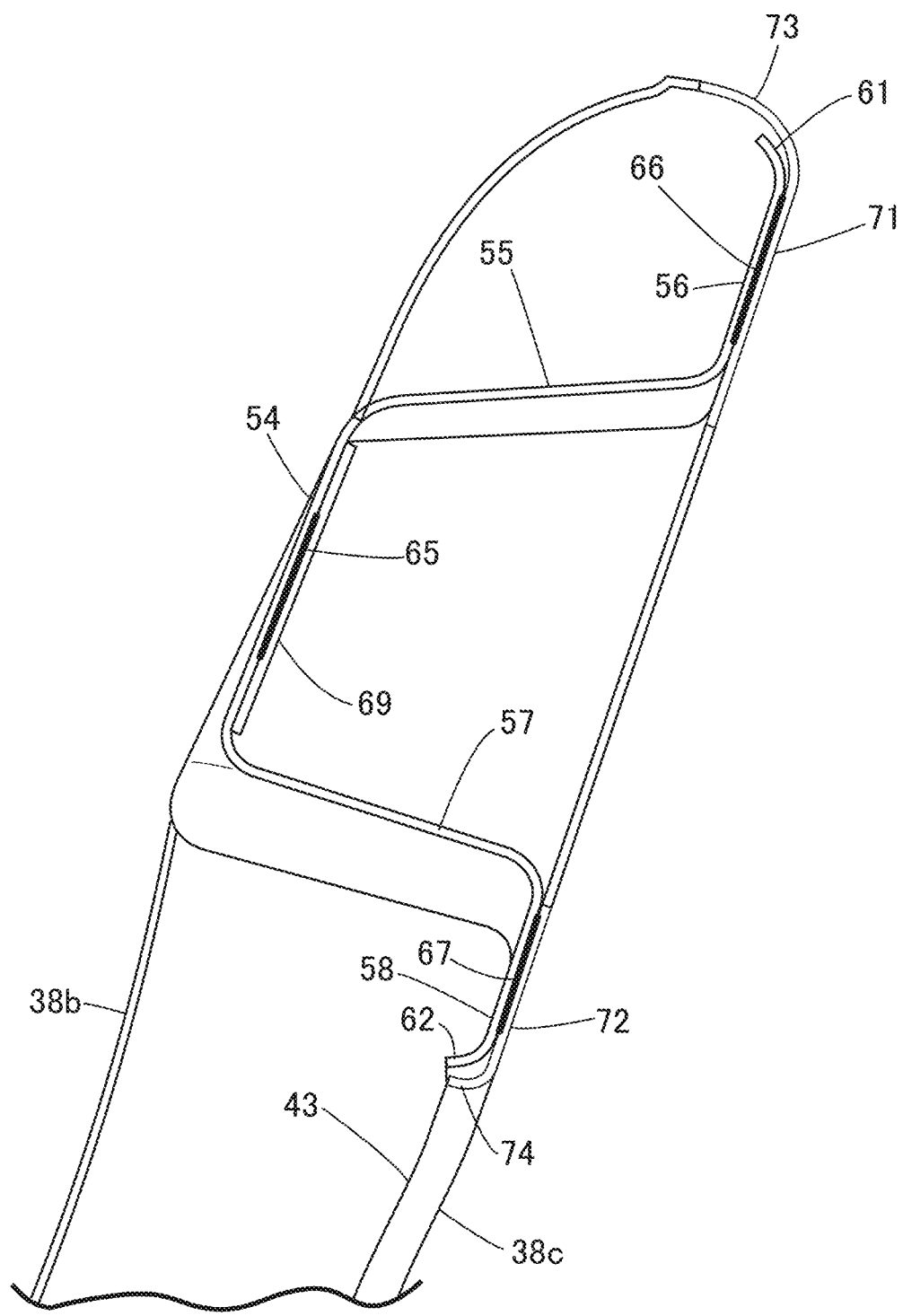
FIG. 6 is an enlarged sectional view along line 6-6 in FIG. 4.

As shown in FIG. 6, the upper flange 73 curves with a smaller curvature than that of the first flange 61. The first flange 61 can be included well inside the upper flange 73. Interference between the first flange 61 and the upper flange 73 can be avoided. The lower flange 74 curves with a larger curvature than that of the second flange 62 at a position spaced downward from the second flange 62. The second flange 62 can be included well inside the lower flange 74. Interference between the second flange 62 and the lower flange 74 can be avoided. The side frame flange 43 is continuous from the lower flange 74.

Figure 7:
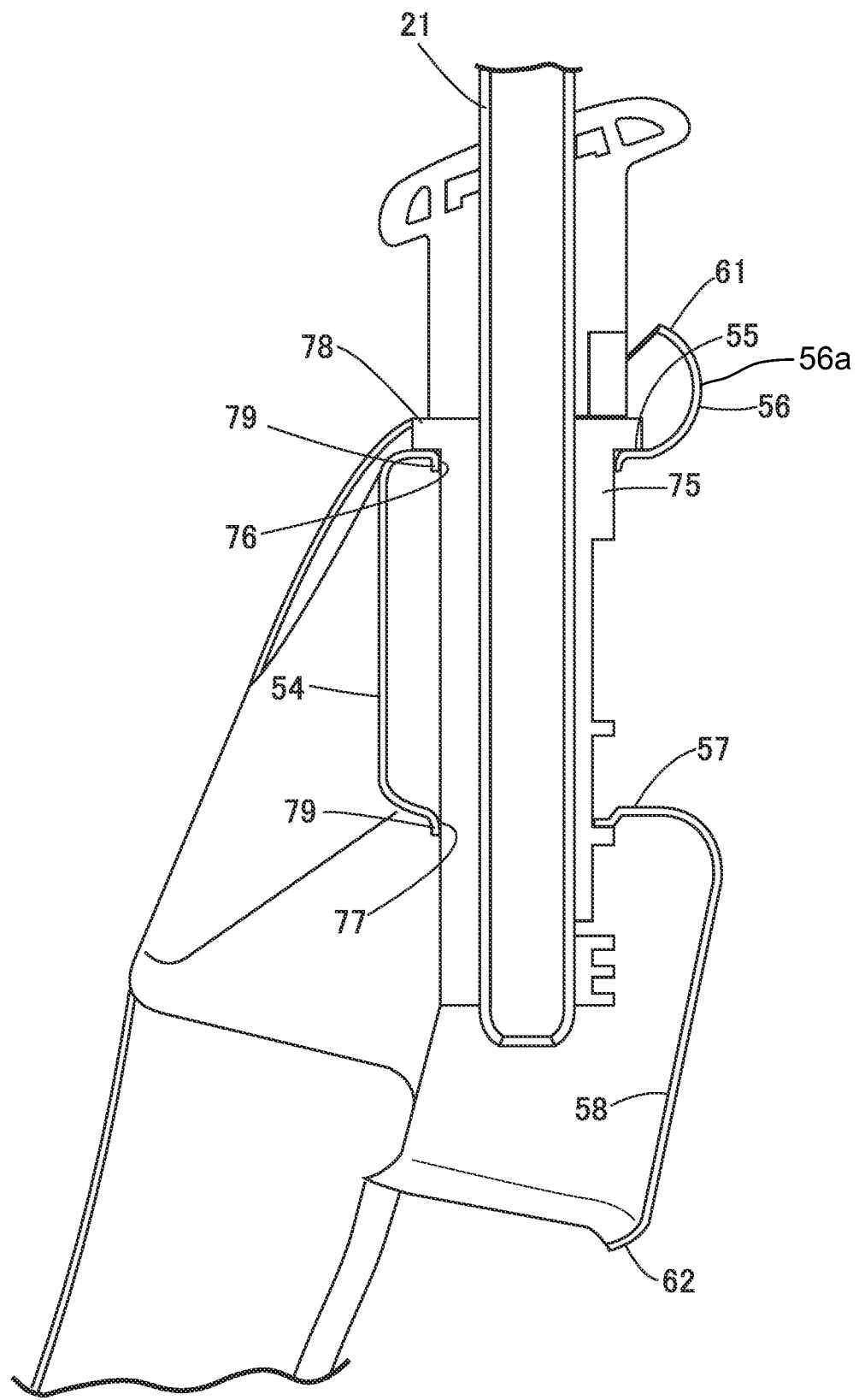
FIG. 7 is an enlarged sectional view along line 7-7 in FIG. 4.

As shown in FIG. 7, the upper frame 39 has a first support hole 76 that is formed in the upper wall 55 and receives a headrest pillar guide 75, and a second support hole 77 that is formed in the lower wall 57 and receives the headrest pillar guide 75. The headrest pillar guide 75 supports the headrest pillar 21 so that it can be displaced in the axial direction. A positioning flange 78 that spreads in a direction orthogonal to the axis is formed on the headrest pillar guide 75. When the headrest pillar guide 75 is inserted into the first support hole 76 and the second support hole 77 from above, the positioning flange 78 comes into contact with the upper wall 55 from above so as to position the headrest pillar guide 75 in the axial direction. The headrest pillar guide 75 can be formed from for example a resin material.

Formed at the peripheral edge of each of the first support hole 76 and the second support hole 77 is a support hole flange 79 that is formed so as to be bent downward. The headrest pillar guide 75 is press fitted into the support hole flange 79. The support hole flange 79 fixes the headrest pillar guide 75 with respect to the upper frame 39. The support hole flange 79 can prevent the headrest pillar guide 75 from coming out of the upper frame 39.

Figure 8:
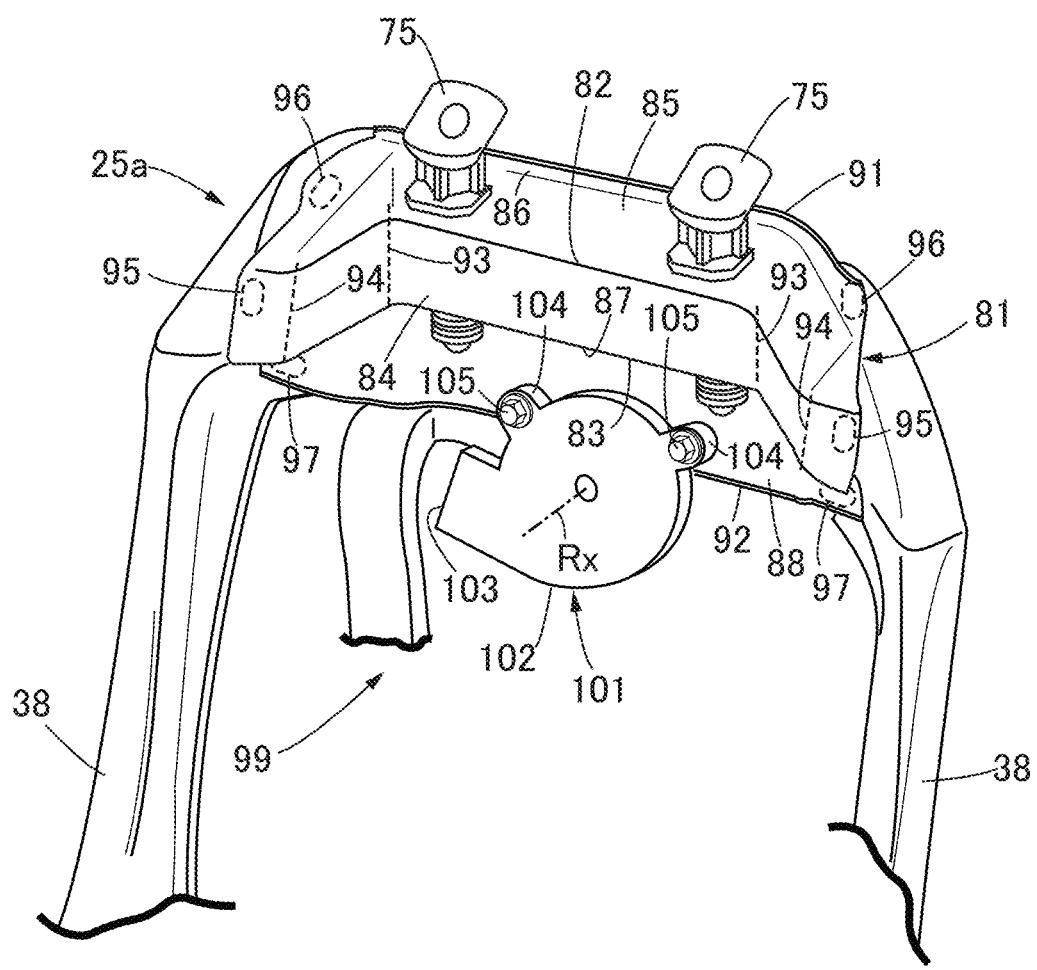
FIG. 8 is an enlarged perspective view schematically showing part of a seat back frame incorporated into a vehicle seat related to the second embodiment.

FIG. 8 schematically shows part of a seat back frame 25a that is incorporated into a vehicle seat related to a second embodiment of the present invention. In the same way as for the seat back frame 25, the seat back frame 25a includes the left and right side frames 38 that are linked to the inside of the respective cushion side frames 24a via the support shaft 36, and an upper frame 81 that provides a link between upper ends of the side frames 38 above the support shaft 36. Other than the upper frame 81, the arrangement of the vehicle seat is the same as that of the vehicle seat 11 described above.

The upper frame 81 is formed by bending a plate material and has a front wall 84 that is partitioned by an upper ridge line 82 and a lower ridge line 83 extending in the horizontal direction, an upper wall 85 that spreads rearward continuously from the upper ridge line 82, an upper standing wall 86 that is formed so as to be bent upward from the rear end of the upper wall 85, a lower wall 87 that spreads rearward continuously from the lower ridge line 83, and a lower standing wall 88 that is formed so as to be bent downward from the rear end of the lower wall 87. The upper standing wall 86 has a first flange 91 that is formed so as to be bent forward continuously from the upper end of the upper standing wall 86. The first flange 91 is continuous throughout the entire region in the horizontal direction along the upper edge of the upper standing wall 86. The upper flange 73 of the side frame 38 is made to face the first flange 91 over a predetermined length from left and right ends of the first flange 91 of the upper frame 81. The lower standing wall 88 has a second flange 92 that is formed so as to be bent forward continuously from the lower end of the lower standing wall 88. The second flange 92 is continuous throughout the entire region in the horizontal direction along the lower edge of the lower standing wall 88. The lower flange 74 of the side frame 38 is made to face the second flange 92 of the upper frame 81 over a predetermined length from left and right ends of the second flange 92.

The front wall 84 is formed so as to be bent forward at two, that is, left and right, positions in the horizontal direction and forms a depression along a vertical valley fold line 93. The front wall 84 is formed so as to be bent rearward further outside than the depression in the horizontal direction and forms a ridge line along a vertical peak fold line 94. Accompanying deformation of the front wall 84 the upper standing wall 86 and the lower standing wall 88 deform in a similar manner. The upper frame 81 is formed from for example one sheet of metal plate.

A weld mark 95 due to welding is established on the front wall 84 further outside than the peak fold line 94 in the horizontal direction. The front wall 84 of the upper frame 81 forms the weld mark 95 between itself and the projecting piece 69 of the side frame 38. Weld marks 96, 97 due to welding are established on the upper standing wall 86 and the lower standing wall 88 so as to correspond to positions above and below the weld mark 95. The upper frame 81 is fixed to the left and right side frames 38 via the weld marks 95, 96, 97. The upper standing wall 86 of the upper frame 81 forms the weld mark 96 between itself and the upper superimposition piece 71 of the side frame 38. Similarly, the lower standing wall 88 of the upper frame 81 forms the weld mark 97 between itself and the lower superimposition piece 72.

A ventilation fan 101 of a seat ventilation system 99 is fixed to the lower standing wall 88 of the upper frame 81. The ventilation fan 101 includes a housing 102 that houses an impeller rotating around a rotational axis Rx. The housing 102 is formed into a flat cylindrical shape that is coaxial with the rotational axis Rx, and has an air intake port 103 that extends in a direction tangential to a circular outline. Formed on the outer periphery of the housing 102 are two or more fixing pieces 104 that spread along a plane orthogonal to the rotational axis Rx. The fixing piece 104 is superimposed on a front face of the lower standing wall 88. The fixing piece 104 is joined to the lower standing wall 88 by means of a screw 105 screwed into the lower standing wall 88. The screw 105 has an axis that is parallel to the rotational axis Rx.

Figure 9:
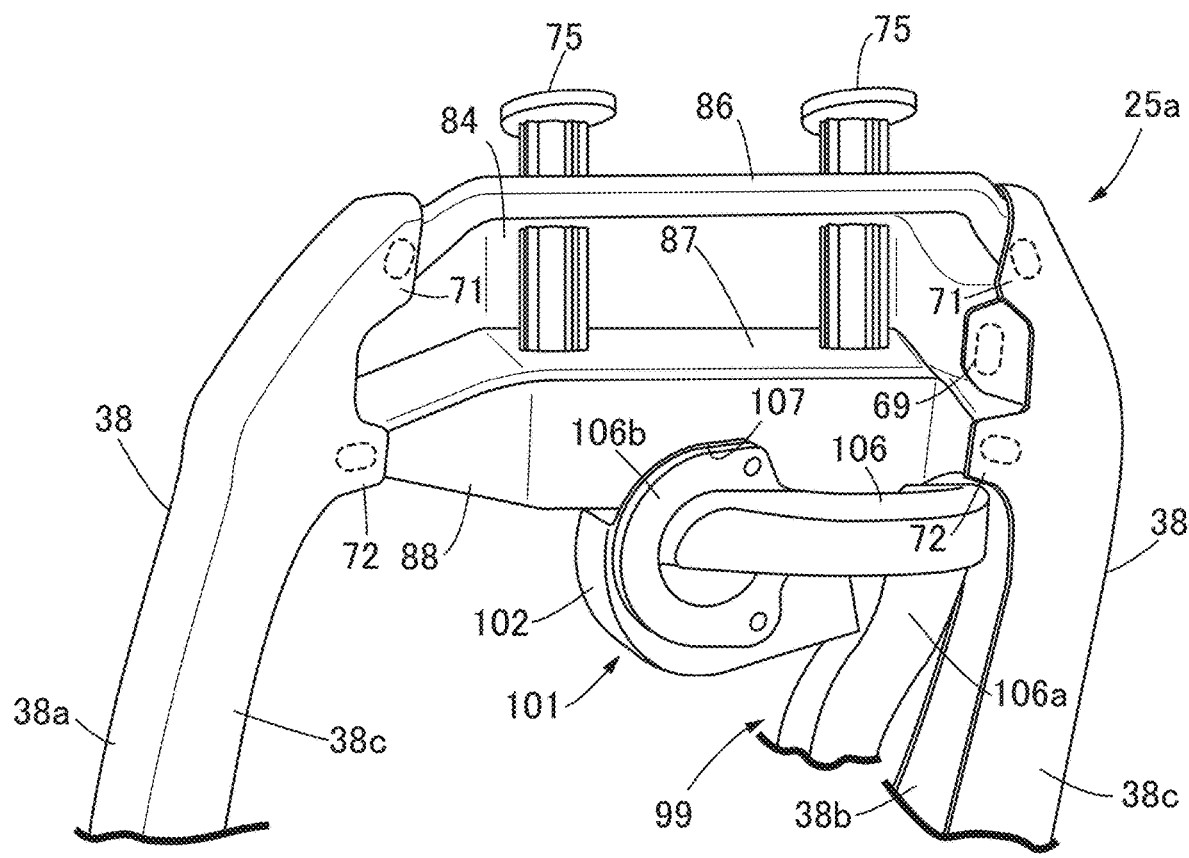
FIG. 9 is an enlarged perspective view of the seat back frame when viewed from a different angle from that in FIG. 8.

As shown in FIG. 9, a ventilation duct 106 is mounted on a rear face of the housing 102. The ventilation duct 106 blocks an opening formed in a rear wall of the housing 102, and receives a flow of air generated in the axial direction of the rotational axis Rx by means of rotation of the impeller. The seat ventilation system 99 includes a passage that is formed in the seat back pad 51 and connected to the ventilation duct 106. A flow of air is supplied to the back of an occupant leaning on the seat back 15 through the passage of the seat back pad 51.

Formed on the ventilation duct 106 is a mounting flange 106b that spreads outward from a pipe body 106a guiding the flow of air and is superimposed on the rear face of the housing 102 around the opening of the rear wall. Formed in the lower standing wall 88 of the upper frame 81 is a cutout 107 having the shape of the outline of the mounting flange 106b. The mounting flange 106b is received by the cutout 107. The rear face of the housing 102 is in intimate contact with the front face of the lower standing wall 88 around the mounting flange 106b. The second flange 92 is discontinued at the cutout 107.

Figure 10:
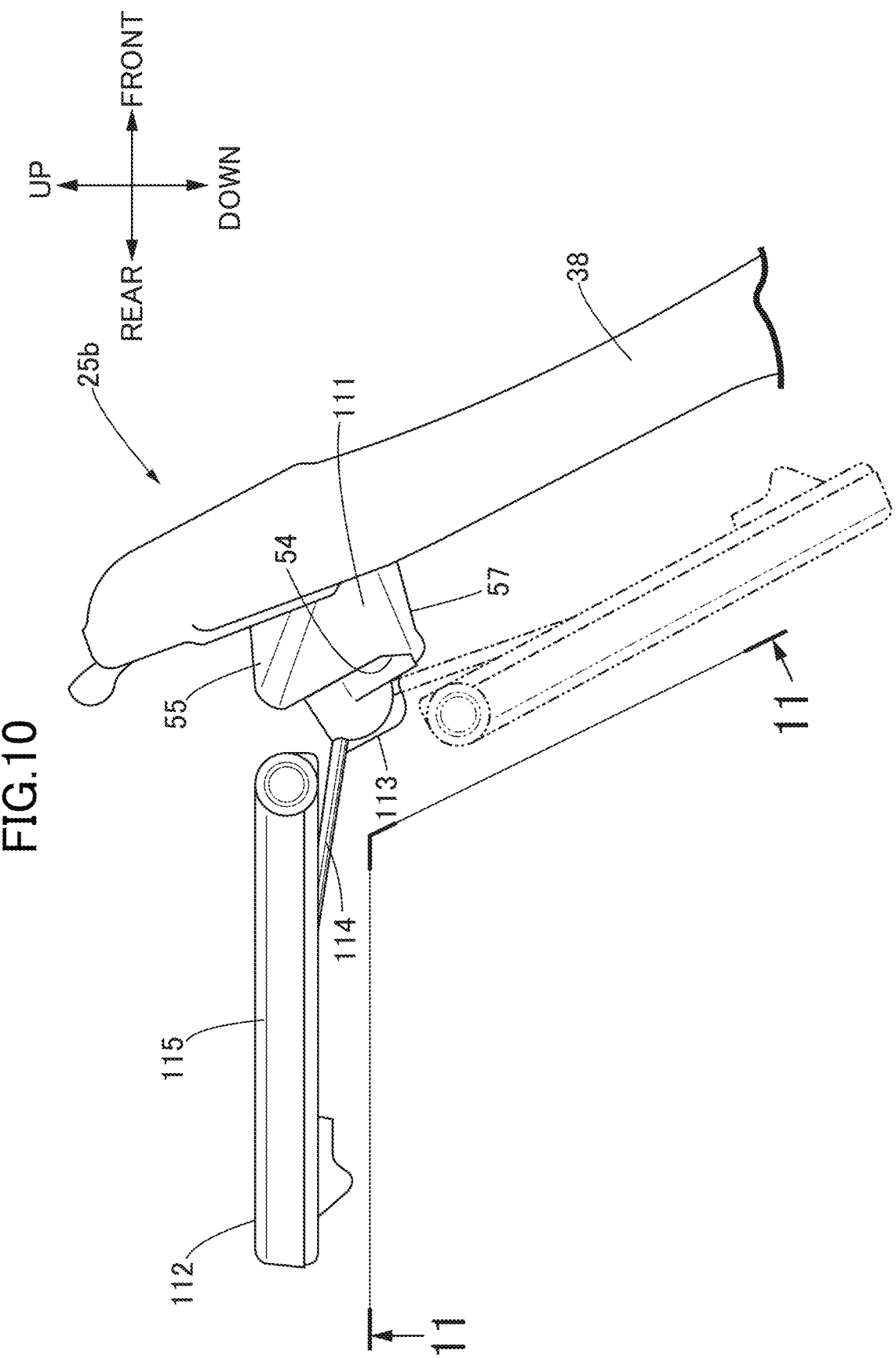
FIG. 10 is an enlarged side view schematically showing part of a seat back frame incorporated into a vehicle seat related to the third embodiment.

FIG. 10 schematically shows part of a seat back frame 25b that is incorporated into a vehicle seat related to a third embodiment of the present invention. In the same way as for the seat back frame 25, the seat back frame 25b includes the left and right side frames 38 that are linked to the inside of the respective cushion side frames 24a via the support shaft 36, and an upper frame 111 that provides a link between upper ends of the side frames 38 above the support shaft 36. The upper frame 111 has the same structure as that of the upper frame 39. Other than the upper frame 111, the arrangement of the vehicle seat is the same as that of the vehicle seat 11 described above.

Figure 11:
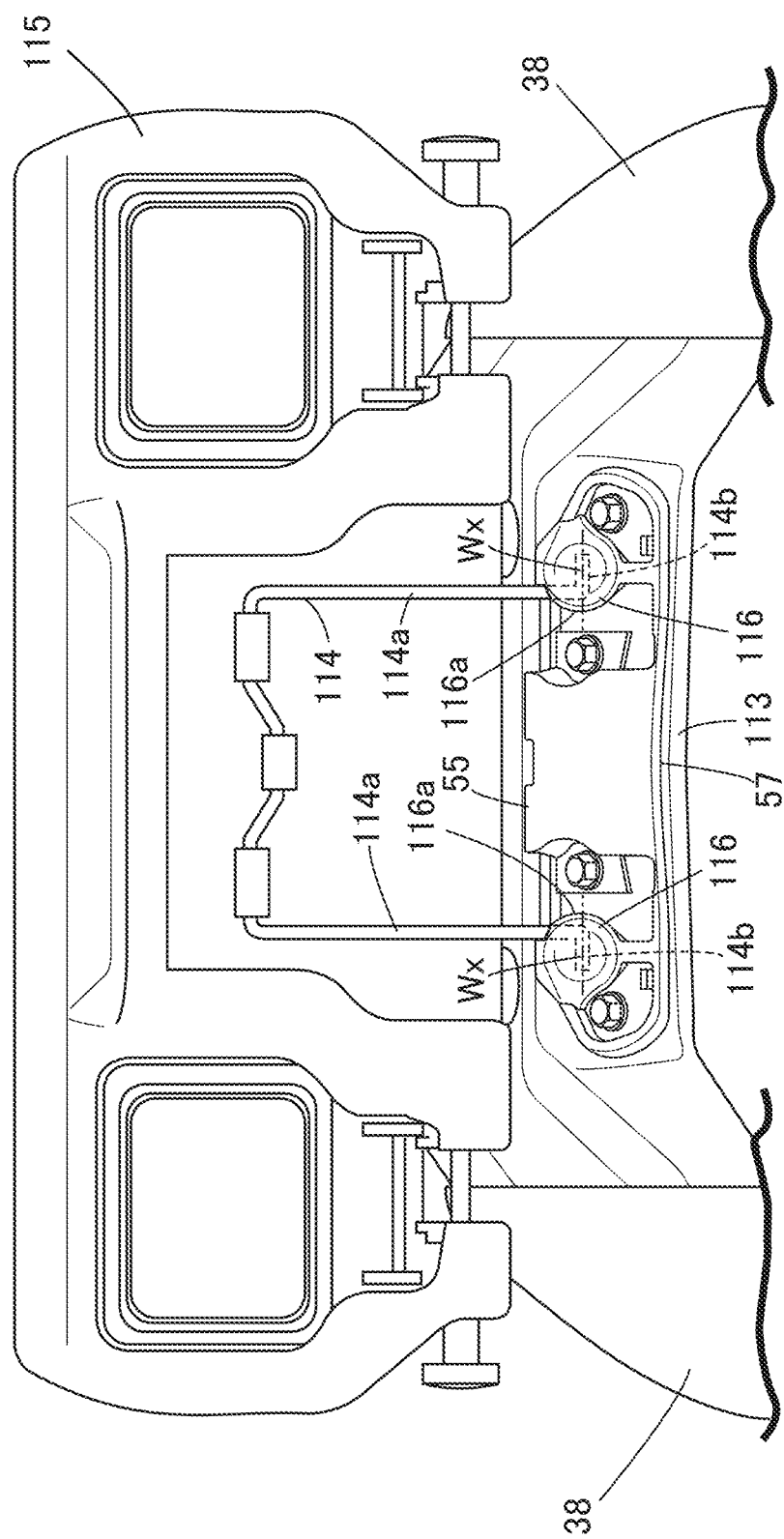
FIG. 11 is an enlarged bottom view schematically showing the structure of a folding type table.

A folding type table 112 is mounted on the front wall 54 of the upper frame 111. The table 112 includes a mounting body 113 that is fixed to the front wall 54, and a top plate 115 that is linked to the mounting body 113 via a wire frame 114 and is displaced between an operating position in which it spreads horizontally and a housed position in which it is housed along the back face of the seat back 15. As shown in FIG. 11, the wire frame 114 has a pair of left and right linking wires 114a that are fixed to a lower face of the top plate 115 and extend toward the mounting body 113, and a shaft wire 114b that is bent from the extremity of the linking wire 114a and supported by the mounting body 113 so that it can rotate coaxially with an axis Wx. Formed on the mounting body 113 is a cam piece 116 that defines the trajectory of the linking wire 114a at the time of rotation while rotatably supporting the shaft wire 114b. The cam piece 116 has a projection 116a that elastically deforms the linking wires 114a so that the linking wires 114a approach each other when they are driven around the axis Wx from the operating position to the housed position in response to an external force. Since the projection 116a restricts movement of the linking wire 114a around the axis Wx the top plate 115 can be retained at the operating position or the housed position by virtue of the projection 116a. The projection 116a converts rotation of the linking wire 114a around the axis Wx into a displacement in the axial direction of the shaft wire 114b.

Figure 12:
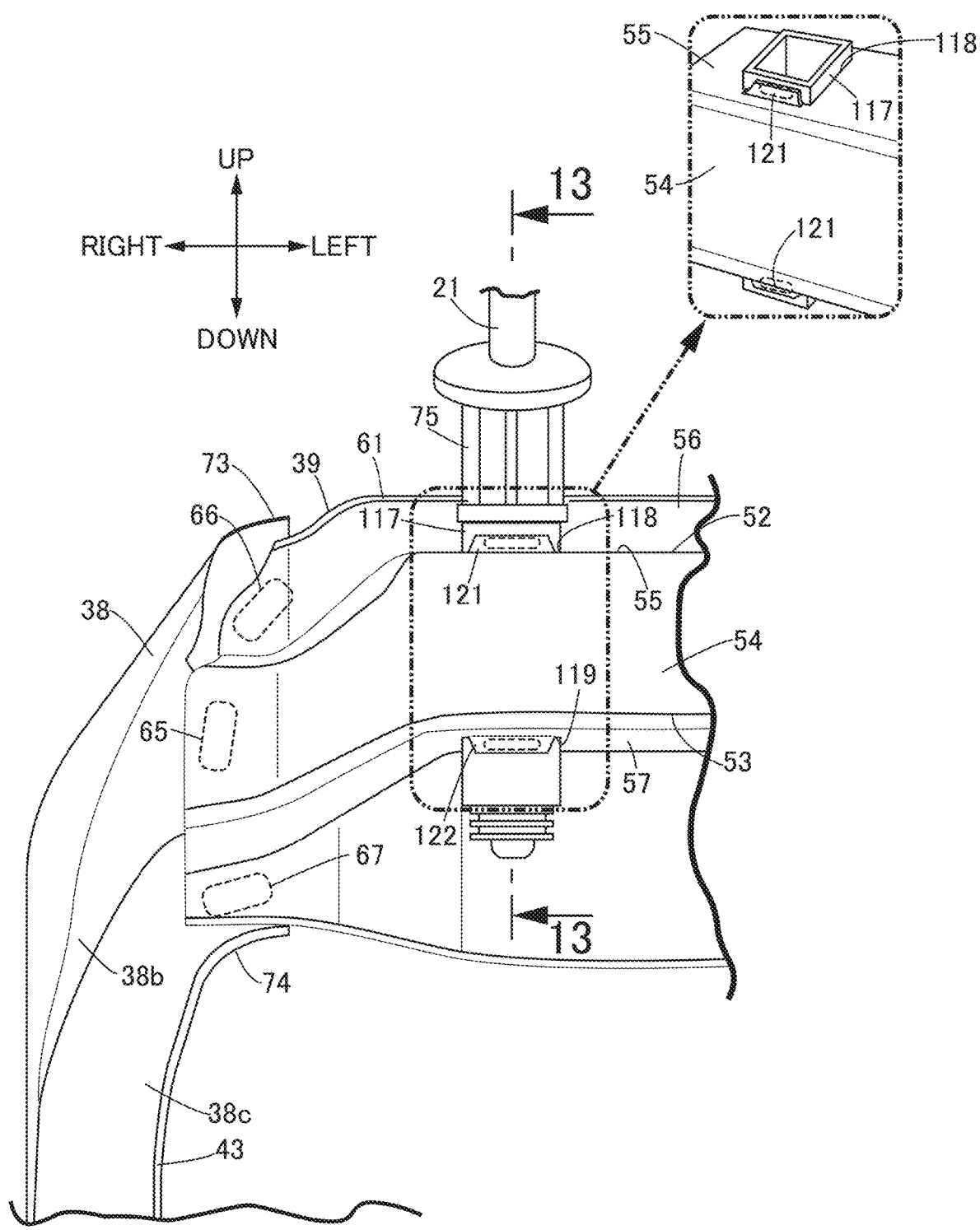
FIG. 12 is an enlarged partial front view schematically showing a support structure of a headrest pillar guide related to another embodiment.
Figure 13:
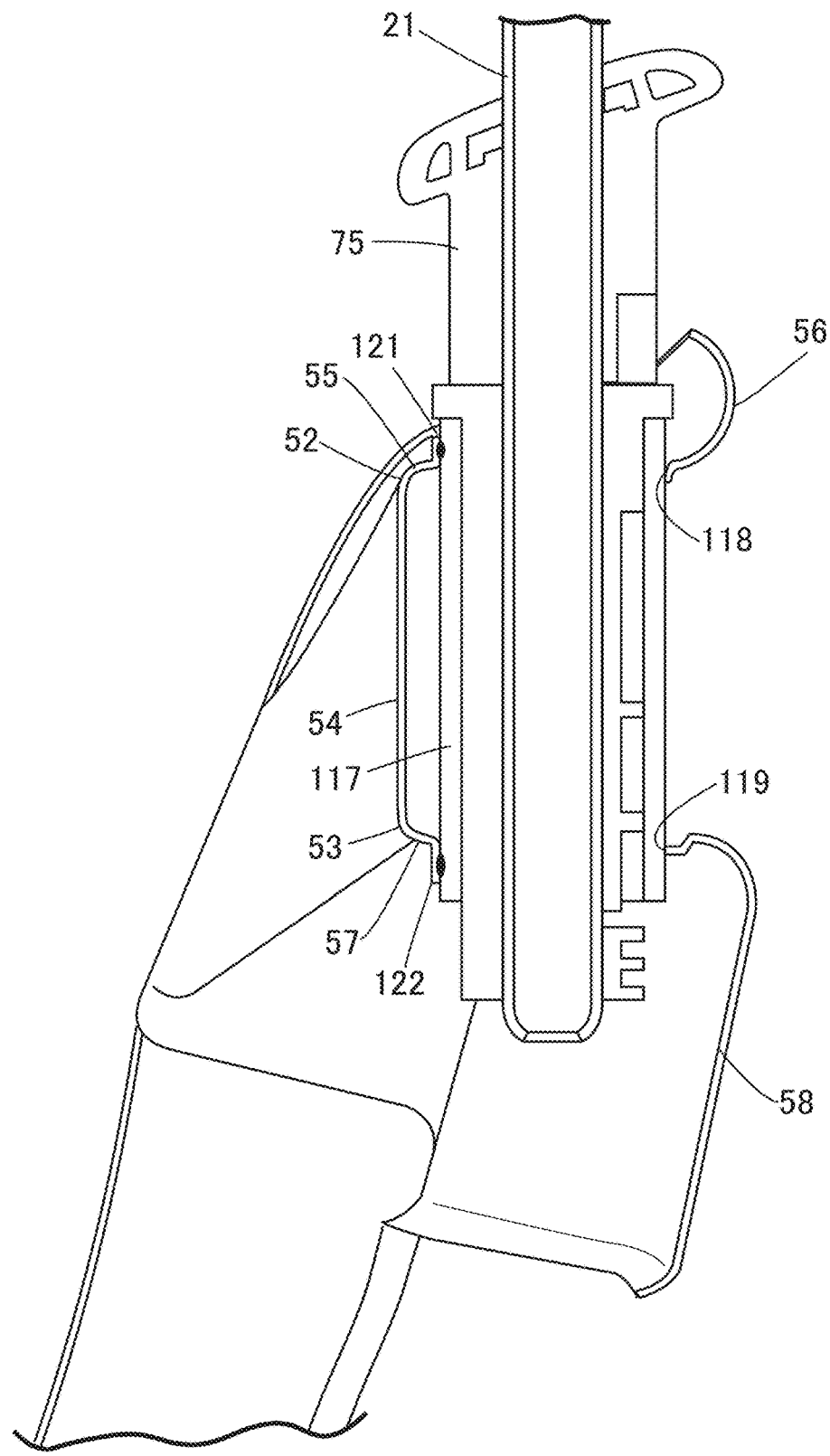
FIG. 13 is an enlarged sectional view along line 13-13 in FIG. 12.

As shown in FIG. 12, in the upper frame 39, when supporting the headrest pillar guide 75, a support tube 117 extending through the upper wall 55 and the lower wall 57 may be inserted into a first support hole 118 and a second support hole 119. In this arrangement, small pieces 121, 122 are formed on the first support hole 118 and the second support hole 119 so as to be bent upward and downward respectively from the peripheral edges. As shown in FIG. 13, the respective small pieces 121, 122 are superimposed on an outer face of the support tube 117. The small pieces 121, 122 are welded to the support tube 117. In this way, the support tube 117 is fixed to the upper frame 39. Since welding can be carried out from the front as in welding of the upper frame 39 and the side frame 38, the efficiency of the assembly operation of the seat frame 23 improves. The headrest pillar guide 75 is press fitted into the support tube 117. Similarly, in the upper frames 81, 111, when supporting the headrest pillar guide 75, the support tube 117 extending through the upper wall 85 (55) and the lower wall 87 (57) may be inserted into the first support hole 118 and the second support hole 119.

Figure 14:
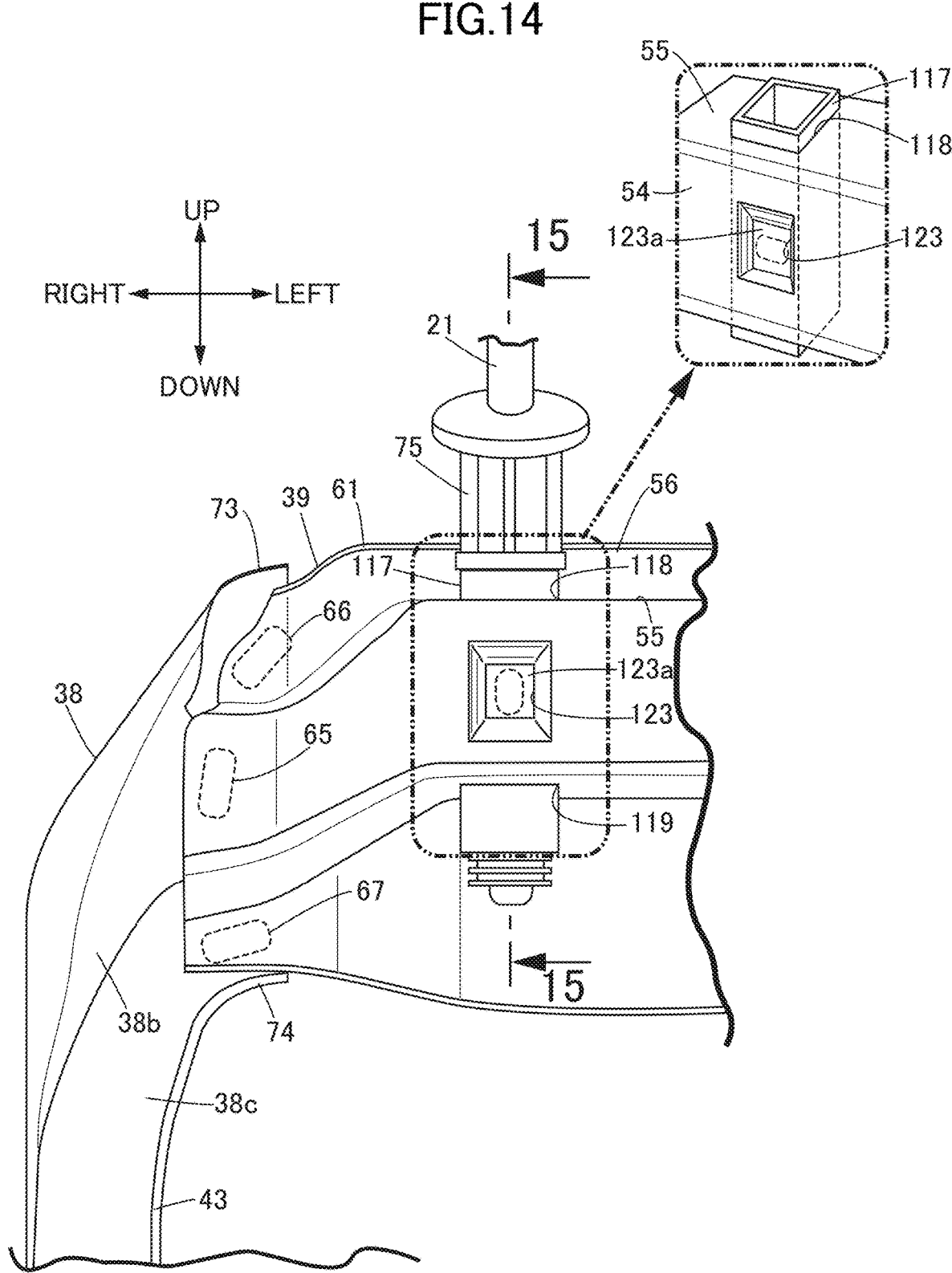
FIG. 14 is an enlarged partial front view schematically showing a support structure of a headrest pillar guide related to yet another embodiment.
Figure 15:
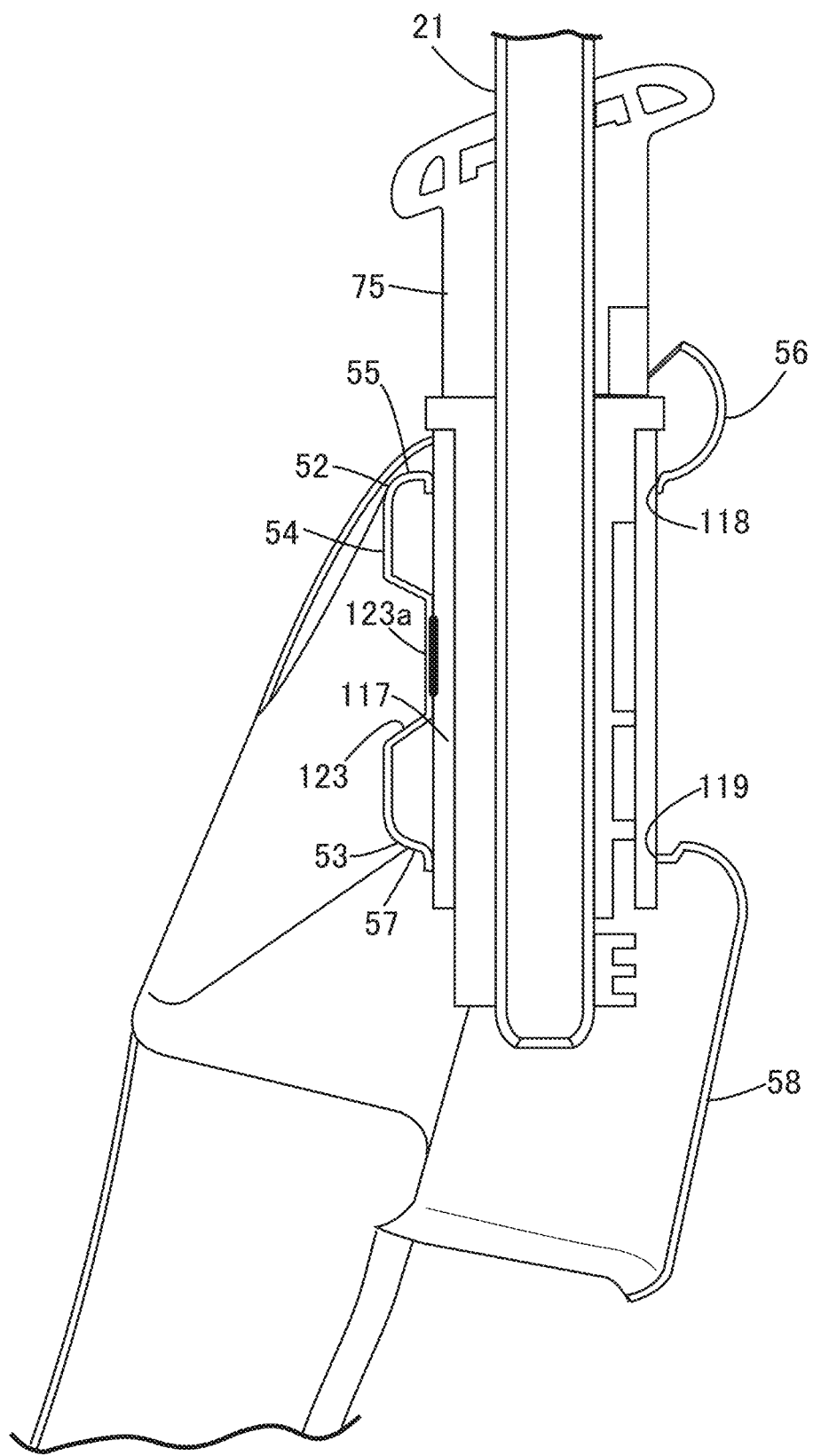
FIG. 15 is an enlarged sectional view along line 15-15 in FIG. 14.

Alternatively, as shown in FIG. 14, in the upper frame 39, when supporting the headrest pillar guide 75, the support tube 117 extending through the upper wall 55 and the lower wall 57 may be inserted into the first support hole 118 and the second support hole 119. In this arrangement, a depression 123 that is recessed toward the headrest pillar guide 75 is formed in the front wall 54. The depression 123 has a flat base plate 123a. As shown in FIG. 15, the base plate 123a of the depression 123 is superimposed on an outer face of the support tube 117. The base plate 123a is welded to the support tube 117. In this way, the support tube 117 is fixed to the upper frame 39. Since welding can be carried out from the front as in welding of the upper frame 39 and the side frame 38, the efficiency of the assembly operation of the seat frame 23 improves. The headrest pillar guide 75 is press fitted into the support tube 117. Similarly, in the upper frames 81, 111, when supporting the headrest pillar guide 75, the support tube 117 extending through the upper wall 85 (55) and the lower wall 87 (57) may be inserted into the first support hole 118 and the second support hole 119.

Embodiments of Solution Means for Second Problem

Embodiments of the present invention are explained below by reference to the attached drawings. In the explanation below, 'fore-and-aft', 'left-and-right', and 'up-and-down' refer to directions viewed by a person seated on a seat in an attitude in which the seated person faces forward in the vehicle fore-and-aft direction.

Figure 16:
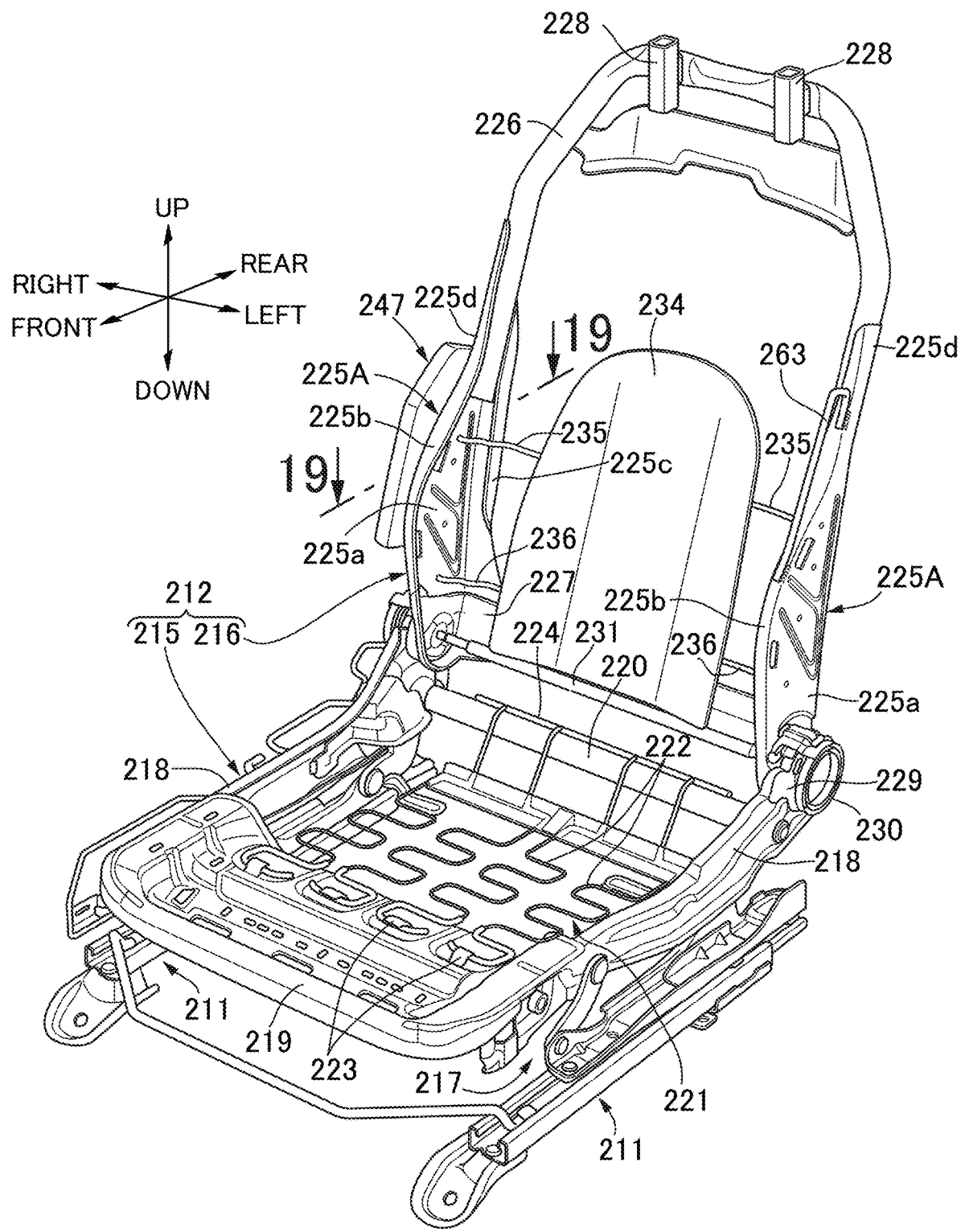
FIG. 16 is a perspective view of a seat frame of the first embodiment.

First, in FIG. 16, a seat frame 212 that can move along a pair of slide rails 211 that extend linearly parallel to each other across a gap in the vehicle width direction includes a seat cushion frame 215 that supports a seat cushion (not illustrated) and a seat back frame 216 that is linked to the seat cushion frame 215 so as to support a seat back 214 (see FIG. 19) disposed above the seat cushion. Provided between the seat cushion frame 215 and the slide rail 211 is a height adjustment mechanism 217 that can adjust the height of the seat cushion frame 215.

The seat cushion frame 215 has a pair of seat cushion-side side frames 218 that extend linearly in the vehicle fore-and-aft direction while being arranged at positions spaced from each other in the vehicle width direction, a pan frame 219 as a linking member that provides a link between front end parts of the seat cushion-side side frames 218, and a rear pipe 220 as a linking member that provides a link between rear end parts of the pair of seat cushion-side side frames 218.

A cushion-side pressure-receiving member 221 that undergoes elastic deformation by receiving the load of a seated person via the seat cushion is stretched between the pan frame 219 and the rear pipe 220. The cushion-side pressure-receiving member 221 has a plurality (four in this embodiment) of seat springs 222 that are formed by curving a metal wire in a zig-zag so as to snake to the left and right, these seat spring 222 being disposed so that adjacent seat springs 222 have lateral symmetry. Front end parts of the plurality of seat springs 222 are each engaged with latching parts 223 provided on the pan frame 219 of the seat frame 212. Rear end parts of mutually adjacent seat springs 222 are engaged with the rear pipe 220 of the seat frame 212 and linked by means of a rear end part-linking member 224 that is made of a resin and molded by insertion molding so as to be integral with the seat spring, the rear end part-linking member 224 being formed so as to cover the rear pipe 220.

The seat back frame 216 has a pair of seat back-side side frames 225A that extend in the up-and-down direction at positions spaced from each other in the vehicle width direction, a headrest mounting bracket 226 as a linking member that provides a link between upper parts of the seat back-side side frames 225A, and a lower frame 227 as a linking member that provides a link between lower end parts of the pair of seat back-side side frames 225A.

The seat back-side side frame 225A is formed by press forming a metal plate material so as to integrally have a side plate portion 225a, a front collar portion 225b that protrudes inward from a front edge part of the side plate portion 225a, and a rear collar portion 225c that protrudes inward from a rear edge part of the side plate portion 225a, and has a substantially U-shaped cross-sectional shape basically opening inward. Formed on an upper part of the seat back-side side frame 225A is a bracket support portion 225d that has a substantially C-shaped cross-sectional shape.

The headrest mounting bracket 226 is formed by bending a pipe material so as to have a substantially U-shaped form opening downward, opposite end parts of the headrest mounting bracket 226 being fitted and fixed to the bracket support portion 225d in the upper part of the seat back-side side frame 225A. Fixed to the headrest mounting bracket 226 are a pair of tubular headrest support members 228.

A linking bracket 229 is fastened to each of rear end parts of the pair of left and right seat cushion-side side frames 218, and lower end parts of the pair of left and right seat back-side side frames 225A are linked to the linking brackets 229 via a reclining unit 230. A rotating shaft 231 of the reclining unit 230 is mounted on lower end parts of the pair of left and right seat back-side side frames 225A so as to extend through the lower frame 227 linked to the lower end parts of the seat back-side side frames 225A, and the angle of the seat back frame 216 with respect to the seat frame 212 can be adjusted by operation of the reclining unit 230.

Disposed between the pair of left and right seat back-side side frames 225A is a back-side pressure-receiving member 234 that can elastically deform in response to receiving the load of a seated person via the seat back. The back-side pressure-receiving member 234, which is formed from a resin, etc. so as to be elastically deformable, is stretched between the left and right seat back-side side frames 225A via an upper linking wire 235 and a lower linking wire 236.

Figure 17:
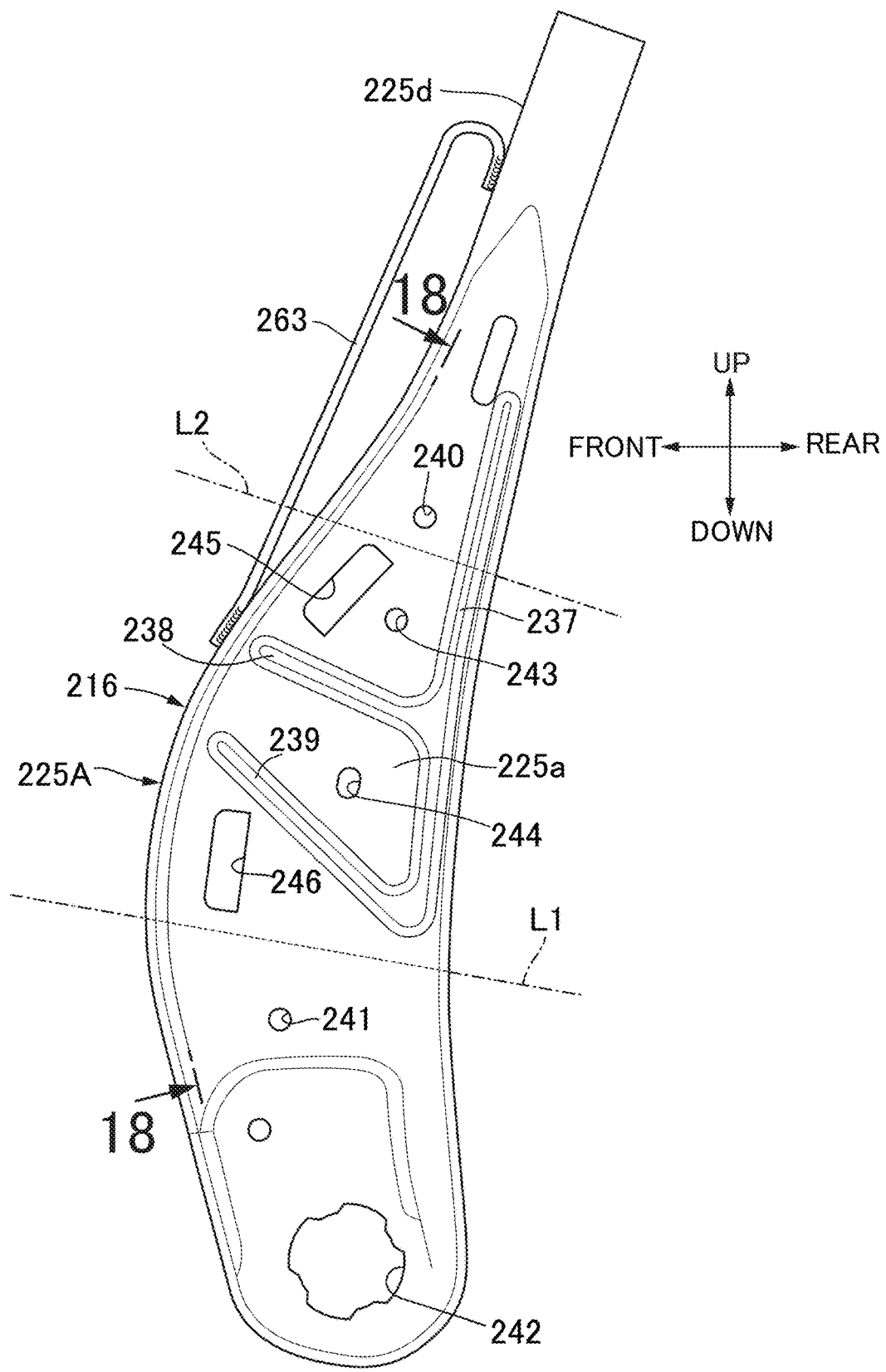
FIG. 17 is a side view of a seat back-side side frame.

In FIG. 17, first, second, and third reinforcing parts 237, 238, 239 that bulge either inward or outward are provided on the side plate portion 225a of the seat back-side side frame 225A. The first reinforcing part 237 is provided so as to extend in the up-and-down direction along the rear edge of the side plate portion 225a. The second reinforcing part 238 and the third reinforcing part 239 extend in a direction intersecting the longitudinal direction of the seat back-side side frame 225A, the second reinforcing part 238 is provided on the side plate portion 225a so as to extend forward in the vehicle fore-and-aft direction from an intermediate part in the up-and-down direction of the first reinforcing part 237, and the third reinforcing part 239 is provided on the side plate portion 225a so as to extend forward in the vehicle fore-and-aft direction while being inclined slightly upward to the front from a lower end part of the first reinforcing part 237. In this embodiment, the first, second, and third reinforcing parts 237, 238, 239 are formed so as to bulge inward when the seat back-side side frame 225A is press formed.

Figure 18:
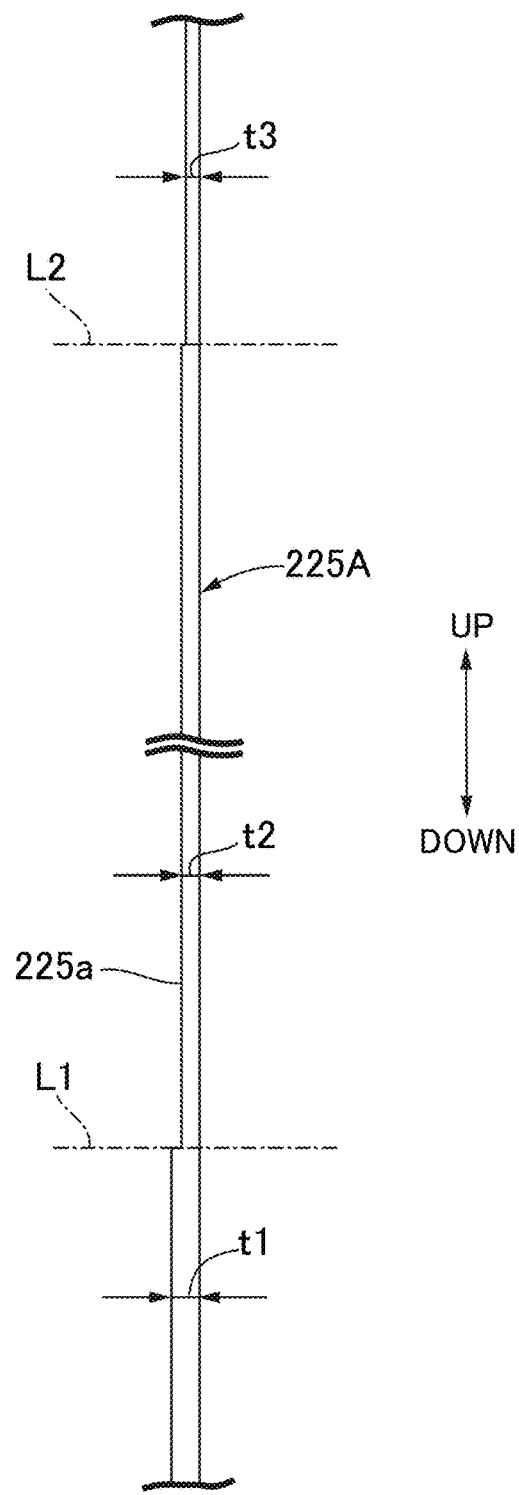
FIG. 18 is a sectional view along line 18-18 in FIG. 17.

In FIG. 18, the seat back-side side frame 225A is formed into a shape that changes in plate thickness on plate thickness boundary lines defined at a plurality of locations in the longitudinal direction of the seat back-side side frame 225A, and in this embodiment the first and second plate thickness boundary lines L1, L2 are set for the seat back-side side frame 225A. Moreover, the first plate thickness boundary line L1 and the second plate thickness boundary line L2 are set at positions that avoid parts via which the headrest mounting bracket 226 and the lower frame 227 are linked to the seat back-side side frame 225A, the first plate thickness boundary line L1 being disposed close to a lower part of the seat back-side side frame 225A, and the second plate thickness boundary line L2 being disposed above the first plate thickness boundary line L1 at an intermediate position in the longitudinal direction of the seat back-side side frame 225A.

The seat back-side side frame 225A is formed so that its thickness decreases stepwise in sequence in going upward such that a plate thickness t2 of the seat back-side side frame 225A between the first plate thickness boundary line L1 and the second plate thickness boundary line L2 is smaller than a plate thickness t1 of the seat back-side side frame 225A below the first plate thickness boundary line L1, and a plate thickness t3 of the seat back-side side frame 225A above the second plate thickness boundary line L2 is smaller than the plate thickness t2.

Referring to FIG. 17, the first reinforcing part 237 is provided on the side plate portion 225a so as to intersect the second plate thickness boundary line L2, and the second reinforcing part 238 and the third reinforcing part 239 are provided on the side plate portion 225a at positions that avoid the first plate thickness boundary line L1 and the second plate thickness boundary line L2, and in this embodiment are disposed between the first plate thickness boundary line L1 and the second plate thickness boundary line L2 in the up-and-down direction.

Formed in the side plate portion 225a so as to avoid the first plate thickness boundary line L1 and the second plate thickness boundary line L2 are first and second through holes 240, 241 for mounting the upper linking wire 235 and the lower linking wire 236 of the back-side pressure-receiving member 234. In this embodiment, the first through hole 240 is formed in the side plate portion 225a above the second plate thickness boundary line L2, and the second through hole 241 is formed in the side plate portion 225a beneath the first plate thickness boundary line L1.

A third through hole 242 for mounting the reclining unit 230 is formed in a lower part of the side plate portion 225a of the seat back-side side frame 225A, the third through hole 242 being formed in the lower part of the side plate portion 225a beneath the first plate thickness boundary line L1 while avoiding the first plate thickness boundary line L1 and the second plate thickness boundary line L2.

When the vehicle seat device of this embodiment is disposed within a vehicle compartment on the right-hand side in the vehicle width direction, among the pair of left and right seat back-side side frames 225A an airbag module 247 is mounted on the right seat back-side side frame 225A as shown in FIG. 16. When the vehicle seat device is disposed within the vehicle compartment on the left-hand side in the vehicle width direction, among the pair of left and right seat back-side side frames 225A the airbag module 247 is mounted on the left seat back-side side frame 225A, and in order to enable the vehicle seat device to be disposed on either the left or right side in the vehicle width direction within the vehicle compartment, the pair of left and right seat back-side side frames 225A are formed symmetrically on the left and right, parts corresponding to each other being illustrated with the same reference numerals and symbols.

Figure 19:
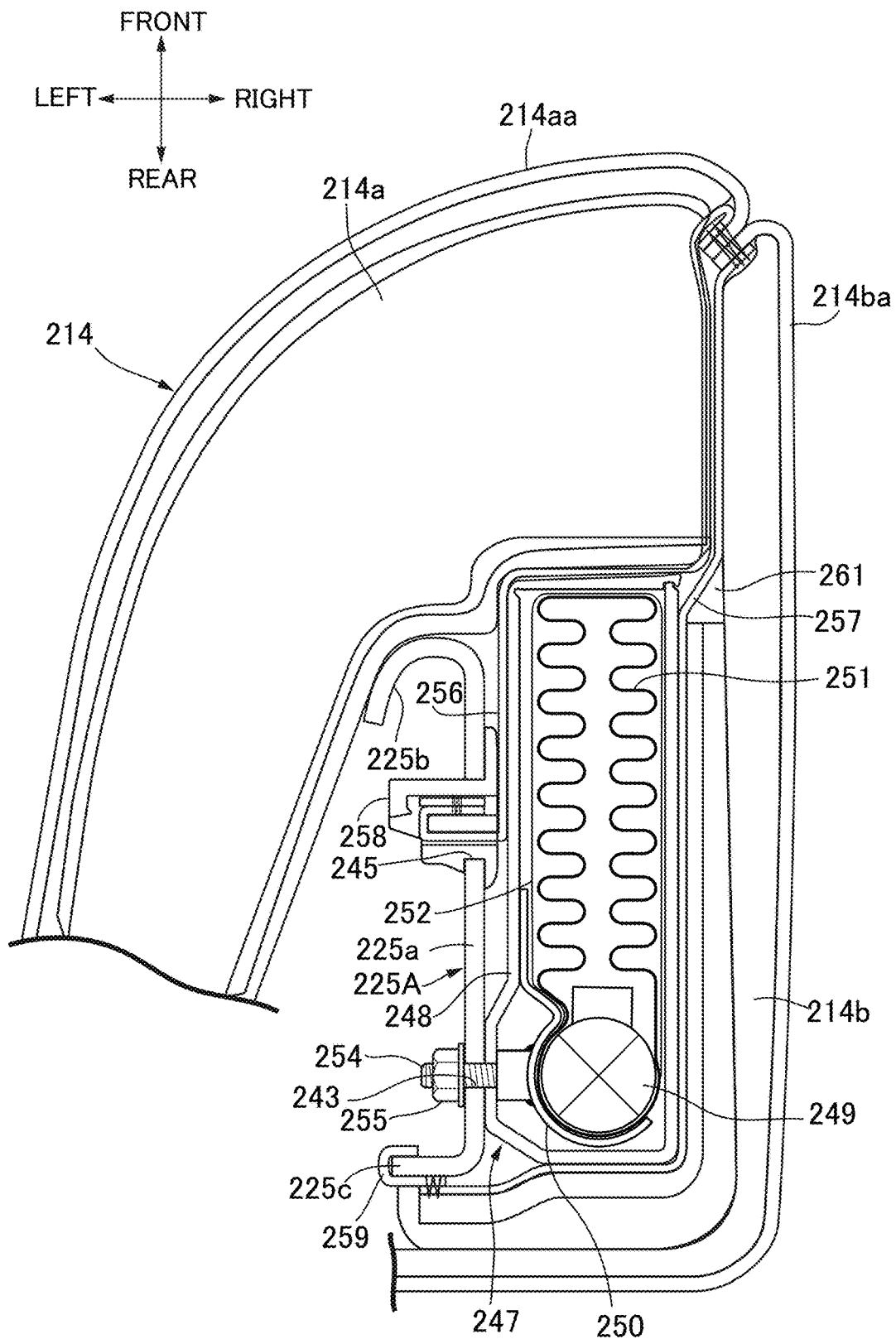
FIG. 19 is a sectional view of a seat device along line 19-19 in FIG. 16, showing a structure via which an airbag is mounted onto the seat back-side side frame.

In FIG. 19, the airbag module 247 includes a box-shaped module case 248 that is flat in the vehicle width direction, an inflator 249 that is housed within the module case 248, a retainer 250 that retains the inflator 249, an airbag 251 that is connected to the inflator 249 so that it can be inflated rapidly with high pressure gas from the inflator 249, and a retaining bag 252 that can be quickly broken when the airbag 251 inflates while being capable of retaining a folded state of the airbag 251.

Fourth and fifth through holes 243, 244 for mounting the airbag 251 are formed in the side plate portion 225a of the seat back-side side frame 225A. A pair of bolts 254 implanted in the retainer 250 are extended through the module case 248 and inserted into the fourth through hole 243 and the fifth through hole 244, and a nut 255 abutting against and engaging with an inner face of the side plate portion 225a is screwed onto the bolt 254. That is, the airbag 251 is mounted on the side plate portion 225a by means of pairs of the bolts 254 and the nuts 255 via the inflator 249 and the retainer 250.

The fourth through hole 243 and the fifth through hole 244 are formed in the side plate portion 225a while avoiding the first plate thickness boundary line L1 and the second plate thickness boundary line L2, and in this embodiment the fourth through hole 243 is formed in the side plate portion 225a beneath the second plate thickness boundary line L2 and above the second reinforcing part 238, and the fifth through hole 244 is formed in the side plate portion 225a so as to be disposed between the first plate thickness boundary line L1 and the second plate thickness boundary line L2 and between the second reinforcing part 238 and the third reinforcing part 239. That is, the airbag 251 is mounted on a site of the side plate portion 225a of the side frame that has a uniform plate thickness between the first plate thickness boundary line L1 and the second plate thickness boundary line L2.

Deployment of the airbag 251 is suppressed by an inner webbing 256 and an outer webbing 257. One end part of the inner webbing 256 is held between an inner front part of the module case 248 and an inner face of the seat back-side side frame 225A, and a resin mounting member 258 fixed to the one end part of the inner webbing 256 is resiliently engaged with a sixth through hole 245 and a seventh through hole 246 formed in the side plate portion 225a of the seat back-side side frame.

The sixth through hole 245 and the seventh through hole 246 are formed into a rectangular shape in the side plate portion 225a at a position that avoids the first plate thickness boundary line L1 and the second plate thickness boundary line L2, and in this embodiment the sixth through hole 245 is formed in the side plate portion 22 so as to be adjacent to the fourth through hole 243 beneath the second plate thickness boundary line L2 and above the second reinforcing part 238, and the seventh through hole 246 is formed in the side plate portion 225a so as to be adjacent to the second through hole 241 between the first plate thickness boundary line L1 and the second plate thickness boundary line L2 and beneath the third reinforcing part 239. That is, the inner webbing 256 is fixed to a site on the side plate portion 225a of the seat back-side side frame 225A that has a uniform plate thickness between the first plate thickness boundary line L1 and the second plate thickness boundary line L2.

A latching hook 259 is secured by sewing to one end part of the outer webbing 257, and the latching hook 259 is engaged with the rear collar portion 225c of the seat back-side side frame 225A to the rear of the module case 248.

The inner webbing 256 and the outer webbing 257 are disposed so as to sandwich the module case 248 from the inside and the outside, are superimposed on one another on the outside of a front end part of the module case 248, extend within a cavity 261 formed between a back pad 214a and a bolster pad 214b of the seat back 214, and are sewed to a back pad outer skin 214aa and a bolster pad outer skin 214ba.

An auxiliary member 263 also functioning as a reinforcing member is fixed to, among the pair of left and right seat back-side side frames 225A, the seat back-side side frame 225A on the side where the airbag module 247 is not mounted, in order to correct the shape of the seat back frame 216, the auxiliary member 263 being formed into a linear shape by bending a metal rod material. The auxiliary member 263 is fixed to the seat back-side side frame 225A so as to protrude forward from the seat back-side side frame 225A. When an occupant is seated on the completed vehicle seat, there is a possibility that the auxiliary member 263 will receive a load from the occupant, and there is a possibility that the load will act on the seat back-side side frame 225A from the auxiliary member 263. The auxiliary member 263 is therefore fixed to the seat back-side side frame 225A while avoiding the first plate thickness boundary line L1 and the second plate thickness boundary line L2 and, moreover, the auxiliary member 263 is secured to the front collar portion 225b of the seat back-side side frame 225A so as to straddle the second plate thickness boundary line L2 while avoiding contact with the seat back-side side frame 225A on the second plate thickness boundary line L2.

Figure 20:
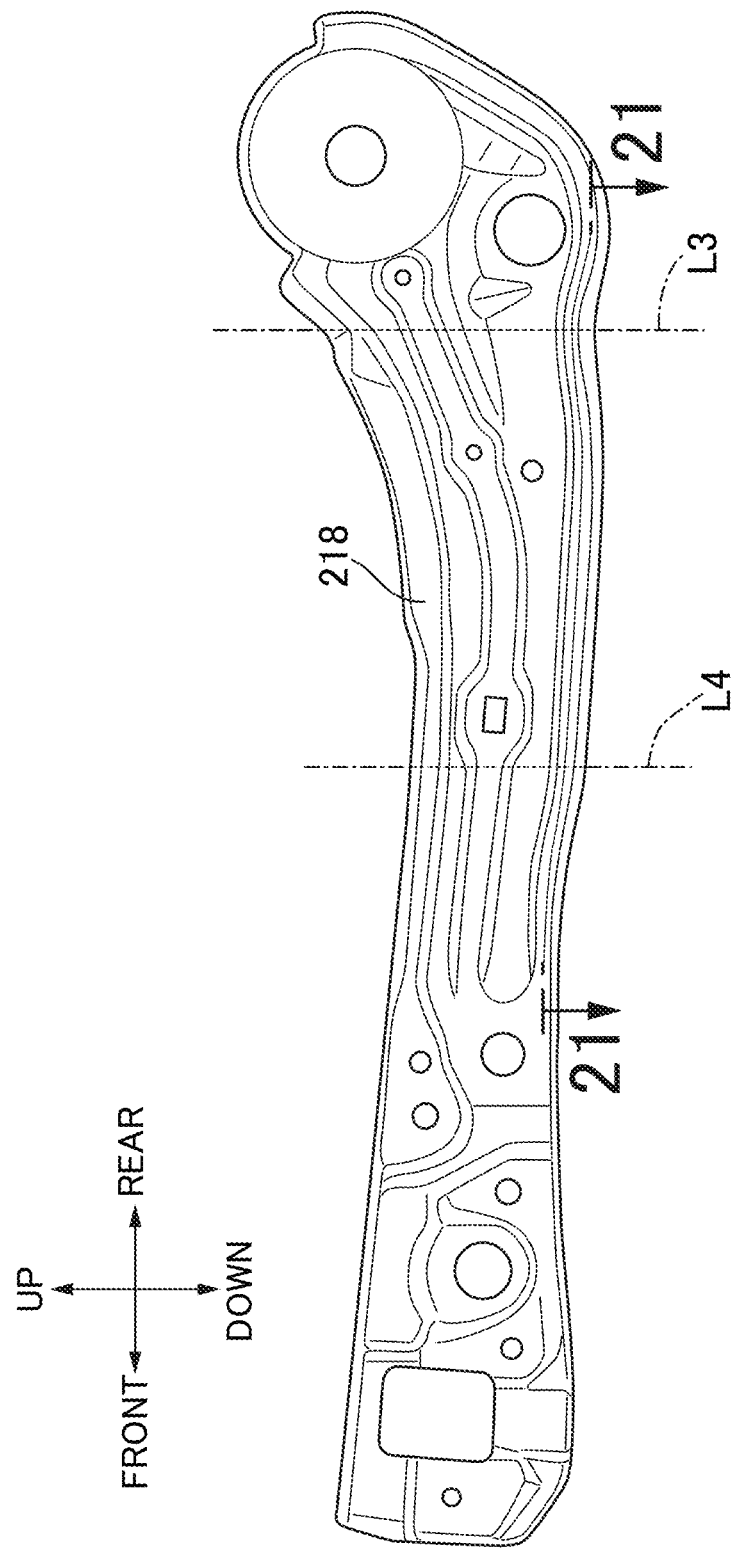
FIG. 20 is a side view of a seat cushion-side side frame.

In FIG. 20, the seat cushion-side side frame 218 of the seat cushion frame 215 is formed by press forming a metal plate material into a shape in which, while basically having a substantially U-shaped cross-sectional shape opening inward, the plate thickness changes at plate thickness boundary lines disposed at a plurality of locations in the longitudinal direction of the seat cushion-side side frame 218. In this embodiment, third and fourth plate thickness boundary lines L3, L4 are set on the seat cushion-side side frame 218. Moreover, the third plate thickness boundary line L3 and the fourth plate thickness boundary line L4 are set at positions that avoid a part via which the pan frame 219 and the rear pipe 220 are linked to the seat cushion-side side frame 218, the third plate thickness boundary line L3 being disposed close to a rear part of the seat cushion-side side frame 218, and the fourth plate thickness boundary line L4 being disposed in front of the third plate thickness boundary line L3 and at an intermediate position in the longitudinal direction of the seat cushion-side side frame 218.

Figure 21:
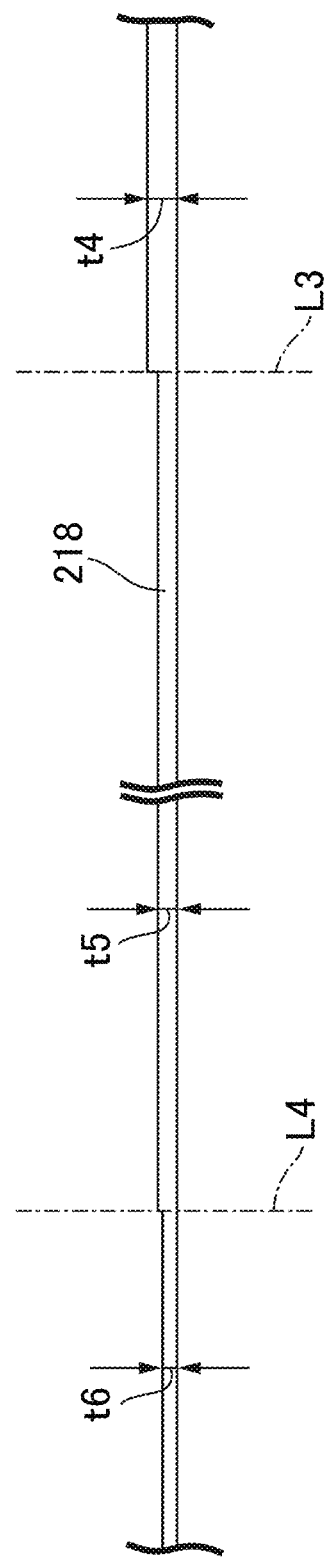
FIG. 21 is a sectional view along line 21-21 in FIG. 20.

In FIG. 21, the seat cushion-side side frame 218 is formed so as to become thinner stepwise in sequence in going forward such that a plate thickness t5 of the seat cushion-side side frame 218 between the third plate thickness boundary line L3 and the fourth plate thickness boundary line L4 is smaller than a plate thickness t4 of the seat cushion-side side frame 218 further rearward than the third plate thickness boundary line L3, and a plate thickness t6 of the seat cushion-side side frame 218 further forward than the fourth plate thickness boundary line L4 is smaller than the plate thickness t5.

The operation of the first embodiment is now explained. The seat back-side side frame 225A of the seat back frame 216 is formed into a shape that changes its plate thickness on the first plate thickness boundary line L1 and the second plate thickness boundary line L2, which are disposed at positions that avoid a part via which it is linked to the headrest mounting bracket 226 and the lower frame 227, at a plurality of locations (in this embodiment two locations) in the longitudinal direction of the seat back-side side frame 225A. The seat cushion-side side frame 218 of the seat cushion frame 215 is formed into a shape that changes its plate thickness on the third plate thickness boundary line L3 and the fourth plate thickness boundary line L4, which are disposed at positions that avoid a part via which it is linked to the pan frame 219 and the rear pipe 220, at a plurality of locations (in this embodiment two locations) in the longitudinal direction of the seat cushion-side side frame 218. It is therefore possible to suppress any increase in the weight while ensuring a necessary strength for the seat back-side side frame 225A and the seat cushion-side side frame 218 in the seat back frame 216 and the seat cushion frame 215 and, moreover, it is possible to avoid affecting the rigidity of the parts via which the seat back-side side frame 225A is linked to the headrest mounting bracket 226 and the lower frame 227 and the rigidity of the parts via which the seat cushion-side side frame 218 is linked to the pan frame 219 and the rear pipe 220.

Furthermore, since the second reinforcing part 238 and the third reinforcing part 239, which extend in a direction intersecting the longitudinal direction of the seat back-side side frame 225A and protrude either inward or outward, are provided at positions, avoiding the first plate thickness boundary line L1 and the second plate thickness boundary line L2, of the seat back-side side frame 225A, it is possible to further increase the strength of the seat back-side side frame 225A while not affecting the rigidity of the parts via which the seat back-side side frame 225A is linked to the headrest mounting bracket 226 and the lower frame 227.

Moreover, since the auxiliary member 263, which exhibits a reinforcing function, is fixed to the seat back-side side frame 225A so as to straddle the second plate thickness boundary line L2 while avoiding contact with the seat back-side side frame 225A on the second plate thickness boundary line L2, it is possible to enhance the rigidity of the seat back-side side frame 225A on the second plate thickness boundary line L2.

Furthermore, since the first reinforcing part 237, which extends along the longitudinal direction of the seat back-side side frame 225A and protrudes either inward or outward, is provided on the seat back-side side frame 225A so as to intersect the second plate thickness boundary line L2, it is possible to enhance the rigidity of the seat back-side side frame 225A on the second plate thickness boundary line L2.

Moreover, since formed in the seat back-side side frame 225A are the first through hole 240 and second through hole 241, which are for mounting the back-side pressure-receiving member 234 as a mounted component, the third through hole 242, which is for mounting the reclining unit 230 as a mounted component, the fourth through hole 243 and fifth through hole 244, which are for mounting the airbag 251 as a mounted component, and the sixth through hole 245 and seventh through hole 246, which are for mounting the inner webbing 256 as a mounted component, and the first plate thickness boundary line L1 and the second plate thickness boundary line L2 are set so as to avoid the first to seventh through holes 240 to 246, it is possible to avoid affecting the first plate thickness boundary line L1 and the second plate thickness boundary line L2 on the rigidity with which the back-side pressure-receiving member 234, the reclining unit 230, the airbag 251, and the inner webbing 256 are mounted on the seat back-side side frame 225A.

Furthermore, since the airbag 251 is mounted on a site on the seat back-side side frame 225A that has a uniform plate thickness, it is possible to enhance the rigidity of this site on the seat back-side side frame 225A, which has a uniform plate thickness.

Moreover, since the inner webbing 256 for suppressing deployment of the airbag 251 is fixed to a site of the seat back-side side frame 225A that has a uniform plate thickness, it is possible to suppress the influence on the first plate thickness boundary line L1 and second plate thickness boundary line L2 when the airbag 251 is deployed.

Furthermore, since the auxiliary member 263, which could receive a load from an occupant when the occupant is seated, is fixed to the seat back-side side frame 225A while avoiding the first plate thickness boundary line L1 and the second plate thickness boundary line L2, it is possible to suppress the influence of the load from the auxiliary member 263 on a part of the plate thickness boundary line of the seat back-side side frame 225A.

Moreover, since the back-side pressure-receiving member 234, which undergoes elastic deformation when receiving a load from a seated person, is mounted at a position of the seat back-side side frame 225A that avoids the first plate thickness boundary line L1 and the second plate thickness boundary line L2, it is possible to suppress the influence on a part of the plate thickness boundary line of the seat back-side side frame 225A by the load from the back-side pressure-receiving member 234.

Figure 22:
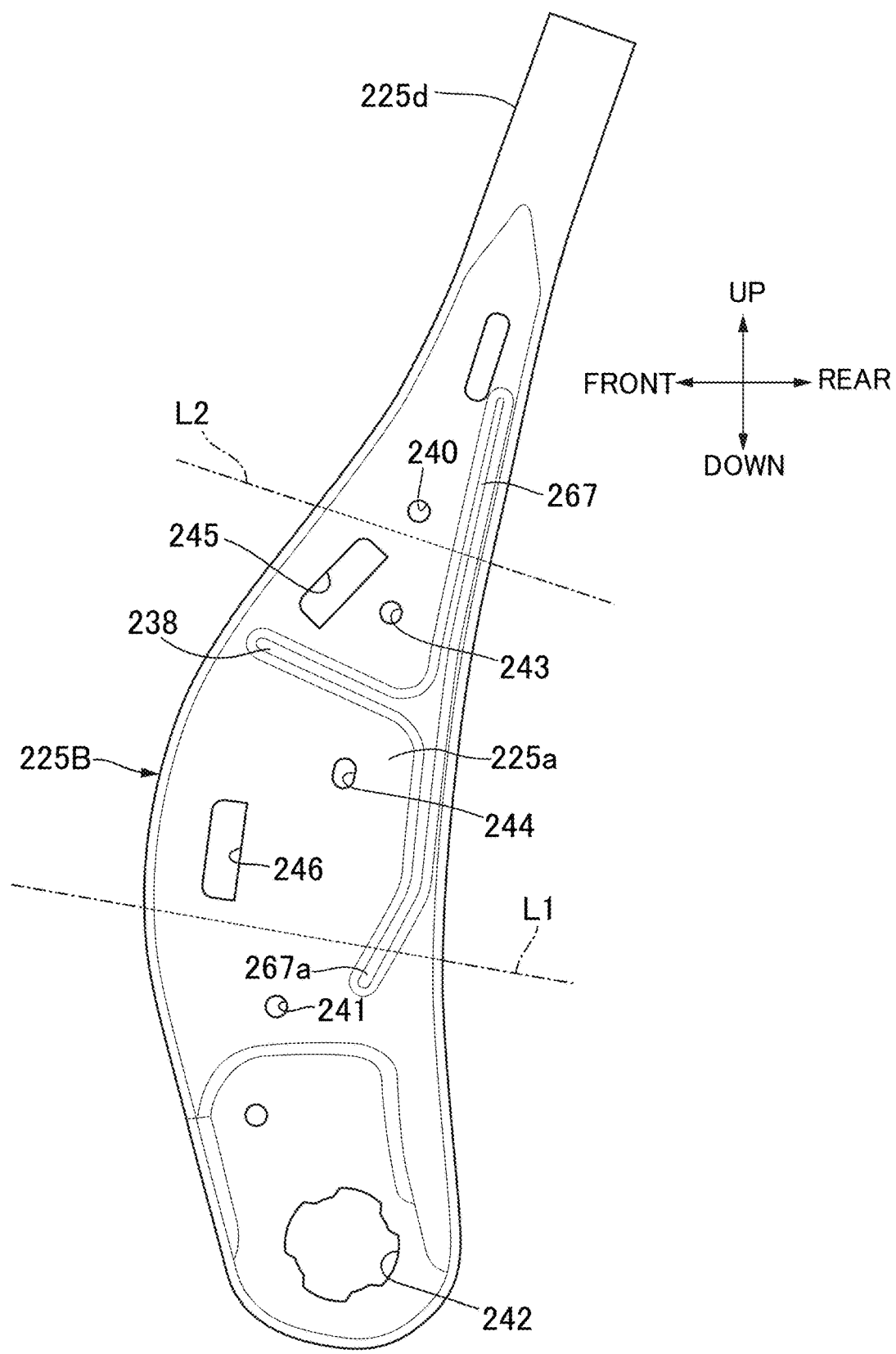
FIG. 22 is a side view of a seat back-side side frame of the second embodiment.

A second embodiment of the present invention is explained by referring to FIG. 22: parts corresponding to those of the first embodiment are denoted by the same reference numerals and symbols and illustrated only, detailed explanation thereof being omitted.

The side plate portion 225a of a seat back-side side frame 225B is formed so as to become thinner stepwise in going upward such that the plate thickness changes on the first and second plate thickness boundary lines L1, L2, and the side plate portion 225a is provided with a fourth reinforcing part 267 and the second reinforcing part 238, which bulge either inward or outward. The fourth reinforcing part 267 is provided on the side plate portion 225a so as to extend in the up-and-down direction along the rear edge of the side plate portion 225a while having in its lower part an inclined portion 267a that is inclined downward to the front. The second reinforcing part 238 is provided on the side plate portion 225*a* while extending in a direction intersecting the longitudinal direction of the seat back-side side frame 225B and extending forward in the vehicle fore-and-aft direction from an intermediate part in the up-and-down direction of the fourth reinforcing part 267, and in this embodiment the fourth reinforcing part 267 and the second reinforcing part 238 are formed so as to bulge inward when press forming the seat back-side side frame 225B.

The fourth reinforcing part 267 is provided on the side plate portion 225*a* so as to intersect the first plate thickness boundary line L1 and the second plate thickness boundary line L2 while ensuring that the inclined portion 267*a* intersects the first plate thickness boundary line L1.

In accordance with the second embodiment, since the second reinforcing part 238 is provided at a position that avoids the first plate thickness boundary line L1 and the second plate thickness boundary line L2 in the seat back-side side frame 225B, the second reinforcing part 238 extending in a direction intersecting the longitudinal direction of the seat back-side side frame 225B and bulging either inward or outward, it is possible to further increase the strength of the seat back-side side frame 225B while not affecting the rigidity of parts of the seat back-side side frame 225B that are linked to the headrest mounting bracket 226 (see FIG. 16) and the lower frame 227 (see FIG. 16).

Furthermore, since the fourth reinforcing part 267, which extends along the longitudinal direction of the seat back-side side frame 225B and bulges either inward or outward, is provided on the seat back-side side frame 225B so as to intersect the first plate thickness boundary line L1 and the second plate thickness boundary line L2, it is possible to enhance the rigidity of the seat back-side side frame 225B on the first plate thickness boundary line L1 and the second plate thickness boundary line L2.

Figure 23:
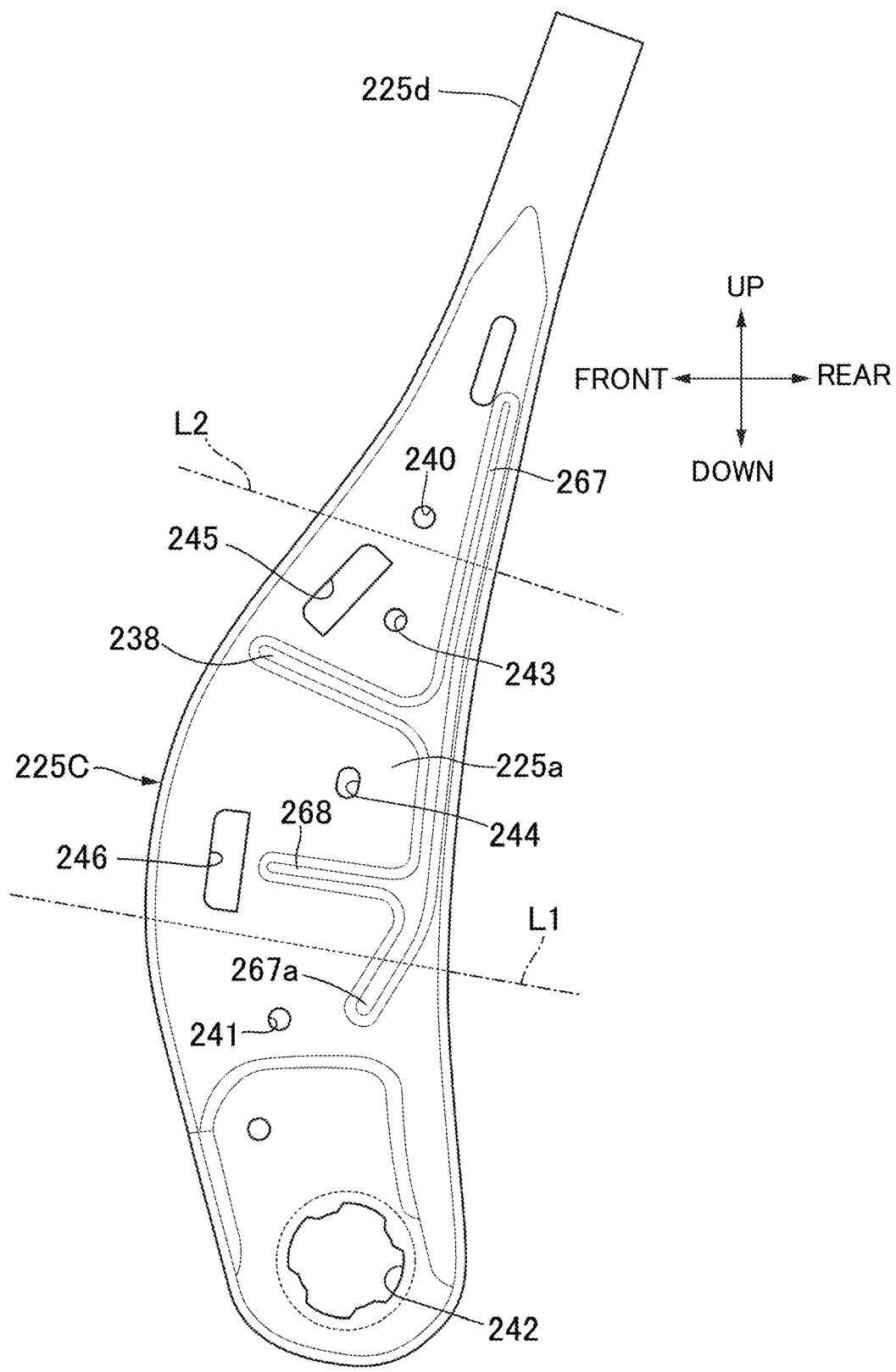
FIG. 23 is a side view of a seat back-side side frame of the third embodiment.

A third embodiment of the present invention is explained by reference to FIG. 23: parts corresponding to those of the first and second embodiments are denoted by the same reference numerals and symbols and illustrated only, detailed explanation thereof being omitted.

The side plate portion 225*a* of a seat back-side side frame 225C is formed so as to become thinner stepwise in sequence in going upward so that the plate thickness changes on the first and second plate thickness boundary lines L1, L2, and the side plate portion 225*a* is provided with the fourth reinforcing part 267, a fifth reinforcing part 268, and the second reinforcing part 238, which bulge either inward or outward. The fifth reinforcing part 268 is provided on the side plate portion 225*a* so as to extend forward in the vehicle fore-and-aft direction along a direction intersecting the longitudinal direction of the seat back-side side frame 225C from the base end part of the inclined portion 267*a* of the fourth reinforcing part 267. The second reinforcing part 238 is provided on the side plate portion 225*a* so as to extend in a direction intersecting the longitudinal direction of the seat back-side side frame 225C, and in this embodiment the fourth reinforcing part 267, the fifth reinforcing part 268, and the second reinforcing part 238 are formed so as to bulge inward when press forming the seat back-side side frame 225C.

The fifth reinforcing part 268 is provided on the side plate portion 225*a* at a position that avoids the first plate thickness boundary line L1 and the second plate thickness boundary line L2 in the same manner as for the second reinforcing part 238.

In accordance with the third embodiment, since the fifth reinforcing part 268 and second reinforcing part 238, which extend in a direction intersecting the longitudinal direction of the seat back-side side frame 225C and bulge either inward or outward, are provided at positions of the seat back-side side frame 225C that avoid the first plate thickness boundary line L1 and the second plate thickness boundary line L2, it is possible to further increase the strength of the seat back-side side frame 225C while not affecting the rigidity of parts of the seat back-side side frame 225C that are linked to the headrest mounting bracket 226 (see FIG. 16) and the lower frame 227 (see FIG. 16).

Furthermore, since the fourth reinforcing part 267, which extends along the longitudinal direction of the seat back-side side frame 225C and bulges either inward or outward, is provided on the seat back-side side frame 225C so as to intersect the first plate thickness boundary line L1 and the second plate thickness boundary line L2, it is possible to enhance the rigidity of the seat back-side side frame 225C on the first plate thickness boundary line L1 and the second plate thickness boundary line L2.

Figure 24:
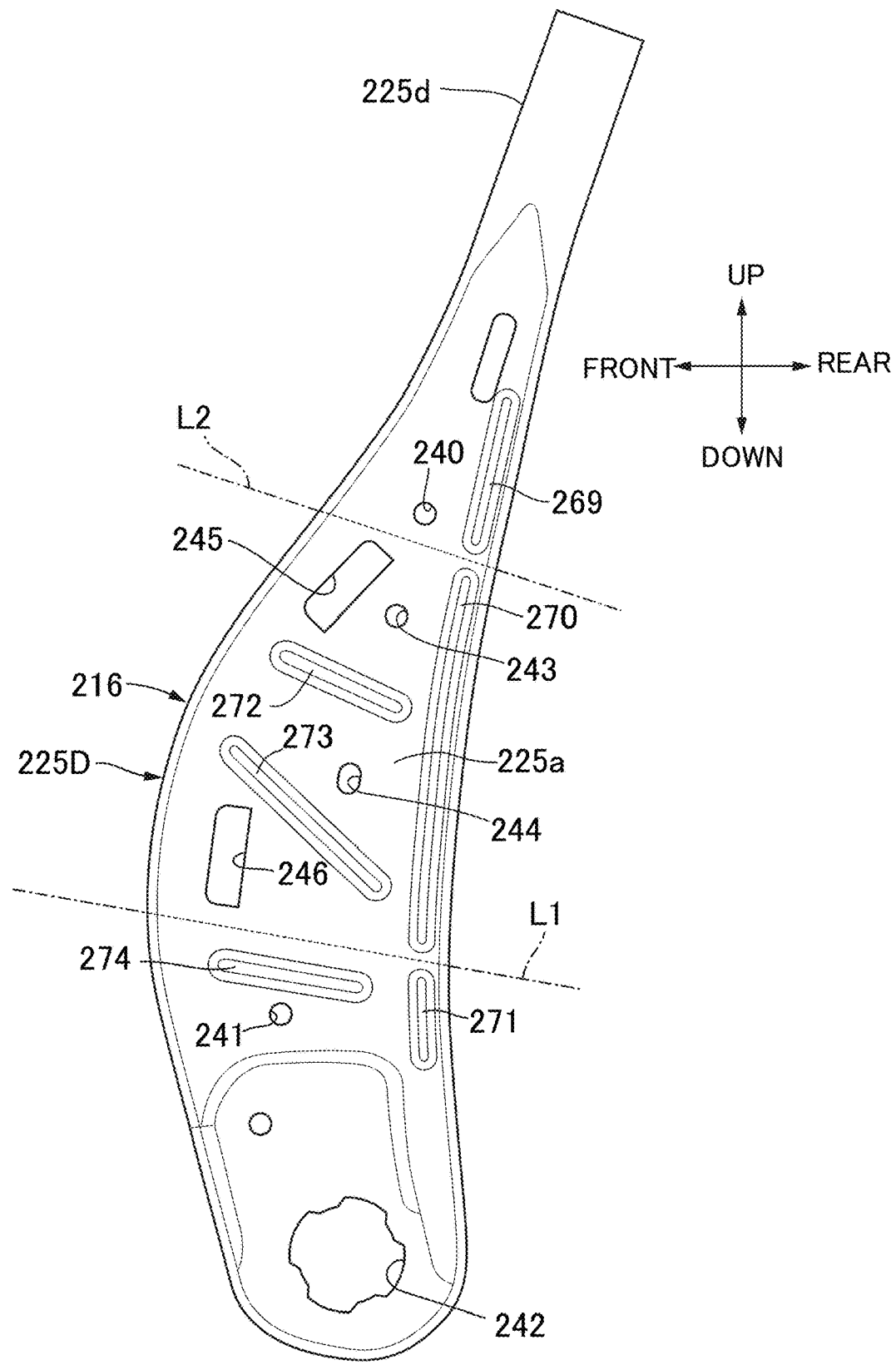
FIG. 24 is a side view of a seat back-side side frame of the fourth embodiment.

A fourth embodiment of the present invention is explained by reference to FIG. 24; parts corresponding to those of the first to third embodiments are denoted by the same reference numerals and symbols and illustrated only, detailed explanation thereof being omitted.

The side plate portion 225*a* of a seat back-side side frame 225D is formed so as to become thinner stepwise in sequence in going upward so that the plate thickness changes on the first and second plate thickness boundary lines L1, L2, and the side plate portion 225*a* is provided with sixth to eleventh reinforcing parts 269, 270, 271, 272, 273, 274 that bulge either inward or outward, in this embodiment these reinforcing parts 269 to 274 being formed so as to bulge inward when press forming the seat back-side side frame 225D.

The sixth reinforcing part 269, the seventh reinforcing part 270 and the eighth reinforcing part 271 extend in the up-and-down direction while following the rear edge of the side plate portion 225*a*, the sixth reinforcing part 269 is provided on the side plate portion 225*a* above the second plate thickness boundary line L2, the seventh reinforcing part 270 is provided on the side plate portion 225*a* between the first plate thickness boundary line L1 and the second plate thickness boundary line L2, and the eighth reinforcing part 271 is provided on the side plate portion 225*a* below the first plate thickness boundary line L1.

Furthermore, the ninth reinforcing part 272, the tenth reinforcing part 273, and the eleventh reinforcing part 274 are disposed so as to be separate from the sixth, seventh, and eighth reinforcing parts 269, 270, 271 while extending forward in the vehicle fore-and-aft direction along a direction intersecting the longitudinal direction of the seat back-side side frame 225D, the ninth reinforcing part 272 and the tenth reinforcing part 273 are provided on the side plate portion 225*a* between the first plate thickness boundary line L1 and the second plate thickness boundary line L1, and the eleventh reinforcing part 274 is provided on the side plate portion 225*a* below the first plate thickness boundary line L1.

In accordance with the fourth embodiment, since the sixth to eleventh reinforcing parts 269 to 274 are provided on the side plate portion 225*a* at positions of the seat back-side side frame 225D that avoid the first plate thickness boundary line L1 and the second plate thickness boundary line L2, it is possible to further increase the strength of the seat back-side side frame 225D while not affecting the rigidity of parts of the seat back-side side frame 225D that are linked to the headrest mounting bracket 226 (see FIG. 16) and the lower frame 227 (see FIG. 16).

Embodiments of the present invention are explained above, but the present invention is not limited to the embodiments and may be modified in a variety of ways as long as the modifications do not depart from the present invention described in Claims.

Embodiments of Solution Means for Third Problem

Embodiments of the present invention are explained below by reference to the attached drawings. In the explanation below, 'fore-and-aft', 'left-and-right', and 'up-and-down' refer to directions viewed by a seated person in a state in which the seated person is in an attitude facing forward in the vehicle fore-and-aft direction.

First, in FIG. 25, a seat frame 312 that can move along a pair of slide rails 311 that extend linearly parallel to each other across a gap in the vehicle width direction includes a seat cushion frame 315 that supports a seat cushion (not illustrated) and a seat back frame 316 that is linked to the seat cushion frame 315 so as to support a seat back (not illustrated) disposed above the seat cushion. Provided between the seat cushion frame 315 and the slide rail 311 is a height adjustment mechanism 317 that can adjust the height of the seat cushion frame 315.

The seat cushion frame 315 has a pair of seat cushion-side side frames 318 that extend linearly in the vehicle fore-and-aft direction while being arranged at positions spaced from each other in the vehicle width direction, a pan frame 319 that provides a link between front end parts of the seat cushion-side side frames 318, and a rear pipe 320 that provides a link between rear end parts of the pair of seat cushion-side side frames 318.

A cushion-side pressure-receiving member 321 that undergoes elastic deformation by receiving the load of a seated person via the seat cushion is stretched between the pan frame 319 and the rear pipe 320. The cushion-side pressure-receiving member 321 has a plurality (four in this embodiment) of seat springs 322 that are formed by curving a metal wire in a zig-zag so as to snake to the left and right, these seat springs 322 being disposed so that adjacent seat springs 322 have lateral symmetry. Front end parts of the plurality of seat springs 322 are each engaged with latching parts 323 provided on the pan frame 319 of the seat frame 312. Rear end parts of mutually adjacent seat springs 322 are engaged with the rear pipe 320 of the seat frame 312 and linked by means of a rear end part-linking member 324 that is made of a resin and molded by insertion molding so as to be integral with the seat spring, the rear end part-linking member 324 being formed so as to cover the rear pipe 320.

The seat back frame 316 has a pair of seat back-side side frames 325A that extend in the up-and-down direction at positions spaced from each other in the vehicle width direction, a headrest mounting bracket 326 that provides a link between upper parts of the seat back-side side frames 325A, and a lower frame 327 that provides a link between lower end parts of the pair of seat back-side side frames 325A.

Referring in addition to FIG. 26 and FIG. 27, the seat back-side side frame 325A is formed by press forming a metal plate material so as to integrally have a side plate portion 325a, a front collar portion 325b that protrudes inward from a front edge part of the side plate portion 325a, a rear collar portion 325c that protrudes inward from a rear edge part of the side plate portion 325a, and a lower collar portion 325d that protrudes inward from a lower edge part of the side plate portion 325a.

Referring in addition to FIG. 28, a bracket support portion 325e is provided on an upper part of the seat back-side side frame 325A, the bracket support portion 325e is formed due to the front collar portion 325b being folded toward the side close to the side plate portion 325a and the rear collar portion 325c being bent into a substantially C-shaped form opening forward in the vehicle fore-and-aft direction.

The headrest mounting bracket 326 is formed by bending a pipe material so as to have a substantially U-shaped form opening downward, and opposite end parts of the headrest mounting bracket 326 are fitted and fixed to the bracket support portion 325e in an upper part of the seat back-side side frame 325A. Fixed to the headrest mounting bracket 326 are a pair of tubular headrest support members 328.

Referring again to FIG. 25, a linking bracket 329 is fastened to each of rear end parts of the pair of left and right seat cushion-side side frames 318, and lower end parts of the pair of left and right seat back-side side frames 325A are linked to the linking brackets 329 via a reclining unit 330. A rotating shaft 331 of the reclining unit 330 is mounted on the lower end parts of the pair of left and right seat back-side side frames 325A so as to extend through the lower frame 327 fixed to the lower end parts of the seat back-side side frames 325A, and the inclination angle of the seat back frame 316 with respect to the seat frame 312 can be adjusted by operation of the reclining unit 330.

Disposed between the pair of left and right seat back-side side frames 325A is a back-side pressure-receiving member 334 that can elastically deform in response to receiving the load of a seated person via the seat back. The back-side pressure-receiving member 334, which is formed from a resin, etc. so as to be elastically deformable, is stretched between the left and right seat back-side side frames 325A via an upper linking wire 335 and a lower linking wire 336.

The seat back-side side frame 325A is formed so as to have a reference plate thickness ta1 for a first reference plate thickness region A1 including at least the side plate portion 325a and an increased plate thickness tb1 that is thicker than the reference plate thickness ta1 for a first plate thickness increase region B1 including at least the front collar portion 325b, the rear collar portion 325c, and the lower collar portion 325d, the plate thickness being changed between the first reference plate thickness region A1 and the first plate thickness increase region B1.

In this embodiment, the first plate thickness increase region B1 is set so as to include the front collar portion 325b, the rear collar portion 325c, the lower collar portion 325d, and part of an outer edge part of the side plate portion 325a, and as shown in FIG. 27 and FIG. 28 the first plate thickness increase region B1 is set so as to include, among the outer edge part of the side plate portion 325a, portions integrally connected to the front collar portion 325b, the rear collar portion 325c, and the lower collar portion 325d in a bent shape.

Provided on a lower end part of the side plate portion 325a is a reclining unit mounting part 332 having a first through hole 340 for mounting the reclining unit 330 as a mounted component. This reclining unit mounting part 332 is surrounded from three directions, that is, front, rear, and lower directions, by part of the first plate thickness increase region B1, and the reclining unit 330 is surrounded from three directions by the first plate thickness increase region B1.

Moreover, the reclining unit mounting part 332 is formed so as to be thicker than the increased plate thickness tb1 of the first plate thickness increase region B1, that is, the reclining unit mounting part 332 is formed so as to have a plate thickness tc that is thicker than the increased plate thickness tb1.

A reinforcing part bulging either inward or outward is provided on part of a portion, included in the first plate thickness increase region B1, of the side plate portion 325a, and in this embodiment a first reinforcing part 337 extending in the up-and-down direction while following the rear collar portion 325c is provided on, of the rear edge part of the side plate portion 325a, a portion included in the first plate thickness increase region B that is integrally connected to the rear collar portion 325c as a bent shape, the first reinforcing part 337 being formed so as to bulge inward when press forming the seat back-side side frame 325A.

Furthermore, a reinforcing part joining portions of the first plate thickness increase region B1 that are separate from each other is provided on the side plate portion 325a, and in this embodiment second and third reinforcing parts 338, 339 joining the front edge part and the rear edge part of the side plate portion 325a are provided on the side plate portion 325a. The second reinforcing part 338 is provided on the side plate portion 325a so as to extend forward in the vehicle fore-and-aft direction from an intermediate part in the up-and-down direction of the first reinforcing part 337, and the third reinforcing part 339 is provided on the side plate portion 325a so as to extend forward in the vehicle fore-and-aft direction while being inclined slightly upward to the front from a lower end part of the first reinforcing part 337. These second and third reinforcing parts 338, 339 are formed so as to bulge inward when press forming the seat back-side side frame 325A.

Formed in a portion of the side plate portion 325a of the seat back-side side frame 325A that is included in the first reference plate thickness region A1 are, in addition to the first through hole 340, second to seventh through holes 341, 342, 343, 344, 345, 346.

The second through hole 341 and the third through hole 342 are for mounting the upper linking wire 335 and the lower linking wire 336 of the back-side pressure-receiving member 334, the fourth through hole 343 and the fifth through hole 344 are for mounting an airbag module 347 mounted on the seat back-side side frame 325A disposed on the one on the door side among the pair of left and right seat back-side side frames 325A, and the sixth through hole 345 and the seventh through hole 346 are for mounting a webbing (not illustrated) for suppressing deployment of the airbag.

In FIG. 29 and FIG. 30, the seat cushion-side side frame 318 of the seat cushion frame 315 is formed by press forming a metal plate material so as to integrally have a side plate portion 318a, an upper collar portion 318b that protrudes inward from an upper edge part of the side plate portion 318a, and a lower collar portion 318c that protrudes inward from a lower edge part of the side plate portion 318a.

The seat cushion-side side frame 318 is formed so as to have a reference plate thickness ta2 for a second reference plate thickness region A2 that includes at least the side plate portion 318a, and an increased plate thickness tb2 that is thicker than the reference plate thickness ta2 for a second plate thickness increase region B2 that includes at least the upper collar portion 318b and the lower collar portion 318c, the plate thickness changing between the second reference plate thickness region A2 and the second plate thickness increase region B2.

In this embodiment, the second plate thickness increase region B2 is set so as to include the upper collar portion 318b, the lower collar portion 318c, and part of an outer edge part of the side plate portion 318a, and the second plate thickness increase region B2 is set so as to include, of the outer edge part of the side plate portion 318a, a portion integrally connected to the upper collar portion 318b as a bent shape and a portion integrally connected to the lower collar portion 318c as a bent shape.

The operation of the first embodiment is now explained: at least one of the seat cushion frame 315 and seat back frame 316, in this embodiment the seat back-side side frame 325 of the seat back frame 316 and the seat cushion-side side frame 318 of the seat cushion frame 315, are formed so as to have reference plate thicknesses ta1, ta2 for the first and second reference plate thickness regions A1, A2, which include at least the side plate portions 325a, 318a, and increased plate thicknesses tb1, tb2 that are thicker than the reference plate thicknesses ta1, ta2 for the first plate thickness increase region B1, which includes at least the front collar portion 325b and the rear collar portion 325c, and for the second plate thickness increase region B2, which includes at least the upper collar portion 318b and the lower collar portion 318c, such that the plate thickness changes between the first and second reference plate thickness regions A1, A2 and the first and second plate thickness increase regions B1, B2, and it is therefore possible to enhance the rigidity of the side frames 325, 328 while suppressing as much as possible any increase in the weight of the seat back-side side frame 325 and the seat cushion-side side frame 318.

Furthermore, since the first and second plate thickness increase regions B1, B2 are set so as to include, among the outer edge part of the side plate portions 325a, 318a, portions integrally connected to the front collar portion 325b and the rear collar portion 325c as a bent shape and portions integrally connected to the upper collar portion 318b and the lower collar portion 318c as a bent shape, it is possible to further enhance the rigidity of the seat back-side side frame 325 and the seat cushion-side side frame 318.

Moreover, in the seat back-side side frame 325, since part of the first plate thickness increase region B1 is set so as to surround the reclining unit 330, which is a mounted component mounted on the side plate portion 325a, from three directions, it is possible to enhance the rigidity of a part via which the reclining unit 330 is mounted.

Furthermore, since the reclining unit mounting part 332 for mounting the reclining unit 330 is provided on the side plate portion 325a of the seat back frame-side side frame 325, and the reclining unit mounting part 332 is formed so as to be thicker than the increased plate thickness tb1 of the first plate thickness increase region B1, the rigidity with which the reclining unit 330 is mounted improves.

Moreover, since the first reinforcing part 337 bulging either inward or outward is provided on part of a portion, included in the first plate thickness increase region A1, of the side plate portion 325a of the seat back frame-side side frame 325, it is possible to further enhance the rigidity of the side plate portion 325a.

Furthermore, since the second and third reinforcing parts 338, 339 joining portions that are separate from each other of the first plate thickness increase region A1 in the seat back frame-side side frame 325 are provided on the side plate portion 325a, it is possible to further improve the rigidity of the seat back frame-side side frame 325.

Moreover, since the first to seventh through holes 340 to 346 are formed in the side plate portion 325a via portions included in the first reference plate thickness region A1 of the seat back frame-side side frame 325, it is possible to enhance the precision with which the first to seventh through holes 340 to 346 are machined.

A second embodiment of the present invention is explained by referring to FIG. 31: parts corresponding to those of the first embodiment are denoted by the same reference numerals and symbols and illustrated only, detailed explanation thereof being omitted.

The side plate portion 325a of a seat back-side side frame 325B is provided with a fourth reinforcing part 367 and the second reinforcing part 338, which bulge either inward or outward. The fourth reinforcing part 367 is provided on the side plate portion 325a so as to extend in the up-and-down direction along the rear collar portion 325c so as to be included in the first plate thickness increase region A1 while having in its lower part an inclined portion 367a that is inclined downward to the front. The second reinforcing part 338 is provided on the side plate portion 325a while extending in a direction intersecting the longitudinal direction of the seat back-side side frame 325B and extending forward in the vehicle fore-and-aft direction from an intermediate part in the up-and-down direction of the fourth reinforcing part 367, and in this embodiment the fourth reinforcing part 367 and the second reinforcing part 338 are formed so as to bulge inward when press forming the seat back-side side frame 325B.

In accordance with the second embodiment also, the same effects as those of the first embodiment can be exhibited.

A third embodiment of the present invention is explained by reference to FIG. 32: parts corresponding to those of the first and second embodiments are denoted by the same reference numerals and symbols and illustrated only, detailed explanation thereof being omitted.

The side plate portion 325a of a seat back-side side frame 325C is provided with the fourth reinforcing part 367, a fifth reinforcing part 368, and the second reinforcing part 338, which bulge either inward or outward. The fifth reinforcing part 368 is provided on the side plate portion 325a so as to extend forward in the vehicle fore-and-aft direction along a direction intersecting the longitudinal direction of the seat back-side side frame 325C from a base end part of the inclined portion 367a of the fourth reinforcing part 367. The second reinforcing part 338 is provided on the side plate portion 325a so as to extend along a direction intersecting the longitudinal direction of the seat back-side side frame 325C, and in this embodiment the fourth reinforcing part 367, the fifth reinforcing part 368, and the second reinforcing part 338 are formed so as to bulge inward when press forming the seat back-side side frame 325C.

In accordance with the third embodiment also, the same effects as those of the first and second embodiments can be exhibited.

A fourth embodiment of the present invention is explained by reference to FIG. 33: parts corresponding to those of the first to third embodiments are denoted by the same reference numerals and symbols and illustrated only, detailed explanation thereof being omitted.

The side plate portion 325a of a seat back-side side frame 325D is provided with the first reinforcing part 337 and sixth to eighth reinforcing part 369, 370, 371, which bulge either inward or outward, and in this embodiment these reinforcing parts 337, 369 to 371 are formed so as to bulge inward when press forming the seat back-side side frame 325D.

The sixth reinforcing part 369, the seventh reinforcing part 370, and the eighth reinforcing part 371 are provided on the side plate portion 325a so as to extend in the vehicle fore-and-aft direction at positions spaced from each other in the up-and-down direction.

In accordance with the fourth embodiment also, the same effects as those of the first to third embodiments can be exhibited.

FIG. 34 to FIG. 37 show a fifth embodiment. The fifth embodiment is characterized by the structure of left and right linking brackets 329L, 329R having their base parts fastened by means of a plurality of bolts 391 to rear end parts of the pair of left and right seat cushion-side side frames 318 and linking lower end parts of the pair of left and right seat back-side side frames 325A via left and right reclining units 330. In this fifth embodiment also, in the same manner as for the preceding embodiments, a reclining unit mounting part 332 having a first through hole 340 for mounting a reclining unit 330 as a mounted component is provided on lower end parts of the side plate portions 325a of the left and right seat back-side side frames 325A, and the reclining unit mounting part 332 is formed so as to have a plate thickness tc that is larger than the increased plate thickness tb1.

Each of the left and right reclining units 330 includes a base plate 330b that is superimposed on and fixed to an extremity part of the linking brackets 329L, 329R, a plate-shaped case 330c that is pivotably fitted to and supported on the base plate 330b and fitted and fixed to the first through hole 340, a locking mechanism, which is not illustrated, that is disposed in a space between the case 330c and the base plate 330b and can lock and release the lock between the case 330c and the base plate 330b, an operating lever 392 that is coupled to the locking mechanism, and an urging device 330s that urges the seat back frame 316 so as to be inclined forward around the rotating shaft 331 with respect to the seat cushion frame 315. The left and right locking mechanisms operate in synchronism via the rotating shaft 331.

The urging device 330s has a spiral spring 396 having one end latched to a latching piece 394 fixed to for example the linking bracket 329L, 329R or the base plate 330b and having the other end latched to a latching piece 395 fixed to the seat back-side side frame 325A, and a spring case, which is not illustrated, that houses the spring 396. Furthermore, the operating lever 392 is coupled to one of the locking mechanisms on the left and right sides (in the illustrated example, one on the right side), and is usually resiliently retained at a predetermined standby position by the urging force of a return spring, which is not illustrated.

The locking mechanism can be switched as required by means of operation of the operating lever 392 between lock and lock release in the same manner as for a conventionally known reclining unit, and the switching can restrict or allow pivoting of the case 330c with respect to the base plate 330b (and consequently inclination of the seat back frame 316 (side frame 325A) with respect to the seat cushion frame 315 (side frame 318)), thereby freely regulating the inclination angle of the seat back frame 316 with respect to the seat cushion frame 315.

As is clear from FIG. 36 and FIG. 37, with regard to the left and right linking brackets 329L, 329R, a plane in which their extremity part is joined to the base plate 330b is offset outward by a predetermined offset amount with respect to a plane in which their base part is joined to the seat cushion-side side frame 318, and offset amounts 8, 8' are different between the left and right linking brackets 329L, 329R. That is, the offset amount 8 of the linking bracket 329R on the same side as the operating lever 392 is set to be small in order to avoid interference between the linking bracket 329R and the operating lever 392, and the offset amount 8' of the linking bracket 329L on the opposite side is set to be relatively large.

Provided on an intermediate part between the base part and the extremity part of each of the linking brackets 329L, 329R are brittle parts 380L, 380R that can absorb an impact due to them being relatively easily collapsed and deformed when the vehicle is involved in rear-end collision (for example, bumped from behind, etc.). In this embodiment, the brittle parts are formed into a V-shape or Y-shape when viewed from the side while each having a first bead part 381L, 381R that is curved so as to have a peak-shaped cross section while intersecting the intermediate part of the linking bracket 329L, 329R in the fore-and-aft direction, and a second bead part 382L, 382R that extends while being inclined upward to the front from a rear end part or an intermediate part of the first bead part 381L, 381R.

Some extending bead parts extend from such brittle parts 380L, 380R in order to adjust the strength: for example, first and second extending bead parts b1L, b1R: b2L, b2R extending on the same line from the bolt 391 at the lower end (that is, a fixing part on the lower side of the linking bracket 329L, 329R) toward a center part (weld bead on the lower side) of the reclining unit 330 extend from the lower end of an intermediate part of the first bead parts 381L, 381R and the upper end of an intermediate part of the second bead parts 382L, 382R, and third extending bead parts b3L, b3R extending toward a center part (weld bead on the lower side) of the reclining unit 330 extend from a rear end part of the second bead parts 382L, 382R.

Furthermore, the second bead parts 382L, 382R extend lengthwise toward the bolt 391 at the front end (that is, a fixing part on the front side of the linking bracket 329L, 329R), and fourth extending bead parts b4L, b4R extending from the bolt 391 at the front end toward a center part (weld bead on the front side) of the reclining unit 330 extend from the extending part on the front side of the second bead parts 382L, 382R. Moreover, a third bead 383L, 383R is formed on a rear part of the linking bracket 329L, 329R so as to follow the rear edge, and a fifth extending bead part b5L, b5R extends from an upper part of the third bead 383L, 383R at a position substantially symmetrical with the fourth extending bead part b4L, b4R with the center of the reclining unit 330 sandwiched therebetween. Due to at least some of the first to fifth extending bead parts b1L, b1R to b5L, b5R being used in combination with the brittle parts 380L, 380R, it becomes possible to easily adjust the magnitude, direction, etc. of the strength of the linking bracket 329L, 329R.

In this way, since it is possible to change the susceptibility to deformation of the left and right brittle parts 380L, 380R by changing the shape and position of the brittle parts 380L, 380R, which are specially provided on the intermediate parts of the left and right linking brackets 329L, 329R, or the extending bead parts b1L, b1R to b5L, b5R, which are connected thereto, or changing the offset amounts 8, 8' between the base parts and the extremity parts of the left and right linking brackets 329L, 329R, even when an impact load imposed on the vehicle seat is uneven between the left and right at the time of a rear-end collision, it becomes possible to adjust the mode of deformation of the left and right linking brackets 329L, 329R.

Embodiments of the present invention are explained above, but the present invention is not limited to the embodiments and may be modified in a variety of ways as long as the modifications do not depart from the present invention described in Claims.

Embodiment of Solution Means for Fourth Problem

An embodiment of the present invention is explained below by reference to the attached drawings. In the explanation below, 'fore-and-aft', 'left-and-right', and 'up-and-down' refer to directions viewed by an occupant seated on a vehicle seat in a usual seated attitude (a basic attitude at the time of driving).

FIG. 38 schematically shows the overall arrangement of a vehicle seat (a vehicular seat) related to one embodiment of the present invention. A vehicle seat 411 includes, for example, a slide rail 413 that is joined to a floor panel 412 functioning as one constituent element of the vehicle monocoque structure, a seat cushion 414 that is supported on the slide rail 413 so that it can slide in the fore-and-aft direction and receives the buttocks and thighs of an occupant, a seat back 415 that is linked to the seat cushion 414 so that it can swing in the fore-and-aft direction around a swing axis SX and receives the back of the occupant, and a headrest 416 that is supported at the upper end of the seat back 415 and receives the head of the occupant. The seat cushion 414, the seat back 415, and the headrest 416 have skin materials 414a, 415a, 416a that individually wrap interior pads. The skin materials 415a, 416a are in intimate contact with an outer face of the pad along a pad depression due to the action of hanging threads 417. Details of the pad are described later. The vehicle seat 411 is formed as a left seat. When the vehicle seat 411 is used as a right seat, the left and the right of the vehicle seat 411 may be exchanged.

The seat cushion 414 includes a side cover 418. Mounted on the side cover 418 are a first lever (operation element) 419a and a second lever (operation element) 419b. The first lever 419a is supported so that it can swing around an axis parallel to the rotational axis SX. When the first lever 419a is pulled upward around the axis, the seat cushion 414 and the seat back 415 move upward. When the first lever 419a is pushed downward around the axis, the seat cushion 414 and the seat back 415 move downward. The second lever 419b is supported so that it can swing around the rotational axis SX. When the second lever 419b is pulled upward around the swing axis SX, locking of the seat back 415 relative to the seat cushion 414 around the swing axis SX is released. The seat back 415 is allowed to swing around the swing axis SX. By virtue of the spring force, the seat back 415 is driven forward around the swing axis SX. When an external force is applied to the seat back 415 rearward around the swing axis SX against the spring force, the seat back 415 can be driven rearward around the swing axis SX. When the second lever 419b is released from the upward pulling force around the swing axis SX, locking of the seat back 415 relative to the seat cushion 414 around the swing axis SX is established. The angle of the seat back 415 around the swing axis SX can be fixed.

A third lever (operation element) 419c is mounted on the seat cushion 414. The third lever 419c is supported so that it can swing around an axis parallel to the swing axis SX. When the third lever 419c is pulled upward around the axis, locking of the seat cushion 414 relative to slide rail 413 is released. The seat cushion 414 is allowed to move linearly on the slide rail 413. When a forward or backward external force is applied to the seat cushion 414, the seat cushion 414 can be displaced along the slide rail 413. When the third lever 419c is released from the force pulling upward around the axis, locking of the seat cushion 414 relative to the slide rail 413 is established. The position of the seat cushion 414 in the fore-and-aft direction on the slide rail 413 can be fixed.

The headrest 416 is fixed to a headrest pillar 421 extending upward from the upper end of the seat back 415. The headrest pillar 421 is supported on the seat back 415 in the up-and-down direction so that it can be displaced in the axial direction. The height of the headrest 416 can be adjusted by displacing the headrest pillar 421.

As shown in FIG. 39, the vehicle seat 411 includes a seat frame 423 supporting a pad. The seat frame 423 includes a seat cushion frame 424 that supports the pad of the seat cushion 414, a seat back frame 425 that is linked to the seat cushion frame 424 so that it can swing around the swing axis SX and supports the pad of the seat back 415, and a base frame 426 that is guided in the longitudinal direction by the slide rail 413 so that it can move in the fore-and-aft direction and supports the seat cushion frame 424 above the slide rail 413. The seat cushion frame 424 is linked to the base frame 426 via a link mechanism 427. The link mechanism 427 includes a link member 428 that has one end joined to the base frame 426 so that it can rotate around a horizontal axis FH extending in the left-and-right direction parallel to the swing axis SX and the other end joined to the seat cushion frame 424 so that it can rotate around a horizontal axis SH extending in the left-and-right direction parallel to the horizontal axis FH. The link member 428 guides up-and-down movement of the seat cushion frame 424 with respect to the base frame 426 around the horizontal axis FH.

The seat cushion frame 424 includes cushion side frames 424*a* that extend along the respective slide rails 413, a pan frame 424*b* that provides a connection between the cushion side frames 424*a* at the front end of the seat cushion 414, and a linking pipe 424*c* that provides a link between the cushion side frames 424*a* at the rear end of the seat cushion 414. Disposed between the pan frame 424*b* and the linking pipe 424*c* are a plurality of zig-zag springs (not illustrated). The zig-zag springs extend in the fore-and-aft direction in a zig-zag shape. The zig-zag shape is formed by combining in turn a wire rod that extends in the fore-and-aft direction and a wire rod that extends in the left-and-right direction.

Mounted on the base frame 426 is a manual type fore-and-aft moving device 429. The manual type fore-and-aft moving device 429 is linked to the third lever 419*c*. The manual type fore-and-aft moving device 429 switches between lock and release of lock of movement of the base frame 426 on the slide rail 413 in response to swinging of the third lever 419*c*.

Mounted on the cushion side frame 424*a* of the seat cushion frame 424 is a manual type up-and-down moving device 431. The manual type up-and-down moving device 431 is supported on the cushion side frame 424*a* and includes a transmission mechanism 432 linked to the link mechanism 427. The transmission mechanism 432 is disposed outside the cushion side frame 424*a* and triggers rotation of the link member 428 with respect to the cushion side frame 424*a* around the horizontal axis SH in response to the driving force transmitted from the first lever 419*a* around the axis. The transmission mechanism 432 may include for example a drive gear fixed to the swing shaft of the first lever 419*a* and a driven gear fixed to the link member 428 around the horizontal axis SH.

The seat back frame 425 includes left and right side frames 435 linked to insides of the respective cushion side frames 424*a* by a reclining unit (reclining mechanism) 434, a lower frame 436 providing a link between lower ends of the side frames 435 around the reclining unit 434, and an upper frame 437 providing a link between upper ends of the side frame 435 above the lower frame 436. The side frame 435 has a plate-shaped portion 435*a* spreading along a vertical plane orthogonal to the swing axis SX around the reclining unit 434 and extending upward along the vertical plane, a front wall 435*b* formed so as to be continuous from the front edge of the plate-shaped portion 435*a* and be bent inward and forming a curved region 438 extending vertically from around the reclining unit 434, and a rear wall 435*c* formed so as to be continuous from the rear edge of the plate-shaped portion 435*a* and be bent inward and forming a curved region 439 extending vertically from around the reclining unit 434. Formed on the rear wall 435*c* is a side frame flange 441 that is formed so as to be continuous from the inner end of the rear wall 435*c* and be bent forward. Each of the side frames 435 is formed from for example one sheet of metal plate. Fixed to the upper frame 437 is a headrest pillar guide 442 supporting the headrest pillar 421 so that it can slide in the up-and-down direction. Details of the upper frame 437 are described later.

The reclining unit 434 includes a rotating body 443 that is supported so that it can rotate relative to the seat cushion frame 424 and the seat back frame 425. Joined to one (here, the left rotating body) of the rotating bodies 443 is a shaft body 444 that is coaxial with the swing axis SX. The second lever 419*b* is fixed to the shaft body 444. Relative rotation between the seat cushion frame 424 and the seat back frame 425 can be switched between lock and release of lock in response to rotations of the rotating body 443. Left and right reclining units 434 are linked to each other by means of a linking shaft 445 as a linking member. The linking shaft 445 can rotate around the swing axis SX. The linking shaft 445 transmits rotation of one rotating body (here, the left rotating body) 443 to the other rotating body (here, the right rotating body) 443. In this way, operation of the second lever 419*b* is transmitted from one reclining unit 434 to the other reclining unit 434.

As shown in FIG. 40, the seat cushion 414 is supported on the seat cushion frame 424 and further includes a seat cushion pad 446 that is wrapped by the skin material 414*a*. The seat back 415 is supported on the seat back frame 425 and further includes a seat back pad 447 that is wrapped by the skin material 415*a*. The seat cushion pad 446 and the seat back pad 447 are formed from for example a material having resilience such as a foamed urethane.

As shown in FIG. 41 to FIG. 43, the lower frame 436 has a back region 451 that is disposed to the rear of the swing axis SX, is joined to the rear wall 435*c* of the side frame 435 from the rear, and provides a link between the left and right side frames 435, and a reinforcing region 452 that is continuous from the lower edge of the back region 451, spreads further forward than the swing axis SX, and is joined to the front wall 435*b* from the rear. The reinforcing region 452 is curved around the swing axis SX along the edge of the plate-shaped portion 435*a* of the side frame 435 while having the generatrix of an attitude orthogonal to the plate-shaped portion 435*a*. Due to the action of the curved reinforcing region 452, the torsional rigidity of the lower frame 436 around the swing axis SX can be enhanced. The lower frame 436 is formed from for example one sheet of metal plate.

The back region 451 has a flat plate portion 451*a* spreading along a first plane Pf and a flange 451*b* that is formed so as to be continuous from the upper edge of the flat plate portion 451*a* and be bent forward. The upper edge of the flat plate portion 451*a* includes a first edge 453*a* that extends in the left-and-right direction from left and right middle positions parallel to the swing axis SX, a second edge 453*b* that extends while curving upward from left and right ends of the first edge 453*a*, and a third edge 453*c* that extends outward from the upper end of the second edge 453*b* parallel to the swing axis SX and is superimposed on the side frame 35. The flange 451*b* is continuous at the first edge 453*a* and the second edge 453b, is discontinued at the upper end of the second edge 453b, and is made to oppose the side frame flange 441.

A weld mark 454 due to welding is established on the back region 451 at a position overlapping the left and right side frames 435. The weld mark 454 is formed from weld beads formed along the edge of the side frame 435. The left and right side frames 435 are joined to the back region 451 of the lower frame 436 via the weld mark 454. Alternatively, welding may employ spot welding or laser welding.

Two insertion holes 455 are formed in the back region 451 at positions spaced from the respective side frames 435. The insertion holes 455 are disposed so as to be spaced in the axial direction of the swing axis SX by a distance such that the lower frame 436 is stably supported when the lower frame 436 is supported by means of a pin standing vertically (in the direction of gravity). The insertion hole 455 has for example a circular outline.

Formed in the back region 451 at positions spaced from the respective side frames 435 are two openings 456 that are closer to the middle in the left-and-right direction than the two insertion holes 455. The openings 456 are disposed so as to be spaced in the axial direction of the swing axis SX by a distance such that the linking shaft 445 is stably supported when the linking shaft 445 is supported by means of a jig standing vertically (in the direction of gravity). The opening 456 has for example a circular outline.

As shown in FIG. 42, formed on the back region 451 is a first receiving face 457 that spreads within the first plane Pf and is supported from the rear when assembling the seat back frame 425. The insertion hole 455 and the opening 456 are bored within the first receiving face 457. Here, the opening 456 may spread partially in the reinforcing region 452. Formed on the linking shaft 445 is an angular body 458 that is disposed in front of the opening 456 and, as described later, is retained by a jig. The angular body 458 is disposed within a columnar space surrounded by an imaginary cylindrical face that is in internal contact with the opening 456 while being orthogonal to the first plane Pf. The angular body 458 may be formed into an angular cross section shape by for example flattening a round pipe.

As shown in FIG. 44, the front wall 435b of the side frame 435 has a first height Hf from the plate-shaped portion 435a in the axial direction of the swing axis SX. The front wall 435b is disposed offset in the axial direction of the swing axis SX from a virtual plane Se that includes the edge of the lower frame 436 and is orthogonal to the swing axis SX. The rear wall 435c of the side frame 435 has a low wall portion 461a that is adjacent to the front wall 435b along the peripheral edge of the plate-shaped portion 435a around the swing axis SX with a space 459 sandwiched therebetween and has the first height Hf from the plate-shaped portion 435a in the axial direction of the swing axis SX, and a high wall portion 461b that is continuous from the low wall portion 461a and has a second height Hs from the plate-shaped portion 435a in the axial direction of the swing axis SX that is larger than the first height Hf. The curved region 438 of the front wall 435b and the curved region 439 of the rear wall 435c are separated by the space 459. As shown in FIG. 41, the high wall portion 461b is disposed at a position higher than a virtual plane Le that is orthogonal to the first plane Pf and is in contact with the front edge of the reinforcing region 452 from above.

As shown in FIG. 44, formed on the front wall 435b of the side frame 435 is a superimposition piece 462 that spreads inward from the inner edge of the first height Hf and is superimposed on the reinforcing region 452 of the lower frame 436 from the front. A weld mark 463 due to welding is established at the edge of the superimposition piece 462 at a position where it overlaps the reinforcing region 452. Here, the weld mark 463 is formed from weld beads formed along the edge of the superimposition piece 462. The left and right side frames 435 are joined to the reinforcing region 452 of the lower frame 436 via the weld mark 463. Alternatively, welding may be carried out by spot welding or laser welding. As shown in FIG. 41, the superimposition piece 462 is disposed at a position lower than the virtual plane Le, which is orthogonal to the first plane Pf and is in contact with the front edge of the reinforcing region 452 from above.

As shown in FIG. 42, formed on the respective side frames 435 is a second receiving face 464 that spreads within a second plane Ps set with a predetermined positional relationship with respect to the first plane Pf and is supported from the rear when assembling the seat back frame 425. Here, the second plane Ps is set so as to be parallel to the first plane Pf. Formed in the rear wall 435c of the side frame 435 is an insertion hole 465 opening within the second receiving face 464 at a position offset from the lower frame 436. The insertion hole 465 has for example a circular outline.

As shown in FIG. 39, formed in the rear wall 435c of the respective side frames 435 is an auxiliary insertion hole 466 at a position higher than the insertion hole 465 and offset from the upper frame 437. The auxiliary insertion hole 466 is disposed so as to be spaced from the insertion hole 465 in the up-and-down direction by a distance with which the side frame 435 is stably supported in cooperation with the insertion hole 465 when the side frame 435 is supported by means of a pin standing vertically (the direction of gravity) in the same manner as for the insertion hole 465. The auxiliary insertion hole 466 has for example a circular outline. The auxiliary insertion hole 466 opens on an auxiliary receiving face that spreads within an auxiliary plane set with a predetermined positional relationship with respect to the first plane Pf and is supported from the rear when assembling the seat back frame 425.

As shown in FIG. 45, the upper frame 437 is formed by bending a plate material and has a front wall 469 that is partitioned by means of an upper ridge line 467 and a lower ridge line 468 extending in the horizontal direction, an upper wall 471 that is continuous from the upper ridge line 467 and spreads rearward, an upper standing wall 472 that is formed so as to bend upward from the rear end of the upper wall 471, a lower wall 473 that is continuous from the lower ridge line 468 and spreads rearward, and a lower standing wall 474 that is formed so as to bend downward from the rear end of the lower wall 473. Connected to the upper standing wall 472 is a first flange 475 that is formed so as to be continuous from the upper end of the upper standing wall 472 and be bent forward. The first flange 475 is continuous throughout the entire region in the horizontal direction along the upper edge of the upper standing wall 472. Connected to the lower standing wall 474 is a second flange 476 that is formed so as to be continuous from the lower end of the lower standing wall 474 and be bent forward. The second flange 476 is continuous throughout the entire region in the horizontal direction along the lower edge of the lower standing wall 474.

The front wall 469 has linking pieces 469a that are formed so as to be bent forward at two, that is, left and right, positions in the horizontal direction, form a depression along vertical valley fold lines 477, and each extend outward. The linking piece 469a is formed so as to be bent backward on the outer side of the depression in the horizontal direction and forms a ridge line along a vertical peak fold line 478.

The upper standing wall 472 and the lower standing wall 474 deform in the same manner accompanying deformation of the front wall 469. The upper frame 437 is formed from for example one sheet of metal plate.

A weld mark 479 due to welding is established on the front wall 469 further outside the peak fold line 478 in the horizontal direction. Here, the weld mark 479 is formed from weld beads formed along the edge of the left and right side frames 435. Weld marks 481, 482 due to welding are established on the upper standing wall 472 and the lower standing wall 474 so as to correspond to above and below the weld mark 479. Here, the weld marks 481, 482 are formed from weld beads formed along the edge of the left and right side frames 435. The upper frame 437 is fixed to the left and right side frames 435 by means of the weld marks 479, 481, 482. Alternatively, welding may employ spot welding or laser welding.

As shown in FIG. 46, the inner edge of the front wall 435b has a projecting piece 483 that spreads inward from a virtual outline 483a corresponding to the edge of the upper frame 437 and is superimposed on the front wall 469 of the upper frame 437 from the rear. The front wall 469 of the upper frame 437 forms the weld mark 479 between itself and the projecting piece 483. The inner edge of the rear wall 435c has an upper superimposition region 484 that is superimposed on the upper standing wall 472 of the upper frame 437 from the rear, and a lower superimposition region 485 that is superimposed on the lower standing wall 474 of the upper frame 437 from the rear spaced apart from the upper superimposition region 484 beneath the upper superimposition region 484. The upper standing wall 472 of the upper frame 437 forms the weld mark 481 between itself and the upper superimposition region 484. Similarly, the lower standing wall 474 of the upper frame 437 forms the weld mark 482 between itself and the lower superimposition region 485.

As shown in FIG. 47, the upper frame 437 has a first through hole 487 that is formed in the upper wall 471 and receives a headrest pillar guide 486, and a second through hole 488 that is formed in the lower wall 473 and receives the headrest pillar guide 486. The headrest pillar guide 486 supports the headrest pillar 421 so that it can be displaced in the axial direction. Formed on the headrest pillar guide 486 is a positioning flange 489 that spreads in a direction orthogonal to the axis. When the headrest pillar guide 486 is inserted into the first through hole 487 and the second through hole 488 from above, the positioning flange 489 comes into contact with the upper wall 471 from above and positions the headrest pillar guide 486 in the axial direction. The headrest pillar guide 486 can be formed from for example a resin material.

A support hole flange 491 is formed at the peripheral edge of the first through hole 487 and the second through hole 488 so as to be bent downward. The headrest pillar guide 486 is press fitted into the support hole flange 491. The support hole flange 491 fixes the headrest pillar guide 486 with respect to the upper frame 437. The support hole flange 491 can prevent the headrest pillar guide 486 from coming out of the upper frame 437.

As shown in FIG. 48, a receiving piece 492 is formed on the first flange 475 to the rear of the first through hole 487 so as to be bent downward from the front edge of the first flange 475. The receiving piece 492 receives the headrest pillar guide 486 from the rear. A load acting on the headrest pillar guide 486 from the front is supported by the upper standing wall 472 of the upper frame 437. Alternatively, the receiving piece 492 may be formed so as to be bent upward from the front edge of the first flange 475.

As shown in FIG. 45, a bead (reinforcing shape) 493 is formed in the depression of the front wall 469, the bead 93 extending while intersecting the valley fold line 477 and reinforcing the stiffness of the front wall 469 in the bending direction. The bead 493 extends horizontally in the left-and-right direction. Similarly, a bead (reinforcing shape) 494 is formed on the front wall 469, the bead 494 extending while intersecting the headrest pillar 421 when viewed from the front and reinforcing the stiffness of the front wall 469 in the in-plane direction. The bead 494 is inclined so as to be displaced upward in going outward from the lowermost end close to the middle.

Formed in the front wall 469 are two insertion holes 495 in a region sandwiched by the two depressions. The insertion holes 495 are disposed spaced from each other in the axial direction of the swing axis SX by a distance such that the upper frame 437 is stably supported when the upper frame 437 is supported by means of a vertically (direction of gravity) standing pin. The insertion hole 495 has for example a circular outline. As shown in FIG. 47, the insertion hole 495 opens in a third receiving face 496 that spreads within a third plane Pt set with a predetermined positional relationship with respect to the first plane Pf (or the auxiliary plane) and is supported from the rear when assembling the seat back frame 425.

A method for manufacturing the seat back frame 425 is now explained. When assembling the seat back frame 425, the lower frame 436, the left and right side frames 435, and the upper frame 437 are prepared. As shown in FIG. 49, the lower frame 436 is disposed on the first plane Pf. When disposing it, an insertion pin 501 is inserted into the insertion hole 455. The insertion pin 501 is formed into for example a columnar shape having an axis standing vertically (direction of gravity). The insertion pin 501 has a step 501a that defines the first plane Pf orthogonal to the axis. The first receiving face 457 of the lower frame 436 is received by the step 501a of the insertion pin 501. Due to the insertion pin 501 being inserted into the insertion hole 455, the lower frame 436 is positioned with respect to the first plane Pf.

Subsequently, as shown in FIG. 50, the left and right side frames 435 are disposed on the lower frame 436. When disposing them, an insertion pin 502 is inserted into the insertion hole 465 of the side frame 435. The insertion pin 502 is formed into for example a columnar shape having a vertical (direction of gravity) axis and has a step 502a that defines the second plane Ps orthogonal to the axis. The step 502a receives the second receiving face 464 of the side frame 435. In this process, an auxiliary insertion pin (not illustrated) is inserted into the auxiliary insertion hole 466 of the side frame 435. The auxiliary insertion pin is formed into for example a columnar shape having a vertical (direction of gravity) axis. The auxiliary insertion pin has a step that defines an auxiliary plane. The step of the auxiliary insertion pin receives an auxiliary receiving face of the side frame 435. The side frame 435 is supported on the second plane Ps and the auxiliary plane. Since the second plane Ps and the auxiliary plane are disposed with a predetermined positional relationship with respect to the first plane Pf, the left and right side frames 435 can be positioned with good precision with respect to the lower frame 436. The side frame 435 can be superimposed on the lower frame 436 from the axial direction of the insertion pin 502. The rear wall 435c of the side frame 435 is superimposed on the back region 451 of the lower frame 436. The front wall 435b of the side frame 435 is superimposed on the reinforcing region 452 of the lower frame 436 from the axial direction of the insertion pin 502. The side frame 435 thus positioned is welded to the lower frame 436. The weld marks 454, 463 are formed.

Subsequently, as shown in FIG. 51, the upper frame 437 is disposed on the left and right side frames 435. When disposing it, an insertion pin 503 is inserted into the insertion hole 495 of the upper frame 435. The insertion pin 503 is formed into for example a columnar shape having a vertical (direction of gravity) axis and has a step 503a that defines the third plane Pt orthogonal to the axis. The step 503a receives the third receiving face 496 of the upper frame 437. Since the third plane Pt is disposed with a predetermined positional relationship with respect to the first plane Pf and the auxiliary plane, the upper frame 437 can be positioned with good precision with respect to the left and right side frames 435. The upper frame 437 can be superimposed on the side frame 435 from the axial direction of the insertion pin 503. The front wall 469 of the upper frame 437 is superimposed on the projecting piece 483 from the axial direction of the insertion pin 503. The upper standing wall 472 of the upper frame 437 is superimposed on the upper superimposition region 484 of the rear wall 435c from the axial direction of the insertion pin 503. When superimposing it, interference between the upper standing wall 472 and the front wall 435b can be avoided. Similarly, the lower standing wall 474 of the upper frame 437 is superimposed on the lower superimposition region 485 of the rear wall 435c from the axial direction of the insertion pin 503. When superimposing it, interference between the lower standing wall 474 and the front wall 435b can be avoided. The upper frame 437 thus positioned is welded to the left and right side frames 435. The weld marks 479, 481, 482 are formed.

As shown in FIG. 52, when the lower frame 436 is received by the insertion pin 501, a jig 504 enters the opening 456 of the back region 451. An angular groove 504a that is coaxial with the swing axis SX is cut at the extremity of the jig 504. The angular body 458 of the linking shaft 445 can be fitted into the angular groove 504a. In this way, the linking shaft 445 can be positioned with respect to the individual side frames 435. Opposite ends of the linking shaft 445 thus positioned are welded to the rotating body 443 of the reclining unit 434.

In the seat back frame 425 related to the present embodiment, the lower frame 436 has the reinforcing region 452, which is continuous from the lower edge of the back region 451, spreads further forward than the swing axis SX, and is joined to the front wall 435b of the side frame 435 from the rear. The lower frame 436 is joined to the respective side frames 435 via, in addition to the back region 451, the reinforcing region 452, which spreads further forward than the swing axis SX from the lower edge of the back region 451. It is possible to enhance the torsional rigidity of the seat back frame 425. Compared with a case in which the lower frame 436 is joined to the side frame 435 only via the back region 452, the strength with which the lower frame 436 and the side frame 435 are joined can be reduced. In this way, the work load for joining can be lightened. Moreover, when assembling the seat back frame 425, the lower frame 436 can be assembled onto the side frame 435 from the rear. The side frame 435 can be assembled onto the lower frame 436 from one direction. The ease of assembly is not impaired.

The side frame 435 has the space 459, which is formed between the front wall 435b and the rear wall 435c along the peripheral edge of the plate-shaped portion 435a around the reclining unit 434. The front wall 435b, which is formed so as to be bent along the peripheral edge of the plate-shaped portion 435a around the reclining unit 434, and the rear wall 435c, which is formed so as to be bent along the peripheral edge of the plate-shaped portion 435a around the reclining unit 434, are separated by the space 459. When subjecting the side frame 435 to drawing, compared with a case in which the front wall 435b and the rear wall 435c are continuous around the reclining unit 434, the precision of the shape of the front wall 435b and the rear wall 435c can be enhanced. The ease of assembly of the side frame 435 onto the lower frame 436 is therefore stable.

In the present embodiment, the opening 456, which allows the jig 504 to pass through when assembling the seat back frame 425, is formed in the back region 451 of the lower frame 436. On the other hand, the angular body 458, which is disposed in front of the opening 456 and is retained by the jig 504, is formed on the linking shaft 445. When assembling the seat back frame 425, the jig 504 can be inserted into the opening 456 from the rear. The jig 504 can retain the angular body 458 of the linking shaft 445. In this way, the linking shaft 445 can be positioned with respect to the left and right rotating bodies 443. The linking shaft 445 can be joined to the individual rotating bodies 443 with good work efficiency.

The first receiving face 457, which spreads within the first plane Pf and is supported from the rear, is formed on the back region 451 of the lower frame 436. The second receiving face 464 is formed on the rear wall 435c of the side frame 435, the second receiving face 464 spreading within the second plane Ps, which is set with a positional relationship determined with respect to the first plane Pf, and the second receiving face 464 positioning the side frame 435 with respect to the lower frame 436 when supported from the rear. When assembling the seat back frame 425, the lower frame 436 can be physically supported via the first receiving face 457. When the side frame 435 is physically supported via the second receiving face 464, the left and right side frames 435 can be positioned with respect to the lower frame 436 based on the positional relationship of the first plane Pf and the second plane Ps. The side frame 435 can easily be positioned with respect to the lower frame 436.

In addition, formed on the upper frame 437 is the third receiving face 496, which spreads within the third plane Pt set with a predetermined positional relationship with respect to the second plane Ps and positions the upper frame 437 with respect to the side frame 435 when supported from the rear. When the upper frame 437 is physically supported via the third receiving face 496, the upper frame 437 can be positioned on the side frame 435 based on the positional relationship between the second plane Ps and the third plane Pt. The upper frame 437 can easily be positioned with respect to the side frame 435.

In the side frame 435 related to the present embodiment, the projecting piece 483 is formed at the inner edge of the front wall 435b, and the projecting piece 483 spreads inward from the virtual outline 483a corresponding to the shape of the upper frame 437 and is superimposed on the front wall 469 of the upper frame 437 from the rear. The upper frame 437 can be assembled from the front onto the left and right side frames 435 disposed across a gap at the time of assembly. In this arrangement, the front wall 435b of the side frame 435 does not interfere with the upper standing wall 472 and the lower standing wall 474 positioned further rearward than the front wall 469 in the upper frame 437. In this way, the work efficiency when assembling the upper frame 437 can be improved.

The front wall 469 of the upper frame 437 has the linking piece 469a, which is formed so as to be bent forward at two, that is, left and right, positions in the horizontal direction, forms a depression along the vertical valley fold line 477, and extends toward the projecting piece 483. The beads 493 are formed in the depression of the front wall 469, the beads 493 extending while intersecting the valley fold line 477 and reinforcing the stiffness in the bending direction. In the front wall 469, the rigidity against bending along the valley fold line 477 can be enhanced. It is therefore possible to suppress deformation of the upper frame 437 when assembling the upper frame 437. It is possible to enhance the work efficiency of the assembly operation.

Formed on the front wall 469 of the upper frame 437 is the bead 494, which extends while intersecting the headrest pillar 421 when viewed from the front and reinforces the stiffness in the in-plane direction. In the upper frame 437, the rigidity of the front wall 469 can be enhanced with respect to the first through hole 487 of the upper wall 471 and the second through hole 488 of the lower wall 473. It is therefore possible to suppress deformation of the upper frame 437 when assembling the upper frame 437. It is possible to enhance the work efficiency of the assembly operation.

In the upper frame 437 related to the present embodiment, the receiving piece 492, which is formed so as to be continuous from the front edge of the first flange 475 and be bent downward, is formed on the first flange 475 to the rear of the first through hole 487. The rigidity of the front wall 469 can be enhanced with respect to the first through hole 487 of the upper wall 471 and the second through hole 488 of the lower wall 473. It is therefore possible to suppress deformation of the upper frame 437 when assembling the upper frame 437. It is possible to enhance the work efficiency of the assembly operation.

As shown in FIG. 53 (A), a cutout opening 505 may be formed in the front wall 469 of the upper frame 437 between the left and right beads 494. The cutout opening 505 can contribute to lightening the weight of the upper frame 437. The bead 494 can suppress any decrease in rigidity caused by the cutout opening 505 being formed. Alternatively, as shown in FIG. 53 (B), in the upper frame 437, in addition to the cutout opening 505 of the front wall 469, a cutout opening 506 may be formed in the lower standing wall 474. The cutout opening 506 can contribute to further lightening the weight of the upper frame 437. Alternatively, as shown in FIG. 53 (C), the lower standing wall 474 itself may be reduced in length in the up-and-down direction. In this case, the bead 493 may be extended toward the peak fold line 478.

As shown in FIG. 54, the linking shaft 445 itself may be formed from an angular pipe. In this case, the angular pipe forms the angular body 458 in front of the opening 456.

As shown in FIG. 55, fixed to the upper wall 471 and the lower wall 473 of the upper frame 436 is a support tube 507 that is inserted into the first through hole 487 and the second through hole 488 and supports the headrest pillar guide 486. The support tube 507 is formed from for example a metal material. Here, small pieces 508, 509 are formed in the first through hole 487 and the second through hole 488 respectively so as to be bent upward and downward from the peripheral edges. As shown in FIG. 56, the respective small pieces 508, 509 are superimposed on an outer face of the support tube 507. The small pieces 508, 509 are welded to the support tube 507. Since welding can be carried out from the front in the same manner as for welding of the upper frame 437 and the side frame 435, the work efficiency of assembly of the seat frame 423 is improved. The headrest pillar guide 486 is press fitted into the support tube 507.

The support tube 507 is supported from the rear by the receiving piece 492. By cooperation between the support tube 507 and the receiving piece 492, the rigidity of the front wall 469 can be enhanced. Therefore, when assembling the upper frame 437, deformation of the upper frame 437 can be suppressed, thereby enhancing the work efficiency of assembly.

The invention claimed is:

1. A vehicle seat comprising:
a seat back frame including:
left and right side frames that have a plate-shaped portion spreading along a vertical plane orthogonal to a rotational axis around a rotating shaft and extending upward along the vertical plane, a front wall that extends inward from a front edge of the plate-shaped portion and extends vertically from the rotating shaft, and a rear wall that extends inward from a rear edge of the plate-shaped portion and extends vertically from the rotating shaft; and
an upper frame that provides a link between the left and right side frames above the rotating shaft; and
a ventilation fan;
wherein:
the upper frame includes a front wall that is partitioned by an upper ridge line and a lower ridge line extending in a horizontal direction, an upper wall that spreads rearward from the upper ridge line, an upper standing wall that extends upward from a rear end of the upper wall, a lower wall that spreads rearward from the lower ridge line, and a lower standing wall that extends downward from a rear end of the lower wall;
an inner edge of the front wall of the side frame has a projecting piece that spreads to the inside from a virtual outline corresponding to a shape of the upper frame and is superimposed to a rear side of the front wall of the upper frame; and
the ventilation fan is fixed to the lower standing wall of the upper frame.

2. The vehicle seat according to claim 1, wherein
the rear wall of the side frame comprises an upper superimposition region that is superimposed on the upper standing wall of the upper frame; and
the upper superimposition region protrudes inward in a seat width direction past the projecting piece in a front view.

3. A vehicle seat comprising:
a seat back frame including:
left and right side frames that have a plate-shaped portion spreading along a vertical plane orthogonal to a rotational axis around a rotating shaft and extending upward along the vertical plane, a front wall that extends inward from a front edge of the plate-shaped portion and extends vertically from the rotating shaft, and a rear wall that extends inward from a rear edge of the plate-shaped portion and extends vertically from the rotating shaft; and
an upper frame that provides a link between the left and right side frames above the rotating shaft;
wherein:
the upper frame includes a front wall that is partitioned by an upper ridge line and a lower ridge line extending in a horizontal direction, an upper wall that spreads rearward from the upper ridge line, an upper standing wall that extends upward from a rear end of the upper wall, a lower wall that spreads rearward from the lower ridge line, and a lower standing wall that extends downward from a rear end of the lower wall;
an inner edge of the front wall of the side frame has a projecting piece that spreads to the inside from a virtual outline corresponding to a shape of the upper frame and is superimposed to a rear side of the front wall of the upper frame;

the upper standing wall includes a curved shape portion having a curved shape in a longitudinal cross-sectional view;

the upper frame has a first flange that extends forward from an upper end of the upper standing wall; and the first flange extends forward from the upper end of the curved shape portion of the upper standing wall, and has generally a same curvature as a curvature of the curved shape portion in the longitudinal cross-sectional view.

4. The vehicle seat according to claim 3, wherein the rear wall of the side frame comprises an upper superimposition region that is superimposed on the upper standing wall of the upper frame; and the upper superimposition region protrudes inward in a seat width direction past the projecting piece in a front view.

5. A vehicle seat comprising:

a seat back frame including:

left and right side frames that have a plate-shaped portion spreading along a vertical plane orthogonal to a rotational axis around a rotating shaft and extending upward along the vertical plane, a front wall that extends inward from a front edge of the plate-shaped portion and extends vertically from the rotating shaft, and a rear wall that extends inward from a rear edge of the plate-shaped portion and extends vertically from the rotating shaft; and an upper frame that provides a link between the left and right side frames above the rotating shaft;

wherein:

the upper frame includes a front wall that is partitioned by an upper ridge line and a lower ridge line extending in a horizontal direction, an upper wall that spreads rearward from the upper ridge line, an upper standing wall that extends upward from a rear end of the upper wall, a lower wall that spreads rearward from the lower ridge line, and a lower standing wall that extends downward from a rear end of the lower wall;

an inner edge of the front wall of the side frame has a projecting piece that spreads to the inside from a virtual outline corresponding to a shape of the upper frame and is superimposed to a rear side of the front wall of the upper frame; and the front wall of the upper frame is provided with a vertical valley fold line and is bent forward along the vertical valley fold line.

6. The vehicle seat according to claim 5, wherein the vertical valley fold line extends from the front wall of the upper frame to the lower wall.

7. The vehicle seat according to claim 5, wherein the upper frame has a first support hole that is formed in the upper wall and receives a headrest pillar guide supporting a headrest pillar so that the headrest pillar can be displaced in an axial direction, and a second support hole that is formed in the lower wall and receives the headrest pillar guide, and the vertical valley fold line is formed at an outer side of the first support hole and the second support hole in a seat width direction in the front view.

8. The vehicle seat according to claim 5, wherein a portion of the upper wall at an inner side of the vertical valley fold line in a seat width direction and a portion of the lower wall at the inner side of the vertical valley fold line in the seat width direction are parallel to each other.

9. The vehicle seat according to claim 5, wherein a portion of the upper wall at an outer side of the vertical valley fold line in a seat width direction and a portion of the lower wall at the outer side of the vertical valley fold line in the seat width direction are not parallel to each other.

10. The vehicle seat according to claim 5, wherein a surface of the front wall of the upper frame to which the projecting piece is joined is inclined in a fore-and-aft direction with respect to a portion of the front wall of the upper frame at an inner side of the vertical valley fold line in a seat width direction.

11. The vehicle seat according to claim 5, wherein the front wall of the upper frame is bent rearward along a vertical peak fold line provided at an outer side of the vertical valley fold line in a seat width direction.

12. The vehicle seat according to claim 11, wherein the front wall of the upper frame and the projecting piece of the side frame have a weld mark due to welding, and the weld mark is provided at a position closer to the virtual outline than the vertical peak fold line.

13. The vehicle seat according to claim 11, wherein a portion of the lower wall at an outer side of the vertical peak fold line in the seat width direction is inclined in a fore-and-aft direction with respect to a portion of the lower wall at an inner side of the vertical valley fold line in the seat width direction.

14. The vehicle seat according to claim 5, wherein the rear wall of the side frame comprises an upper superimposition region that is superimposed on the upper standing wall of the upper frame; and the upper superimposition region protrudes inward in a seat width direction past the projecting piece in a front view.

15. The vehicle seat according to claim 14, wherein the front wall of the upper frame is provided with a vertical valley fold line and is bent forward along the vertical valley fold line, and a surface of the upper standing wall to which the upper superimposition region is joined is inclined in a fore-and-aft direction with respect to a portion of the front wall of the upper frame at an inner side of the vertical valley fold line in the seat width direction.

16. A vehicle seat comprising:

a seat back frame having:

left and right side frames that have a plate-shaped portion spreading along a vertical plane orthogonal to a rotational axis around a rotating shaft and extending upward along the vertical plane, a front wall that extends inward from a front edge of the plate-shaped portion and extends vertically from around the rotating shaft, and a rear wall that extends inward from a rear edge of the plate-shaped portion and extends vertically from around the rotating shaft; and an upper frame that provides a link between the left and right side frames above the rotating shaft, wherein the upper frame has a front wall that is partitioned by an upper ridge line and a lower ridge line extending in a horizontal direction, an upper wall that spreads rearward from the upper ridge line, an upper standing wall that extends upward from a rear end of the upper wall, a lower wall that spreads rearward from the lower ridge line, and a lower standing wall that extends downward from a rear end of the lower wall, an inner edge of the front wall of the side frame has a projecting piece that spreads to the inside from a virtual outline corresponding to a shape of the upper frame and is superimposed to a rear side of the front wall of the upper frame, a lower projecting piece that extends inward in a seat width direction is provided at a lower end portion of the inner edge of the front wall of the side frame, and the projecting piece protrudes inward in the seat width direction past the lower projecting piece in a front view.

17. The vehicle seat according to claim 16, wherein the rear wall of the side frame comprises a lower superimposition region that is superimposed on the lower standing wall of the upper frame, and the lower superimposition region protrudes inward in the seat width direction with respect to the projecting piece in the front view.

18. The vehicle seat according to claim 17, wherein the front wall of the upper frame is provided with a vertical valley fold line and is bent forward along the vertical valley fold line, and a surface of the lower standing wall to which the lower superimposition region is joined is inclined in a fore-and-aft direction with respect to a portion of the front wall of the upper frame at an inner side of the vertical valley fold line in the seat width direction.

19. The vehicle seat according to claim 17, wherein a portion of the lower standing wall that does not overlap the lower superimposition region extends longer in an up-and-down direction than a portion of the lower standing wall that overlaps the lower superimposition region in the front view.

20. A method for manufacturing a vehicle seat, wherein the vehicle sea comprises a seat back frame having:

left and right side frames that have a plate-shaped portion spreading along a vertical plane orthogonal to a rotational axis around a rotating shaft and extending upward along the vertical plane, a front wall that extends inward from a front edge of the plate-shaped portion and extends vertically from around the rotating shaft, and a rear wall that extends inward from a rear edge of the plate-shaped portion and extends vertically from around the rotating shaft; and an upper frame that has a front wall that is partitioned by an upper ridge line and a lower ridge line extending in a horizontal direction, an upper wall that spreads rearward from the upper ridge line, an upper standing wall that extends upward from a rear end of the upper wall, a lower wall that spreads rearward from the lower ridge line, and a lower standing wall that extends downward from a rear end of the lower wall, the method comprising:

linking the left and right side frames by the upper frame above the rotating shaft, wherein the linking the left and right side frames by the upper frame includes:

disposing a projecting piece that is formed at an inner edge of the front wall of the side frame and that spreads to the inside from a virtual outline corresponding to a shape of the upper frame to be superimposed to a rear side of the front wall of the upper frame, wherein a lower projecting piece that extends inward in a seat width direction is provided at a lower end portion of the inner edge of the front wall of the side frame, and wherein the projecting piece protrudes inward in the seat width direction past the lower projecting piece in a front view.

\* \* \* \* \*